(12) United States Patent
Nakano et al.

(10) Patent No.: US 9,001,724 B2
(45) Date of Patent: Apr. 7, 2015

(54) TRANSMISSION DEVICE, RECEPTION DEVICE, WIRELESS COMMUNICATION SYSTEM, TRANSMISSION CONTROL METHOD, RECEPTION CONTROL METHOD, AND PROCESSOR

(75) Inventors: Hiroshi Nakano, Osaka (JP); Takashi Onodera, Osaka (JP); Kozue Hirata, Osaka (JP); Hiromichi Tomeba, Osaka (JP); Shimpei To, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 154 days.

(21) Appl. No.: 13/576,866

(22) PCT Filed: Dec. 17, 2010

(86) PCT No.: PCT/JP2010/072759
§ 371 (c)(1),
(2), (4) Date: Aug. 2, 2012

(87) PCT Pub. No.: WO2011/096138
PCT Pub. Date: Aug. 11, 2011

(65) Prior Publication Data
US 2012/0307706 A1    Dec. 6, 2012

(30) Foreign Application Priority Data
Feb. 5, 2010    (JP) ............... P2010-024782

(51) Int. Cl.
*H04L 12/26*    (2006.01)
*H04J 1/16*    (2006.01)
*G08C 15/00*    (2006.01)
*G06F 11/00*    (2006.01)
(Continued)

(52) U.S. Cl.
CPC ........ *H04L 25/03343* (2013.01); *H04B 7/0604* (2013.01); *H04B 7/0697* (2013.01); *H04J 11/0033* (2013.01); *H04L 2025/03426* (2013.01); *H04W 52/42* (2013.01)

(58) Field of Classification Search
USPC .......... 370/312–328, 347–352; 375/260–296; 455/436–442, 454–560
See application file for complete search history.

(56) References Cited

U.S. PATENT DOCUMENTS 7,502,614 B2 *   3/2009   Uchida et al. ................. 455/436
7,848,241 B2 *   12/2010   Natarajan et al. ............. 370/238
(Continued)

FOREIGN PATENT DOCUMENTS

JP    2009-182894 A    8/2009
JP    2009-206897 A    9/2009
(Continued)

OTHER PUBLICATIONS

Harashima et al., "Matched-Transmission Technique for Channels With Intersymbol Interference," IEEE Transactions on Communications, Aug. 1972, vol. COM-20, No. 4, pp. 774-780.
(Continued)

*Primary Examiner* — M. Phan
(74) *Attorney, Agent, or Firm* — Birch, Stewart, Kolasch & Birch, LLP

(57) ABSTRACT

A multiplexed signal generator is configured to multiplex a signal addressed to a first reception device which has been subjected to a power suppression process of suppressing the power of the signal, and a signal addressed to a second reception device which is not subjected to the power suppression process.

23 Claims, 40 Drawing Sheets

(51) Int. Cl.
*G01R 31/08* (2006.01)
*H04B 7/06* (2006.01)
*H04J 11/00* (2006.01)
*H04L 25/03* (2006.01)
*H04W 52/42* (2009.01)

(56) References Cited

U.S. PATENT DOCUMENTS

| | | | | |
|---|---|---|---|---|
| 8,130,868 | B2* | 3/2012 | Aoki et al. | 375/299 |
| 8,175,633 | B2* | 5/2012 | Tanabe et al. | 455/550.1 |
| 8,219,100 | B2* | 7/2012 | Bao et al. | 455/444 |
| 8,249,189 | B2* | 8/2012 | Aoki et al. | 375/296 |
| 8,583,124 | B2* | 11/2013 | Nagato et al. | 455/444 |
| 8,644,254 | B2* | 2/2014 | Lee et al. | 370/331 |
| 2009/0296656 | A1 | 12/2009 | Tanabe et al. | |
| 2010/0027513 | A1* | 2/2010 | Ikeda | 370/337 |
| 2010/0150013 | A1* | 6/2010 | Hara et al. | 370/252 |
| 2010/0190486 | A1* | 7/2010 | Kimura et al. | 455/423 |
| 2010/0260288 | A1 | 10/2010 | Aoki et al. | |
| 2012/0071104 | A1* | 3/2012 | Onodera et al. | 455/63.1 |

FOREIGN PATENT DOCUMENTS

| | | |
|---|---|---|
| JP | 2009-253975 A | 10/2009 |
| WO | WO 2008/149533 A1 | 12/2008 |
| WO | WO 2010/005217 A2 | 1/2010 |

OTHER PUBLICATIONS

International Search Report issued in PCT/JP2010/072759, mailed on Jan. 25, 2011.

Liu et al., "Improved Tomlinson-Harashima Precoding for the Downlink of Multiple Antenna Multi-User Systems," Proc. IEEE Wireless and Communications and Networking Conference, Mar. 2005, pp. 466-472.

Stankovic et al., "Successive Optimization Tomlinson-Harashima Precoding (SO THP) for Multi-User MIMO Systems," Proc. IEEE Int. Conf. Acoust., Speech, and Signal Processing (ICASSP), Mar. 2005, vol. III, pp. 1117-1120.

Written Opinion of the International Searching Authority issued in PCT/JP2010/072759, mailed on Jan. 25, 2011.

\* cited by examiner

TRANSMISSION DEVICE, RECEPTION DEVICE, WIRELESS COMMUNICATION SYSTEM, TRANSMISSION CONTROL METHOD, RECEPTION CONTROL METHOD, AND PROCESSOR

TECHNICAL FIELD

The present invention relates to a transmission device, a reception device, a wireless communication system, a transmission control method, a reception control method, and a processor.

Priority is claimed on Japanese Patent Application No. 2010-024782, filed Feb. 5, 2010, the content of which is incorporated herein by reference.

BACKGROUND ART

<Regarding THP>

Regarding wireless communication technologies, Tomlinson Harashima precoding (THP) has been known. The THP is a technology in which under a condition that there is interference with communication between a transmission device and a reception device, the transmission device preliminarily detects the interference, preliminarily cancels the interference from a transmission signal, and transmits the resultant signal to the reception device. Here, the transmission device and the reception device transmits and receives a signal on which modulo arithmetic has been performed to suppress an increase in transmission power caused by cancelling the interference (see Non-Patent Document 1).

Hereinafter, communication using the THP is explained in detail.

Firstly, modulo arithmetic to be performed by the transmission device and the reception device is explained. This modulo arithmetic is arithmetic that adds an integral multiple of a value τ, which is known to the transmission device and the reception device, to an I-ch (In-phase channel) and a Q-ch (Quadrature channel) of a modulation symbol in order to convert that signal into a modulation symbol included within the range of [−τ/2, τ/2]. The modulo arithmetic is expressed by the following formula (1)

[Formula 1]

$$x' = \text{Mod}_\tau(x) = x - \text{floor}\left(\frac{\text{Re}(x) + \frac{\tau}{2}}{\tau}\right)\tau - j \cdot \text{floor}\left(\frac{\text{Im}(x) + \frac{\tau}{2}}{\tau}\right)\tau \quad (1)$$

Here, $\text{Mod}_\tau(x)$ denotes a modulo arithmetic. x denotes a modulation symbol to be subjected to the modulo arithmetic, and x' denotes a modulation symbol resulting from the modulation arithmetic. j denotes an imaginary unit. Re(x) denotes a real part of x. Im(x) denotes an imaginary part of x. floor(x) denotes the maximum integer that does not exceed x.

FIG. 37 is a schematic diagram illustrating a modulo arithmetic according to related art. In this drawing, a modulation symbol appended with a reference symbol P11 denotes a modulation symbol to be subjected to the modulo arithmetic (x in the formula (1)). Additionally, a modulation symbol appended with a reference symbol P12 denotes a modulo symbol resulting from the modulo arithmetic (x' in the formula (1)). Here, a modulation symbol P12 is a symbol obtained by adding ($N_1=-2$, $N_2=-1$ in the case of FIG. 37) to the modulation symbol P11.

In FIG. 37, the I-ch and the Q-ch of the modulation symbol P12 resulting from the modulo arithmetic are included within the range of [−τ/2, τ/2] from the origin. Thus, the amplitude of a signal can be included within a predetermined range by performing the modulo arithmetic, thereby enabling a decrease in transmission power.

Generally, in case that the average power for modulation symbols is normalized to 1, the modulo width τ becomes, according to a modulation scheme, a predetermined value preliminarily known to transmission and reception sides. For example, $\tau=2\sqrt{2}$ for QPSK (Quadrature Phase Shift Keying), $\tau=8\sqrt{10}$ for 16QAM (Quadrature Amplitude Modulation), or $\tau=16\sqrt{42}$ for 64QAM.

Next, an interference cancelling using the modulo arithmetic is explained here. Here, a modulation symbol of a desired signal that the transmission device transmits to the reception device is denoted as a desired symbol s. A modulation symbol of interference between the transmission device and the reception device is denoted as an interference symbol f.

In the ease of communication using the THP, the transmission device subtracts the interference symbol f from the desired symbol s. Thus, the reception device can receive the desired symbol s by just demodulating a reception signal. However, the amplitude of an interference cancelled symbol s−f resulting from the subtraction is generally increased by subtracting the interference. For this reason, if the signal of this interference cancelled symbol is transmitted, the transmission power increases. Therefore, the transmission device performs the modulo arithmetic on this interference cancelled symbol s−f, and then transmits a signal of the modulo symbol x' (=$\text{Mod}_\tau(s-f)$) resulting from the arithmetic. Thereby, the transmission device can make the I-ch and the Q-ch of the modulation symbol of the signal to be transmitted be included within the range of [−τ/2, τ/2] from the origin. Thus, the transmission device can transmit a signal for which the power is suppressed compared to a case of transmitting the interference cancelled symbol s−f.

The signal transmitted by the transmission device is affected by interference, and the modulation symbol of that signal received by the reception device is a reception symbol $y=\text{Mod}_\tau(s-f)+f$. Here, the channel characteristic is assumed to be 1, and thus the effect of noise is ignored. If the modulo arithmetic is performed on that reception symbol, then the result is $\text{Mod}_\tau\{\text{Mod}_\tau(s-f)+f\}=\text{Mod}_\tau(s-f+f)=\text{Mod}_\tau(s)=s$. In other words, the reception device can detect the desired symbol s.

The above is the mechanism for the communication using the THP.

<Regarding MU-MIMO THP>

Next, communication, in which the THP is used for multi-user MIMO (Multi-User Multi Input Multi Output) communication, is explained. Here, this communication technology for a downlink (DL) from a base station device to a terminal device is referred to as a DL MU-MIMO THP.

FIG. 38 is a schematic diagram illustrating a wireless communication system according to the related art. This drawing is a diagram illustrating a wireless communication system to which the DL MU-MIMO THP is applied.

In this drawing, a base station device X1 transmits signals to multiple terminal devices Y11 and Y12. If these signals are transmitted at the same time, using the same frequency, the signals interfere with each other (multi-user interference). The DL MU-MIMO THP is a technology of cancelling that multi-user interference.

Non-Patent Document 2 discloses the DL MU-MIMO THP.

Hereinafter, regarding the wireless communication system shown in FIG. 38, configurations of the base station device X1 and the terminal devices Y1 (Y11 and Y12) are explained.

FIG. 39 is a schematic block diagram illustrating the configuration of the base station device X1 according to the related art.

Regarding a multiplexed signal generator X13, a filter calculator X131 receives channel state information (CSI) from the terminal devices Y11 and Y12, and calculates an interference coefficient and a linear filter based on the received CSI. The filter calculator X131 outputs the calculated interference coefficient and the calculated linear filter to an interference calculator X132 and a linear filter multiplier X135, respectively.

The interference calculator X132 multiplies a modulation symbol $s_1$ addressed to the terminal device Y11 received from a modulator X121, by the interference coefficient indicated by the information received from the filter calculator X131, to calculate an interference symbol f. The interference calculator X132 outputs the calculated interference symbol f to an interference subtractor X133.

The interference subtractor X133 subtracts the interference symbol f received from the interference calculator X132, from a modulation symbol $s_2$ addressed to the terminal device Y12 received from a modulator X122. The interference subtractor X133 outputs to a modulo arithmetic unit X134, the interference cancelled symbol $s_2-f$ resulting from the subtraction.

The modulo arithmetic unit X134 performs the modulo arithmetic shown in the formula (1) on the interference cancelled symbol received from the interference subtractor X133. Then, the modulo arithmetic unit X134 outputs to a linear filter multiplier X135, a modulo symbol $s_2'$ (=$\text{Mod}_\tau(s_2-f)$) resulting from the arithmetic.

The linear filter multiplier X135 (coefficient multiplier) multiplies, by the linear filter indicated by the information received from the filter calculator X131, the modulation symbol $s_1$ addressed to the terminal device Y11 and received from the modulator X121, and the modulo symbol $s_2'$ received from the modulo arithmetic unit X134. Then, the linear filter multiplier X135 outputs the results to the wireless transmitters X141 and X142.

By the above process, the base station device X1 can make an element of the signal addressed to the terminal device Y12 be 0 (null) with respect to the direction from the base station device X1 to the terminal device Y11. The principle of this operation will be explained later.

FIG. 40 is a schematic block diagram illustrating a configuration of the terminal device Y1 according to the related art. In this drawing, a modulo arithmetic unit Y113 performs the modulo arithmetic shown in the formula (1) on a modulation symbol of a reception signal having been subjected to channel compensation, and thereby extracts a desired symbol.

The principle of operation regarding a wireless communication system, to which the DL MU-MIMO THP shown in FIGS. 38 to 40 is applied, is explained here.

Regarding the base station device X1, an interference calculator X132 performs QR decomposition on an Hermitian conjugate $H^H$ of a channel matrix H. The QR decomposition is to decompose a matrix into a unitary matrix Q and an upper triangular matrix R. This decomposition can be expressed by the following formula (2).

[Formula 2]

$$H^H = QR = Q\begin{pmatrix} r_{11} & r_{12} \\ 0 & r_{22} \end{pmatrix} \quad (2)$$

The filter calculator X131 generates the matrix $H^H$ using the CSI, and performs QR decomposition on the matrix $H^H$. The filter calculator X131 calculates the matrix Q as a linear filter, and calculates $r_{12}^*/r_{22}^*$ as an interference coefficient. Here, r* denotes a complex conjugate of r.

The interference calculator X132 calculates the interference symbol f as $(r_{12}^*/r_{22}^*)s_1$. Additionally, the modulo arithmetic unit X134 generates the modulo symbol $s_2'$ as $\text{Mod}_\tau\{s_2-(r_{12}^*/r_{22}^*)s_1\}$, and outputs the generated symbol $s_2'$ to the linear filter multiplier X135. The linear filter multiplier X135 generates symbols $s_1''$ and $s_2''$ shown in the following formula (3), and outputs the generated symbols to the wireless transmitters X141 and X142, respectively.

[Formula 3]

$$\begin{pmatrix} s_1'' \\ s_2'' \end{pmatrix} = Q\begin{pmatrix} s_1 \\ s_2' \end{pmatrix} \quad (3)$$

A reception signal received by the terminal device Y11 is denoted as a reception symbol $y_1$. A reception signal received by the terminal device Y12 is denoted as a reception symbol $y_2$. $y_1$ and $y_2$ are expressed by the following formula (4).

[Formula 4]

$$\begin{pmatrix} y_1 \\ y_2 \end{pmatrix} = H\begin{pmatrix} s_1'' \\ s_2'' \end{pmatrix} = (QR)^H Q\begin{pmatrix} s_1 \\ s_2' \end{pmatrix} = (R^H Q^H)Q\begin{pmatrix} s_1 \\ s_2' \end{pmatrix} = R^H\begin{pmatrix} s_1 \\ s_2' \end{pmatrix} \quad (4)$$

$$= \begin{pmatrix} r_{11}^* s_1 \\ r_{12}^* s_1 + r_{22}^* \times \text{Mod}(s_2 - (r_{12}^*/r_{22}^*)s_1) \end{pmatrix}$$

The formula (4) shows that the reception symbol $y_1$ (=$r_{11}^* s_1$) received by the terminal device Y11 does not include an element of the desired symbol $s_2$ addressed to the terminal device Y12. In other words, the base station device X1 can make an element of the signal addressed to the terminal device Y12 be 0 (null) with respect to the direction from the base station device X1 to the terminal device Y11.

Regarding the terminal device Y11, a channel compensator Y112 divides the reception symbol $y_1$ by $r_{11}^*$, and thereby can extract the desired symbol $s_1$. Here, the modulo arithmetic unit Y113 performs the modulo arithmetic. Since $\text{Mod}_\tau(s_1) = s_1$, the desired symbol $s_1$ is output to the demodulator Y114.

Regarding the terminal device Y12, the channel compensator Y112 divides the reception symbol $y_2$ by $r_{22}^*$. The channel compensator Y112 outputs to the modulo arithmetic unit Y113, a channel compensated symbol $z_2$(=$y_2/r_{22}^*$) resulting from the division.

The modulo arithmetic unit Y113 performs the modulo arithmetic shown in the formula (1) on the channel compensated symbol $z_2$ to extract the desired symbol $s_2$ (see the following formula (5)).

[Formula 5]

$$\begin{aligned}
\mathrm{Mod}_\tau(z_2) &= \mathrm{Mod}_\tau(r_{12}^*/r_{22}^* s_1 + \mathrm{Mod}_\tau(s_2 - r_{12}^*/r_{22}^* s_1)) \\
&= \mathrm{Mod}_\tau(r_{12}^*/r_{22}^* s_1 + (s_2 - r_{12}^*/r_{22}^* s_1)) \\
&= s_2
\end{aligned} \quad (5)$$

Additionally, Non-Patent Document 3 discloses a wireless communication system to which the aforementioned DL MU-MIMO THP is applied, in a case where each terminal device includes multiple antennas and performs SU-MIMO (Single-User Multi Input Multi Output).

FIG. 41 is another schematic diagram illustrating a wireless communication system according to the related art. This drawing illustrates a wireless communication system to which the DL MU-MIMO THP is applied, in a case where each terminal device performs SU-MIMO communication.

In this drawing, a base station device X2 transmits, using the SU-MIMO communication, signals to multiple terminal devices Y21 to Y23. If those signals are transmitted at the same time, using the same frequency, those signals cause multi-user interference with each another. However, this multi-user interference is cancelled by applying the DL MU-MIMO THP.

CITATION LIST

Non-Patent Document

[Non-Patent Document 1] H. Harashima and H. Miyakawa, "Matched-Transmission Technique for Channels With Intersymbol Interference," IEEE Transactions On Communications, Vol. Com-20, No. 4, pp. 774-780, August 1972.
[Non-Patent Document 2] J. Liu and A. Krzymien, "Improved Tomlinson-Harashima Precoding for the Downlink of Multiple Antenna Multi-User Systems," Proc. IEEE Wireless and Communications and Networking Conference, pp. 466-472, March 2005
[Non-Patent Document 3] V. Stankovic and M. Haardt, "Successive optimization Tomlinson-Harashima precoding (SO THP) for multi-user MIMO systems," Proc. IEEE Int. Conf. Acoust., Speech, and Signal Processing (ICASSP), Vol. III, pp. 1117-1120, Philadelphia, Pa., USA, March 2005.

DISCLOSURE OF THE INVENTION

Problems to be Solved by the Invention

By the way, regarding the wireless communication system to which the aforementioned THP of the related art is applied, the points cyclically shifted at an interval corresponding to the modulo width r in the directions of the I-ch and the Q-ch are considered as the same point. For this reason, there has been a defect in that reception candidate points increase in number, thereby causing a decrease in the signal detection performance (modulo loss).

Specifically, the decrease in the signal detection performance is explained with reference to FIG. 42.

FIG. 42 is a schematic diagram illustrating reception candidate points according to the related art. The upper drawing (a) is a diagram in a case where THP is not applied. The lower drawing (b) is a diagram in a ease where the THP is applied. Additionally, FIG. 42 is a diagram illustrating a case where a modulation scheme is QPSK. In this drawing, white and black circles, and white and black squares denote reception candidate points.

In FIG. 42, reception signal points are shifted to the top position of an arrow (mark "x" appended with a reference symbol z11, which is referred to as a signal z11) due to the effect of noise or the like. In this case, in the upper drawing (a), the signal z11 is detected as a reception signal point P11 that is the closest. On the other hand, in the lower drawing (b), the signal z11 is detected as a reception signal point P22 that is the closest. Thus, the wireless communication system to which the conventional THP is applied has had the defect in that the reception candidate points increases in number, thereby causing deterioration of the propagation performance.

The present invention has been made in view of the above situations, and provides a transmission device, a reception device, a wireless communication system, a transmission control method, a reception control method, and a processor, which can enhance the propagation performance.

Means for Solving the Problems (1) The present invention has been made to solve the above problems. The present invention is a transmission device including a plurality of transmission antennas and configured to spatially multiplex and transmit a plurality of signals addressed to a plurality of reception devices. The transmission device includes: a multiplexed signal generator configured to multiplex a signal addressed to a first reception device of the plurality of reception devices and a signal addressed to a second reception device of the plurality of reception devices, the signal addressed to the first reception device having been subjected to a power suppression process of suppressing a power of the signal, and the signal addressed to the second reception device being not subjected to the power suppression process.

(2) Additionally, regarding the above transmission device according to the present invention, the multiplexed signal generator is configured to determine whether one of the plurality of reception devices is the first reception device or the second reception device, based on channel state informations of channels to the plurality of reception devices.

(3) Additionally, regarding the above transmission device according to the present invention, the multiplexed signal generator is configured to multiplex a plurality of signals addressed to the first reception device and a plurality of signals addressed to the second reception device.

(4) Additionally, regarding the above transmission device according to the present invention, the power suppression process is modulo arithmetic.

(5) Additionally, regarding the above transmission device according to the present invention, the multiplexed signal generator includes: a modulo switch determining unit configured to determine whether or not one of the plurality of reception devices is the first reception device or the second reception device, and to generate and output transmission mode information that identifies the first reception device and transmission mode information that identifies the second reception device; and an adaptive modulo unit configured to generate the signal addressed to the first reception device and the signal addressed to a second reception device, based on the transmission mode informations received from the modulo switch determining unit.

(6) Additionally, regarding the above transmission device according to the present invention, in case that an interference power of interference caused by a signal addressed to another reception device is higher than a threshold, the modulo switch determining unit is configured to determine that the one of the plurality of reception devices to be the first reception device. In case that the interference power of the interference caused by the signal addressed to the other reception device is lower than the threshold, the modulo switch determining unit is configured to determine the one of the plurality of reception devices to be the second reception device.

(7) Additionally, regarding the above transmission device according to the present invention, the multiplexed signal generator includes: a coefficient calculator configured to calculate interference coefficients relating respectively to the plurality of reception devices, based on the channel state informations of the channels to the plurality of reception devices; an interference calculator configured to calculate, based on the interference coefficients calculated by the coefficient calculator and a signal addressed to another reception device, an interference signal interfering with the signal addressed to the one of the plurality of reception devices, the interference signal being caused by the signal addressed to the other reception device; and an interference subtractor configured to subtract from the signal addressed to the one of the plurality of reception devices, the interference signal caused by the signal addressed to the other reception device which is calculated by the interference calculator. The adaptive modulo unit is configured to generate, based on the transmission mode informations received from the modulo switch determining unit, the signal addressed to the first reception device and the signal addressed to the second reception device, respectively from a signal addressed to the first reception device from which the interference subtractor has subtracted the interference signal interfering with the signal, and a signal addressed to the second reception device from which the interference subtractor has subtracted the interference signal interfering with the signal.

(8) Additionally, the above transmission device according to the present invention further includes: a frame constructor configured to insert into the signal, a signal of the transmission mode information generated by the modulo switch determining unit, the transmission mode information indicating the first reception device.

(9) Additionally, the above transmission device according to the present invention further includes: a frame constructor configured to insert into the signal, a signal of the transmission mode information generated by the modulo switch determining unit, the transmission mode information indicating the second reception device.

(10) Additionally, regarding the above transmission device according to the present invention, the multiplexed signal generator includes: a coefficient calculator configured to calculate a linear filter, and interference coefficients respectively relating to the plurality of reception devices, based on the channel state informations of the channels to the plurality of reception devices; an interference calculator configured to calculate, based on the interference coefficients calculated by the coefficient calculator and a signal addressed to another reception device, an interference signal interfering with the one of the plurality of reception devices, the interference single caused by the signal addressed to the other reception signal; an interference subtractor configured to subtract from the signal addressed to the one of the plurality of reception devices, the interference signal caused by the other reception device which has been calculated by the interference calculator; an adaptive modulo unit configured to generate, based on the transmission mode informations received from the modulo switch determining unit, the signal addressed to the first reception device and the signal addressed to the second reception device from signals resulting from subtraction performed by the interference subtractor; and a coefficient multiplier configured to multiply the signal of the transmission mode information inserted by the frame constructor and the signal addressed to the first reception device and the second signal addressed to the second reception device which are generated by the adaptive modulo unit, by the linear filter calculated by the coefficient calculator.

(11) Additionally, regarding the above transmission device according to the present invention, the multiplexed signal generator includes: a frame constructor configured to insert one of dedicated reference signals respectively addressed to the plurality of reception devices, into the signal addressed to the one of the plurality of reception devices.

(12) Additionally, regarding the above transmission device according to the present invention, the multiplexed signal generator includes: a coefficient calculator configured to calculate interference coefficients respectively relating to the plurality of reception devices, based on the channel state informations of the channels to the plurality of reception devices; an interference calculator configured to calculate, based on the interference coefficients calculated by the coefficient calculator and a signal addressed to another reception device, an interference signal interfering with the signal addressed to the one of the plurality of reception devices, the interference signal being caused by the signal addressed to the other reception device; and an interference subtractor configured to subtract from the signal addressed to the one of the plurality of reception devices, the interference signal caused by the signal addressed to the other reception device which is calculated by the interference calculator, according to a predetermined order of the plurality of reception devices; a modulo arithmetic unit configured to perform modulo arithmetic on the signal addressed to the first reception device whose order among the plurality of reception devices is latter than a threshold; and a multiplexed signal generator configured to multiplex the signal addressed to the second reception device whose order among the plurality of reception devices is earlier than the threshold and from which the interference subtractor has subtracted the interference signal, and the signal having been subjected to the modulo arithmetic performed by the modulo arithmetic unit.

(13) Additionally, the above transmission device according to the present invention further includes: a frame constructor configured to insert into the signal, the signal of the transmission mode information that indicates the first reception device whose order among the plurality of reception devices is latter than the threshold.

(14) Additionally, the above transmission device according to the present invention further includes: a frame constructor configured to insert into the signal, the signal of the transmission mode information that indicates the second reception device whose order among the plurality of reception devices is earlier than the threshold.

(15) Additionally, regarding the above transmission device according to the present invention, the coefficient calculator is configured to calculate the linear filter, and the interference coefficients respectively relating to the plurality of reception devices, based on the channel state informations of the channels to the plurality of reception devices. The multiplied signal generator includes: a coefficient multiplier configured to multiply the signal of the transmission mode informations inserted by the frame constructor, and the signal addressed to the first reception device and the signal addressed to the second reception device which are generated by the adaptive modulo unit, by the linear filter calculated by the coefficient calculator.

(16) Further, the present invention is a reception device configured to receive a plurality of signals addressed to a plurality of reception devices which are spatially multiplexed. The reception device includes: a transmission mode determining unit configured to determine whether a signal received is a signal addressed to a first reception device of the plurality of reception devices or a signal addressed to a second reception device of the plurality of reception devices, the signal addressed to the first reception device having been subjected to a power suppression process of suppressing a power of the signal, and the signal addressed to the second reception device being not subjected to the power suppression process; and an adaptive demodulator configured to demodulate the signal based on a result of determination performed by the transmission mode determining unit.

(17) Additionally, regarding the above reception device according to the present invention, the power suppression process is modulo arithmetic.

(18) Additionally, regarding the above reception device according to the present invention, the transmission mode determining unit is configured to obtain transmission mode information included in the signal, the transmission mode information identifying the first reception device or the second reception device. The transmission mode determining unit is configured to determine, based on the obtained transmission mode information, whether the signal is the signal addressed to the first reception device or the signal addressed to the second reception device.

(19) Additionally, regarding the above reception device according to the present invention, the adaptive demodulator is configured to demodulate the signal by performing modulo arithmetic on the signal in case that the transmission mode determining unit determines based on the transmission mode information that the signal is the signal addressed to the first reception device. The adaptive modulator is configured to demodulate the signal without performing modulo arithmetic on the signal in case that the transmission mode determining unit determines based on the transmission mode information that the signal is the signal addressed to the second reception device.

(20) Additionally, the above reception device according to the present invention further includes: a frame demultiplexer configured to extract from the signal, dedicated reference signals respectively addressed to the plurality of reception devices; a channel estimator configured to estimate channel states based on the dedicated reference signals extracted by the frame demultiplexer; and a channel compensator configured to perform channel compensation on the signal based on the channel state informations indicating the channel states estimated by the channel estimator.

(21) Additionally, regarding the above reception device according to the present invention, the transmission mode determining unit is configured to determine whether the signal is the signal addressed to the first reception device or the signal addressed to the second reception device, based on the dedicated reference signals respectively addressed to the plurality of reception devices which are included in the signal.

(22) Additionally, regarding the above reception device according to the present invention, the transmission mode determining unit is configured to determine whether the signal is the signal addressed to the first reception device or the signal addressed to the second reception device, based on an order of the plurality of reception devices which is indicated by positions at which the dedicated reference signals are allocated, the order corresponding to an order in which interference signals have been subtracted from the signal.

(23) Additionally, regarding the above reception device according to the present invention, the transmission mode determining unit is configured to determine the reception device to be the first reception device in case that the order of the reception device is latter than a threshold. The transmission mode determining unit is configured to determine the reception device to be the second reception device in case that the order of the reception device is earlier than the threshold.

(24) Additionally, regarding the above reception device according to the present invention, the adaptive demodulator is configured to demodulate the signal by performing modulo arithmetic on the signal in case that the transmission mode determining unit determines that the signal is the signal addressed to the first reception device. The adaptive demodulator is configured to demodulate the signal without performing modulo arithmetic on the signal in case that the transmission mode determining unit determines that the signal is the signal addressed to the second reception device.

(25) Additionally, regarding the above reception device according to the present invention, the dedicated reference signals are allocated in time order corresponding to the order of the plurality of reception devices. The transmission mode determining unit is configured to select one of the dedicated reference signals which is received the last in an order associated with the order of the plurality of reception devices. The reception device includes: a channel estimator configured to estimate channel state based on the one of the dedicated reference signals which is selected by the transmission mode determining unit; and a channel compensator configured to perform channel compensation on the signal based on channel state information indicating the channel state estimated by the channel estimator.

(26) Moreover; the present invention is a wireless communication system including: a transmission device configured to spatially multiplex and transmit a plurality of signals addressed to a plurality of reception devices; and a reception device configured to receive the plurality of signals transmitted from the transmission device. The transmission device includes: a multiplexed signal generator configured to multiplex a signal addressed to a first reception device of the plurality of reception devices and a signal addressed to a second reception device of the plurality of reception devices, the signal addressed to the first reception device having been subjected to a power suppression process of suppressing a power of the signal, and the signal addressed to the second reception device being not subjected to the power suppression process. The reception device includes: a transmission mode determining unit configured to determine whether the signal received is the signal addressed to the first reception device or the signal addressed to the second reception device; and an adaptive demodulator configured to demodulate the signal based on a result of determination performed by the transmission mode determining unit.

(27) Additionally, the present invention is a transmission control method for a transmission device configured to spatially multiplex and transmit a plurality of signals addressed to a plurality of reception devices. The transmission control method includes: a step for a multiplexed signal generator to multiplex a signal addressed to a first reception device of the plurality of reception devices and a signal addressed to a second reception device of the plurality of reception devices, the signal addressed to the first reception device having been subjected to a power suppression process of suppressing a power of the signal, and the signal addressed to the second reception device being not subjected to the power suppression process.

(28) Further, the present invention is a reception control method for a reception device configured to receive a plurality of signals addressed to a plurality of reception devices which are spatially multiplexed. The reception control method includes: a first step for a transmission mode determining unit to determine whether a signal received is a signal addressed to a first reception device of the plurality of reception devices or a signal addressed to a second reception device of the plurality of reception devices, the signal addressed to the first reception device having been subjected to a power suppression process of suppressing a power of the signal, and the signal addressed to the second reception device being not subjected to the power suppression process; and a second step for an adaptive demodulator to demodulate the signal based on a result of determination performed by the transmission mode determining unit.

(29) Moreover, the present invention is a processor to be used for a transmission device including a plurality of transmission antennas and configured to spatially multiplex and transmit a plurality of signals addressed to a plurality of reception devices. The processor includes: a multiplexed signal generator configured to multiplex a signal addressed to a first reception device of the plurality of reception devices and a signal addressed to a second reception device of the plurality of reception devices, the signal addressed to the first reception device having been subjected to a power suppression process of suppressing a power of the signal, and the signal addressed to the second reception device being not subjected to the power suppression process.

(30) Additionally, the present invention is a processor to be used for a reception device configured to receive a plurality of signals addressed to a plurality of reception devices which are spatially multiplexed. The reception device includes: a transmission mode determining unit configured to determine whether a signal received is a signal addressed to a first reception device of the plurality of reception devices or a signal addressed to a second reception device of the plurality of reception devices, the signal addressed to the first reception device having been subjected to a power suppression process of suppressing a power of the signal, and the signal addressed to the second reception device being not subjected to the power suppression process; and an adaptive demodulator configured to demodulate the signal based on a result of determination performed by the transmission mode determining unit.

Effects of the Invention

According to the present invention, the propagation performance can be enhanced.

BRIEF DESCRIPTION OF THE DRAWINGS

FIG. 36 is a schematic diagram illustrating an example of a codebook.

FIG. 42 is a schematic diagram illustrating reception candidate points according to the related art.

BEST MODE FOR CARRYING OUT THE INVENTION

First Embodiment

Hereinafter, embodiments of the present invention are explained in detail with reference to the drawings.
<Regarding Wireless Communication System>

Figure 1:
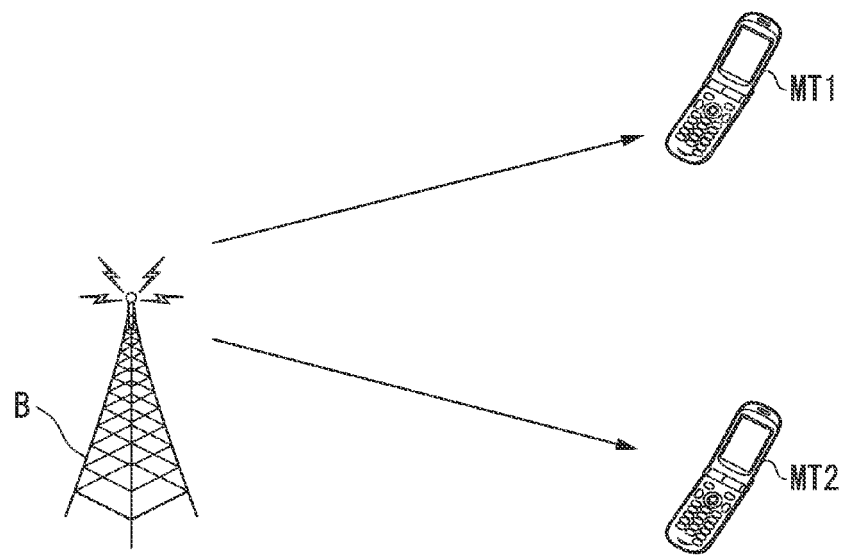
FIG. 1 is a schematic diagram illustrating a wireless communication system according to a first embodiment of the present invention.

FIG. 1 is a schematic diagram illustrating a wireless communication system according to a first embodiment of the present invention. This drawing is a diagram illustrating a wireless communication system to which the DL MU-MIMO THP is applied.

In this drawing, a base station device B spatially multiplexes and transmits signals respectively addressed to multiple terminal devices MT1 and MT2. In the wireless communication system, whether or not to perform modulo arithmetic (power suppression process of suppressing the power of the signal) on the signal addressed to the terminal device MT2 is switched based on the interference power.

Hereinafter, a base station device B is referred to as a base station device b1. Each of the terminal devices MT1 and MT2 is referred to as a terminal device m1.
<Regarding Base Station Device b1>

Figure 2:
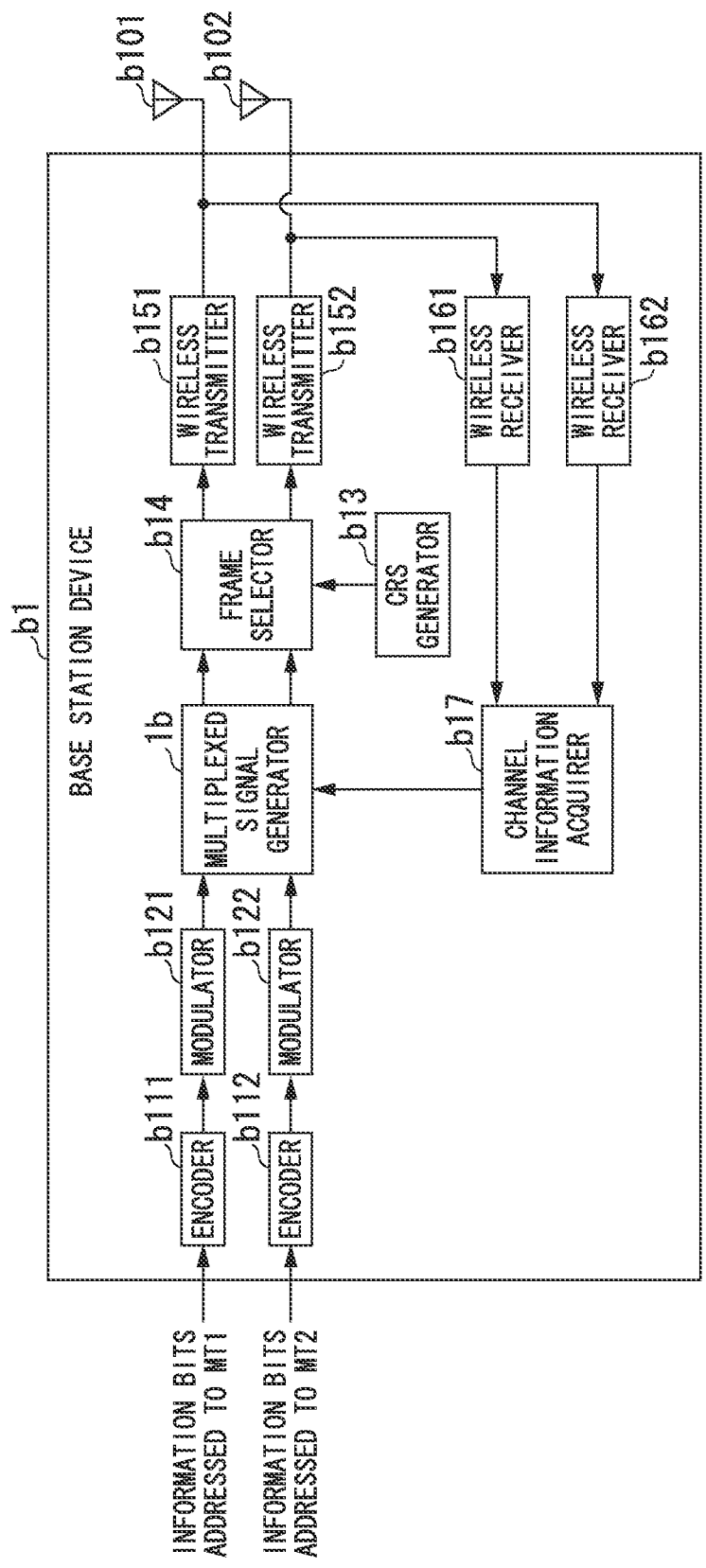
FIG. 2 is a schematic block diagram illustrating a base station device according to the first embodiment.

FIG. 2 is a schematic block diagram illustrating the base station device b1 according to the first embodiment. This drawing is a diagram illustrating a case in which the base station device b1 includes two antennas that transmit signals addressed to the respective terminal devices, using the same frequency band.

In FIG. 2, the base station device b1 includes: encoders b111 and b112; modulators b121 and b122; a multiplexed signal generator 1b; a CRS (Common reference Symbol) generator b13; a frame selector b14; wireless transmitters b151 and b152; antennas b101 and b102; wireless receivers b161 and b162; and a channel information acquirer b17.

The encoders b111 and b112 receive information bits addressed to the terminal device MT1 and information bits addressed to the terminal device MT2, respectively. The encoders b111 and b112 perform error correction coding on the input information bits, and output the results to the modulators b121 and b122, respectively.

The modulators b121 and b122 modulate the input bits and output the modulated modulation symbols $s_1$ and $s_2$ to the multiplexed signal generator 1b.

The multiplexed signal generator 1b calculates an interference symbol f which arises to the wireless signal addressed to the terminal device MT2, based on channel state information (CSI) received from the channel information acquirer b17. The multiplexed signal generator 1b subtracts the calculated interference symbol f from the modulation symbol $s_2$ received from the modulator b122.

Additionally, the multiplexed signal generator 1b generates a dedicated reference symbol (DRS) for each terminal device m1. Here, the dedicated reference symbol and a common reference symbol that will be explained later are symbols which the base station device b1 and the terminal device m1 preliminarily store, and which are used for estimation of channel states or the like.

The multiplexed signal generator 1b determines whether or not to perform the modulo arithmetic, based on the CSI received from the channel information acquirer b17. If it is determined to perform the modulo arithmetic, the multiplexed signal generator 1b allocates, based on mapping information preliminarily determined, a modulo symbol $s_2'$ resulting from the modulo arithmetic, a modulation symbol of transmission mode information indicating that the modulo arithmetic is to be performed (transmission mode 1), and the dedicated reference symbol. The multiplexed signal generator 1b multiplies the symbols of the allocated symbol stream by a linear filter, and outputs the result to the frame selector b14.

On the other hand, if it is determined not to perform the modulo arithmetic, the multiplexed signal generator 1b allocates, based on mapping information preliminarily determined, an interference cancelled symbol $s_2-f$, a modulation symbol of transmission mode information indicating that the modulo arithmetic is not to be performed (transmission mode 2), and the dedicated reference symbol. The multiplexed signal generator 1b multiplies the symbols of the allocated symbol stream by the linear filter, and outputs the result to the frame selector b14.

The details of the process performed by the multiplexed signal generator 1b will be explained later.

The CRS generator b13 generates a common reference symbol (CRS) for each antenna, and outputs the generated common reference symbol to the frame selector b14.

The frame selector b14 allocates, according to the mapping information, the common reference symbol for the antennas b101 and b102, which is received from the CRS generator b13, to a frequency band. Then, the frame selector b14 outputs the allocated common reference symbol to the wireless communication transmitters b151 and b152 in predetermined transmission time unit (frame).

Additionally, the frame selector b14 allocates, according to the mapping information, the symbol streams respectively addressed to the terminal devices MT1 and MT2 which are received from the multiplexed signal generator 1b and result from the multiplication by the linear filter, to a frequency band to be used for transmitting signals to the terminal devices MT1 and MT2. Here, the frequency bands, to which the symbol streams respectively addressed to the terminal devices MT1 and MT2 are allocated, are the same frequency bands. The frame selector b14 outputs the signals allocated to the frequency bands to the wireless transmitters b151 and b152 in predetermined transmission time unit (frame).

The wireless transmitters b151 and b152 perform digital-to-analog conversion on the input signals, and upconvert the signals resulting from the digital-to-analog conversion into carrier frequency signals. The wireless transmitters b151 and b152 transmit the upconverted wireless signals (see FIGS. 4 and 5) via the antennas b101 and b102, respectively.

Here, the mapping information used by the frame selector b14, the coding scheme used by the encoders b111 and b112, and the modulation scheme used by the modulators b121 and b12, are preliminarily reported from the base station device b1 to the terminal device m1 (the terminal devices MT1 and MT2 in the first embodiment).

The wireless receivers b161 and b162 receive wireless signals transmitted from the terminal devices MT1 and MT2 via the antennas b101 and b102, respectively. The wireless receivers b161 and b162 downconvert the received wireless signals into baseband signals, and perform analog-to-digital conversion on the downconverted signals. The wireless receivers b161 and b162 output the converted signals to the channel information acquirer b17.

The channel information acquirer b17 demodulates the signals received from the wireless receivers b161 and b162. The channel information acquirer b17 extracts the CSI estimated by the terminal device MT1 and the CSI estimated by the terminal device MT2 from the demodulated information. The CSIs indicate channel states of channels between each of the terminal devices MT1 and MT2 and each of the antennas b101 and b102 of the base station. The channel information acquirer b17 outputs the extracted CSIs to the multiplexed signal generator 1b.

Figure 3:
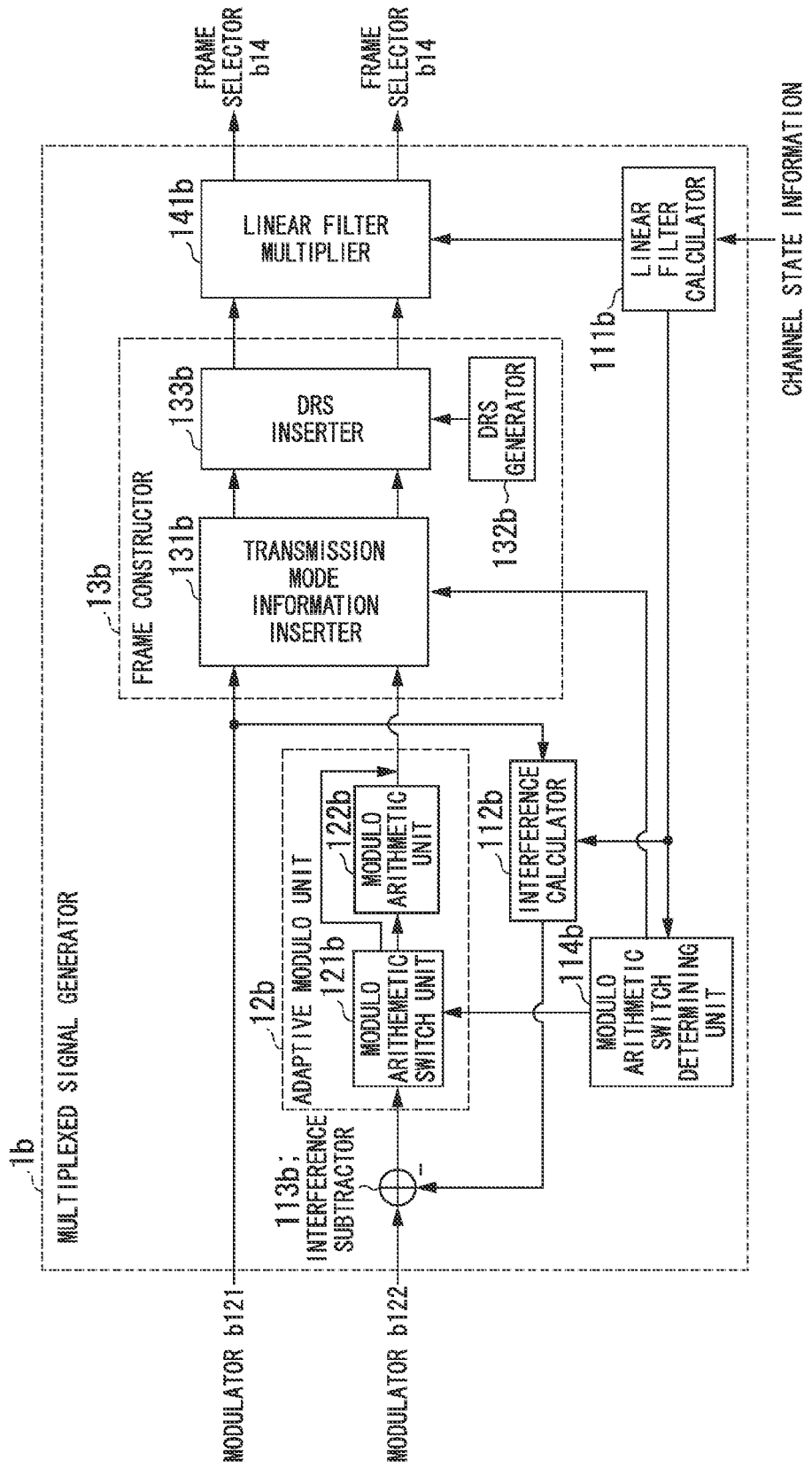
FIG. 3 is a schematic block diagram illustrating a configuration of a multiplexed signal generator according to the first embodiment.

FIG. 3 is a schematic block diagram illustrating a configuration of the multiplexed signal generator 1b according to the first embodiment. In this drawing, the multiplexed signal generator 1b includes: a linear filter calculator 111b; an interference calculator 112b; an interference subtractor 113b; a modulo arithmetic switch determining unit 114b; an adaptive modulo unit 12b; a frame constructor 13b; and a linear filter multiplier 141b. Additionally, the adaptive modulo unit 12b (adaptive modulo unit) includes: a modulo arithmetic switch unit 121b; and a modulo arithmetic unit 122b. Further, the frame constructor 13b includes: a transmission mode information inserter 131b; a DRS generator 132b; and a DRS inserter 133b.

The linear filter calculator 111b (coefficient calculator) receives the CSI. The linear filter calculator 111b generates a channel matrix H from the received CSI. The linear filter calculator 111b performs QR decomposition on a matrix $H^H$ that is an Hermitian conjugate of the generated channel matrix H, to calculate the interference coefficient $(r_{12}^*/r_{22}^*)$ and the linear filter (matrix Q). The QR decomposition is to decompose a matrix into a unitary matrix Q and an upper triangular matrix R. This QR decomposition is expressed by the following formula (6). Here, r* denotes a complex conjugate of r.

[Formula 6]

$$H^H = \begin{pmatrix} h_{11}^* & h_{21}^* \\ h_{12}^* & h_{22}^* \end{pmatrix} = QR = Q\begin{pmatrix} r_{11} & r_{12} \\ 0 & r_{22} \end{pmatrix} \quad (6)$$

Here, $h_{11}$ denotes a channel estimation value between the antenna b101 and the terminal device MT1, and $h_{21}$ denotes a channel estimation value between the antenna b101 and the terminal device MT2. $h_{12}$ denotes a channel estimation value (complex gain) between the antenna b102 and the terminal device MT1, and $h_{22}$ denotes a channel estimation value (complex gain) between the antenna b102 and the terminal device MT2. The channel estimation value is information included in the CSI.

The linear filter calculator 111b outputs the calculated information indicating the interference coefficient to the interference calculator 112b and the modulo arithmetic switch determining unit 114b. Additionally, the linear filter calculator 111b outputs the information indicating the linear filter to the linear filter multiplier 141b.

The interference calculator 112b receives the modulation symbol $s_1$. The interference calculator 112b multiplies the received modulation symbol $s_1$ by the interference coefficient indicated by the information received from the linear filter calculator 111b, thereby calculating an interference symbol f $(=(r_{12}^*/r_{22}^*)s_1)$. The interference calculator 112b outputs the calculated interference symbol f to the interference subtractor 113b.

The interference subtractor 113b receives the modulation symbol $s_2$. The interference subtractor 113b subtracts from the received modulation symbol $s_2$, the interference symbol f received from the interference calculator 112b. The interference subtractor 113b outputs to the modulo arithmetic switch unit 121b, the interference cancelled symbol $s_2-f$ resulting from the subtraction.

The modulo arithmetic switch determining unit 114b (modulo switch determining unit) squares the interference coefficient received from the linear filter calculator 111b, thereby calculating the interference power P expressed by the following formula (7).

[Formula 7]

$$P=\|r_{12}^*/r_{22}^*\|^2 \quad (7)$$

If the calculated interference power P is larger than a predetermined threshold $P_0$, the modulo arithmetic switch determining unit 114b determines to perform the modulo arithmetic. In this case, the modulo arithmetic switch determining unit 114b outputs to the transmission mode information inserter 131b and the modulo arithmetic switch unit 121b, transmission mode information indicating that the modulo arithmetic is to be performed (transmission mode 1).

On the other hand, if the interference power P is equal to or smaller than the predetermined threshold $P_0$, the modulo arithmetic switch determining unit 114b determines not to perform the modulo arithmetic. In this case, the modulo arithmetic switch determining unit 114b outputs to the transmission mode information inserter 131b and the modulo arithmetic switch unit 121b, transmission mode information indicating that the modulo arithmetic is not to be performed (transmission mode 2).

If the transmission mode information received from the modulo arithmetic switch determining unit 114b indicates the transmission mode 1, the modulo arithmetic switch unit 121b outputs to the modulo arithmetic unit 122b, the interference cancelled symbol $s_2-f$ received from the interference subtractor 113b.

On the other hand, if the transmission mode information received from the modulo arithmetic switch determining unit 114b indicates the transmission mode 2, the modulo arithmetic switch unit 121b outputs to the transmission mode information inserter 131b, the interference cancelled symbol $s_2-f$ received from the interference subtractor 113b.

The modulo arithmetic unit 122b (modulo arithmetic unit) performs the modulo arithmetic on the interference cancelled symbol $s_2-f$ received from the modulo arithmetic switch unit 121b. The modulo arithmetic is expressed by the following formula (8).

[Formula 8]

$$x' = \mathrm{Mod}_\tau(x) = x - \mathrm{floor}\left(\frac{\mathrm{Re}(x) + \frac{\tau}{2}}{\tau}\right)\tau - j \cdot \mathrm{floor}\left(\frac{\mathrm{Im}(x) + \frac{\tau}{2}}{\tau}\right)\tau \qquad (8)$$

Here, the $\mathrm{Mod}_\tau(x)$ denotes the modulo arithmetic. x denotes a modulation symbol to be subjected to the modulo arithmetic. x' denotes a modulation symbol resulting from the modulo arithmetic. Additionally, j denotes an imaginary unit. Re(x) denotes a real part of x. Im(x) denotes an imaginary part of x. Further, floor(x) denotes the maximum integer that does not exceed x.

The modulo arithmetic unit 122b outputs to the transmission mode information inserter 131b, the modulo symbol $s_2'$ ($\mathrm{Mod}_\tau(s_2-f)$) resulting from the arithmetic.

The transmission mode information inserter 131b modulates the transmission mode information received from the modulo arithmetic switch determining unit 114b. The transmission mode information inserter 131b arranges in time order indicated by the mapping information, the modulo symbol $s_2'$ received from the modulo arithmetic unit 122b or the interference cancelled symbol $s_2-f$ received from the modulo arithmetic switch unit 121b, and the modulation symbol of the modulated transmission mode information (symbol stream addressed to the terminal device MT2). Additionally, the transmission mode information inserter 131b arranges in time order indicated by the mapping information, the modulation symbol $s_3$ received from the modulator b121, and the modulation symbol of the transmission mode information indicating the transmission mode 2 (symbol stream addressed to the terminal device MT1). The transmission mode information inserter 131b outputs to the DRS inserter 133b, the arranged symbol stream for each terminal device m1.

The DRS generator 132b generates a dedicated reference symbol for each terminal device m1 (the terminal devices MT1 and MT2 in the first embodiment). The DRS generator 132b outputs to the DRS inserter 133b, the generated dedicated reference symbol for each terminal device m1.

The DRS inserter 133b inserts the dedicated reference symbol for each terminal device m1 which is received from the DRS generator 132b, into the symbol stream addressed to that terminal device m1 which is received from the transmission mode information inserter 131b. Here, the DRS inserter 133b inserts the dedicated reference symbol at the time indicated by the mapping information.

The DRS inserter 133b outputs to the linear filter multiplier 141b, the symbol stream (frame) for each terminal device m1 into which the dedicated reference symbol is inserted.

The linear filter multiplier 141b generates a vector by combining a symbol $S_1$ and a symbol $S_2$ that are to be transmitted at the same time. The symbol $S_1$ is the symbol stream addressed to the terminal device MT1 which is received from the DRS inserter 133b. The symbol $S_2$ is the symbol stream addressed to the terminal device MT2 which is received from the DRS inserter 133b. The linear filter multiplier 141b multiplies the generated vector by the linear filter indicated by the information received from the linear filter calculator 111b. The symbols $S_1''$ and $S_2''$ multiplied by the linear filter are expressed by the following formula (9),

[Formula 9]

$$\begin{pmatrix} S_1'' \\ S_2'' \end{pmatrix} = Q \begin{pmatrix} S_1 \\ S_2 \end{pmatrix} \qquad (9)$$

The linear filter multiplier 141b outputs to the frame selector b14, a symbol stream including the symbol $S_1''$ and a symbol stream including the symbol $S_2''$ as the symbol streams to be transmitted from the antenna b101 and b102, respectively.

<Regarding Wireless Signal>

Figure 4:
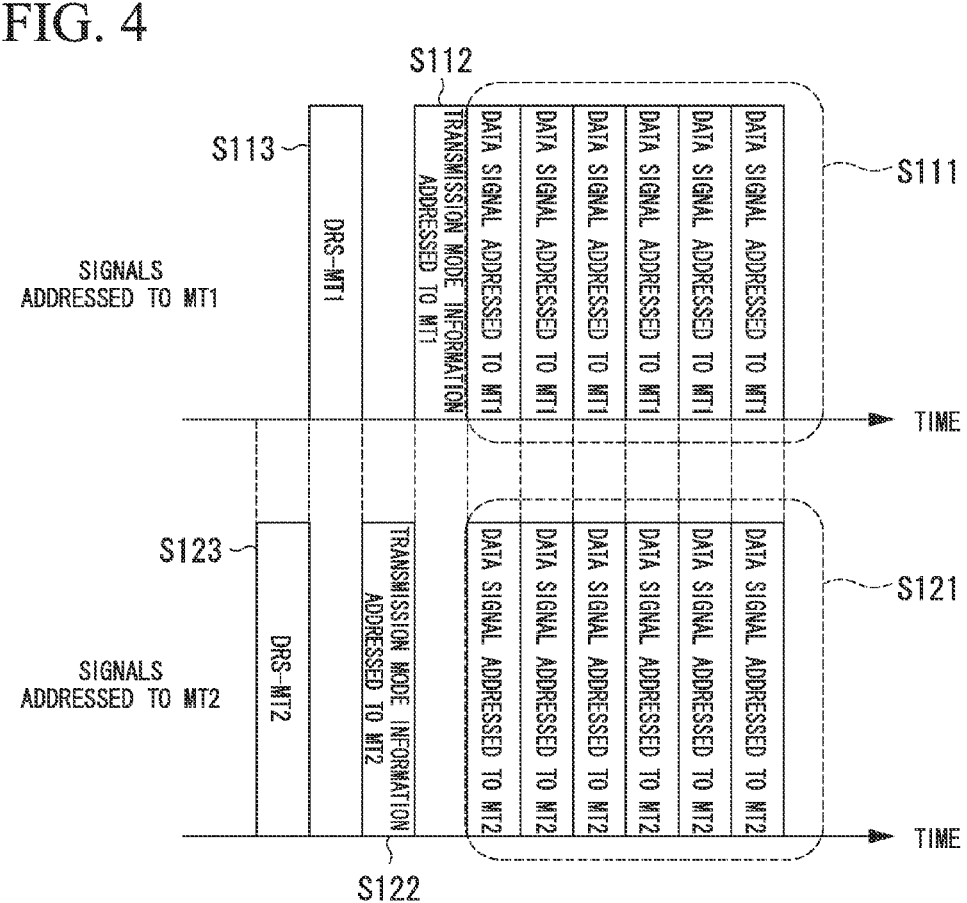
FIG. 4 is a schematic block diagram illustrating an example of wireless signals to be transmitted by the base station device according to the first embodiment.

FIG. 4 is a schematic diagram illustrating an example of wireless signals to be transmitted by the base station device b1 according to the first embodiment. In this drawing, a horizontal axis denotes a time axis. Additionally, this drawing shows wireless signals transmitted in the same frequency band, in a manner such that the wireless signals addressed to one terminal device are separated from wireless signals addressed to another terminal device (the wireless signals addressed to the terminal device MT1 and the wireless signals addressed to the terminal device MT2).

In FIG. 4, the wireless signals addressed to the terminal device MT1 include: signals S111 of the modulation symbol $s_1$ (data signals addressed to MT1); a signal S112 of the transmission mode information (transmission mode 2 in the first embodiment) addressed to the terminal device MT1; and a signal S113 of the dedicated reference symbol (DRS-MT1) addressed to the terminal device MT1.

Additionally, the wireless signals addressed to the terminal device MT2 include: signals S121 of the modulo symbol $s_2'$ or the interference cancelled symbol $s_2-f$ (data signals addressed to MT2); a signal S122 of the transmission mode information addressed to the terminal device MT2; and the signal S123 (DRS-MT2) of the dedicated reference symbol addressed to the terminal device MT2.

FIG. 4 shows that the signals S111 and S121 are transmitted at the same time, in other words, are spatially multiplexed. Additionally, FIG. 4 shows that no signal is transmitted at the same time with any of the signals S112, S113, S122, and S123, in other words, the signals S112, S113, S122, and S123 are time-division-multiplexed.

Figure 5:
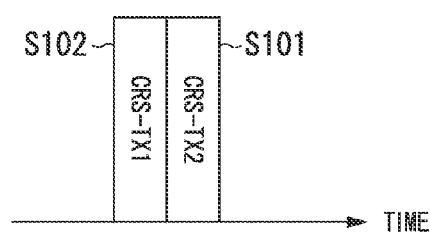
FIG. 5 is a schematic diagram illustrating another example of wireless signals to be transmitted by the base station device according to the first embodiment.

FIG. 5 is a schematic diagram illustrating another example of wireless signals to be transmitted by the base station device b1 according to the first embodiment. This drawing is a schematic diagram illustrating an example of wireless signals including the CRS for the terminal device m1 to perform channel estimation.

The base station device b1 transmits the wireless signals shown in FIG. 5. Thereafter, the base station device b1 transmits the wireless signals shown in FIG. 4. In FIG. 5, a horizontal axis denotes a time axis. Additionally, this drawing shows signals S101 and S102 of the common reference symbols (CRS-TX1, CRS-TX2) among the wireless signals transmitted in the same frequency band.

<Regarding Terminal Device m1>

Figure 6:
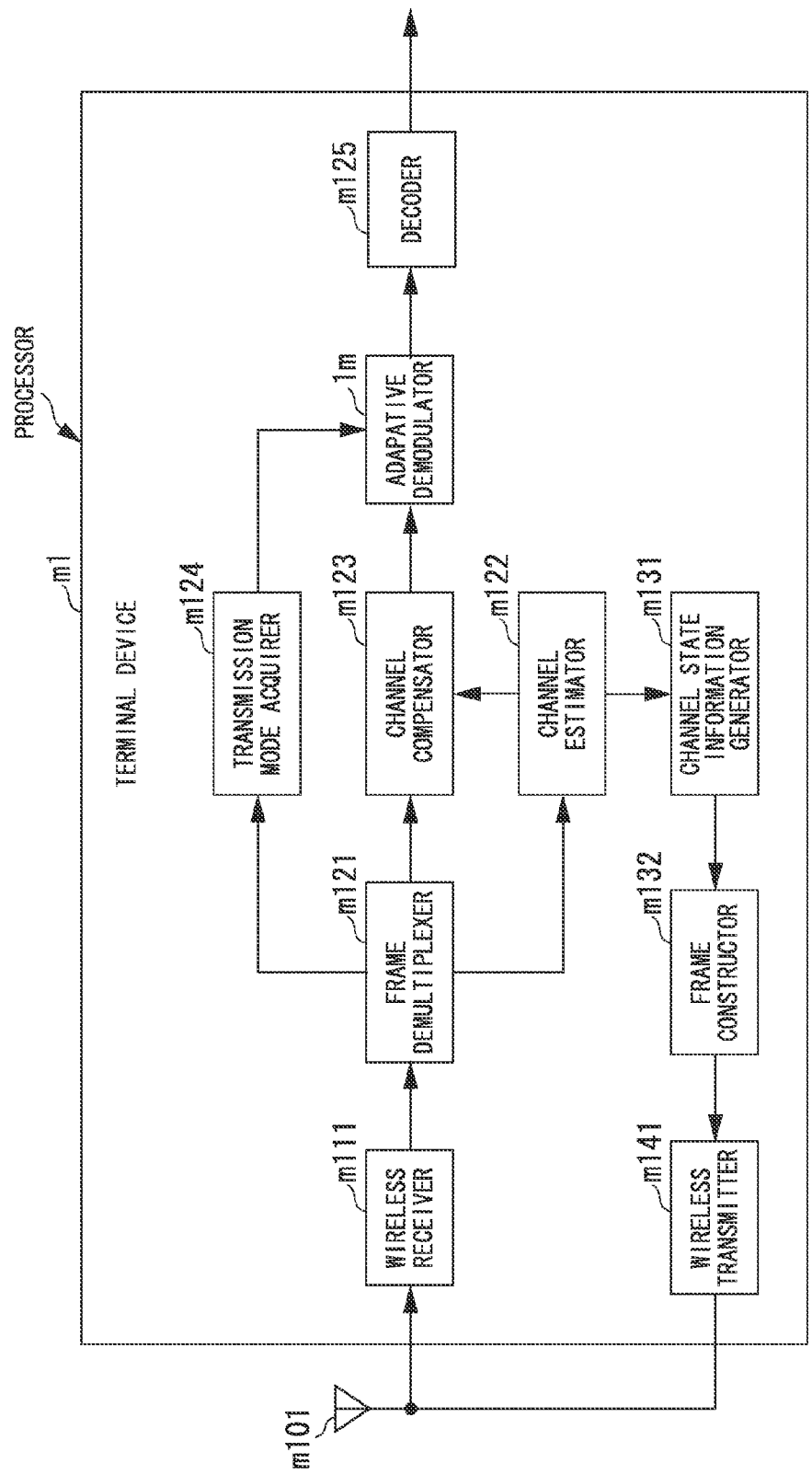
FIG. 6 is a schematic block diagram illustrating a configuration of a terminal device according to the first embodiment.

FIG. 6 is a schematic block diagram illustrating a configuration of the terminal device m1 according to the first embodiment. This drawing is a diagram illustrating a case in which the terminal device m1 includes one antenna.

In FIG. 6, the terminal device m1 includes: an antenna m101; a wireless receiver m111; a frame demultiplexer m121; a channel estimator m122; a channel compensator m123; a transmission mode acquirer m124; an adaptive demodulator 1m; a decoder m125; a channel state information generator m131; a frame constructor m132; and a wireless transmitter m141.

The wireless receiver m111 receives via the antenna m101, wireless signals transmitted from the base station device b1. The wireless receiver m111 downconverts the received wireless signals into baseband signals, and then performs analog-to-digital conversion on the downconverted signals. The wireless receiver m111 outputs the converted signals to the frame demultiplexer m121.

Based on mapping information preliminarily reported from the base station device b1, the frame demultiplexer m121 demultiplexes signals addressed to the terminal device m1 from the signals received from the wireless receiver m111.

From among the demultiplexed signals, the frame demultiplexer m121 outputs to the channel estimator m122, a signal of the common reference symbol and a signal of the dedicated reference symbol addressed to the terminal device m1. Additionally, the frame demultiplexer m121 outputs to the channel compensator m123, data signals addressed to the terminal device m1 (the signals S111 and S121 in the case of FIG. 4), from among the demultiplexed signals.

For example, a reception symbol $y_L$ of the data signal addressed to the terminal device MT1, and a reception symbol $y_2$ of the data signal addressed to the terminal device MT2, are expressed by the following formulas (10) or (11).

[Formula 10]

$$\begin{pmatrix} y_1 \\ y_2 \end{pmatrix} = H \begin{pmatrix} S_1'' \\ S_2'' \end{pmatrix} = R^H \begin{pmatrix} S_1 \\ S_2 \end{pmatrix} = \begin{pmatrix} r_{11}^* S_1 \\ r_{12}^* S_1 + r_{22}^* \times \text{Mod}_r(S_2 - (r_{12}^*/r_{22}^*)S_1) \end{pmatrix} \quad (10)$$

or $$\begin{pmatrix} y_1 \\ y_2 \end{pmatrix} = H \begin{pmatrix} S_1'' \\ S_2'' \end{pmatrix} = \begin{pmatrix} r_{11}^* S_1 \\ r_{22}^* S_2 \end{pmatrix} \quad (11)$$

Here, the formula (10) corresponds to the case in which the transmission mode information for the terminal device MT2 indicates "transmission mode 1," and the formula (11) corresponds to the case in which the transmission mode information for the terminal device MT2 indicates "transmission mode 2." The formula (10) indicates that the symbols $S_1$ and $S_2$ are multiplied by the linear filter, and thereby the reception symbols $y_1$ and $y_2$ become symbols when the channel matrix is a matrix $R^H$.

Additionally, the frame demultiplexer m121 outputs to the transmission mode acquirer m124, a signal of the transmission mode information from among the demultiplexed signals.

The channel estimator m122 estimates channel states of channels from the respective antennas of the base station device b1, based on the signal of the common reference symbol and the signal of the dedicated reference symbol which are received from the frame demultiplexer m121. The channel estimator m122 outputs to the channel state information generator m131 and the channel compensator m123, the CSI indicating the channel state estimated based on the signal of the common reference symbol and the CSI indicating the channel state estimated based on the signal of the dedicated reference symbol, respectively.

The channel compensator m123 performs channel compensation on the data signals addressed to the terminal device m1 which are received from the frame demultiplexer m121, based on the CSI received from the channel estimator m122. The channel compensator m123 outputs to the adaptive modulator 1m, the data signals addressed to the terminal device m1 which are extracted by performing the channel compensation. For example, a modulation symbol of the data signal addressed to the terminal device MT2 is expressed by $z_2 = y_2 / r_{22}^*$.

The transmission mode acquirer m124 demodulates the signal of the transmission mode information received from the frame demultiplexer m121, thereby acquiring the transmission mode information. The transmission mode acquirer m124 outputs the acquired transmission mode information to the adaptive demodulator 1m.

The adaptive demodulator 1m demodulates the data signals received from the channel compensator m123, based on the transmission mode information received from the transmission mode acquirer m124. The adaptive demodulator 1m outputs the demodulated bits to the decoder m125.

The decoder m125 decodes the bits received from the adaptive demodulator 1m and outputs the decoded bits.

The channel state information generator m131 modulates the CSI received from the channel compensator m123, and outputs the modulated signals to the frame constructor m132.

The frame constructor m132 allocates the signals received from the channel state information generator m131 to a frequency band for transmitting the signals to the base station device b1. The frame constructor m132 outputs to the wireless transmitter m141, the signals allocated to the frequency band in predetermined transmission time unit (frame).

The wireless transmitter m141 performs digital-to-analog conversion on the signals received from the frame constructor m132, and upconverts the signals resulting from the digital-to-analog conversion into carrier frequency signals. The wireless transmitter m141 transmits the upconverted wireless signals via the antenna m101.

Figure 7:
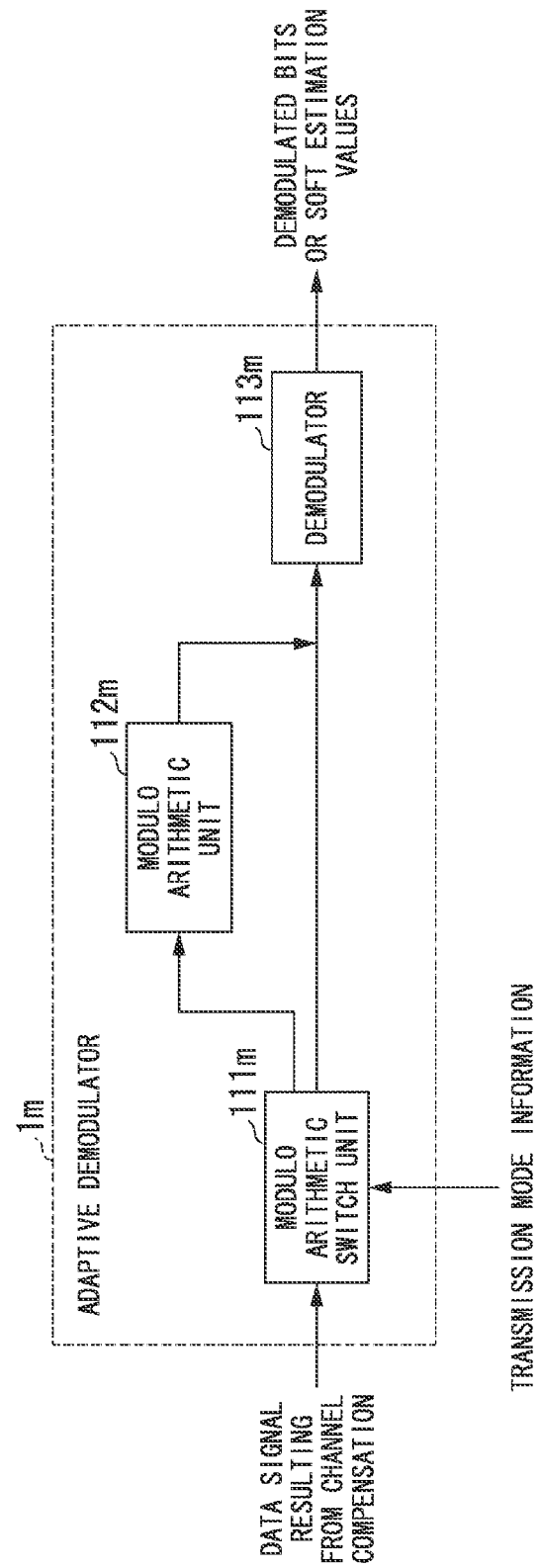
FIG. 7 is a schematic block diagram illustrating a configuration of an adaptive demodulator according to the first embodiment.

FIG. 7 is a schematic block diagram illustrating a configuration of the adaptive demodulator 1m according to the first embodiment. This drawing shows a configuration of the adaptive demodulator 1m shown in FIG. 6. In this drawing, the adaptive demodulator 1m includes: a modulo arithmetic switch unit 111m; a modulo arithmetic unit 112m; and a demodulator 113m.

The modulo arithmetic switch unit 111m receives the data signals and the transmission mode information. If the received transmission mode information indicates the "transmission mode 1," the modulo arithmetic switch unit 111m outputs the received data signals to the modulo arithmetic unit 112m. On the other hand, if the received transmission mode information indicates the "transmission mode 2," the modulo arithmetic switch unit 111m outputs the received data signals to the demodulator 113m.

The modulo arithmetic unit 112m performs the modulo arithmetic on the modulation symbol $z_2$ of the data signals received from the modulo arithmetic switch unit 111m, and thereby extracts the desired symbol $s_2$ (see the formula (5)). The modulo arithmetic unit 112m outputs the data signal corresponding to the extracted desired symbol $s_2$ to the demodulator 113m.

The demodulator 113m demodulates the data signal received from the modulo arithmetic unit 112m. The demodulator 113m outputs the demodulated bits (result of hard decision) or soft estimation values (result of soft estimation).

Thus, according to the first embodiment, in the ease of the "transmission mode 1," the multiplexed signal generator 1b multiplexes the signal which has been subjected to the modulo arithmetic and is addressed to the terminal device MT2, and the signal which is not subjected to the modulo arithmetic and is addressed to the terminal device MT1. Additionally, the transmission mode acquirer m124 acquires the transmission mode information from the received signal, and determines whether the received signal is the signal addressed to the terminal device which has been subjected to the modulo arithmetic or the signal addressed to the terminal device which has not been subjected to the modulo arithmetic. Based on the result of the determination, the adaptive demodulator 1m performs the modulo arithmetic on the signal to demodulate the signal. Thereby, in the first embodiment, the wireless communication system can multiplex a signal having the small interference power and a signal having the large interference power while performing the modulo arithmetic on the signal having the large interference power, and not performing the modulo arithmetic on the signal having the small interference power. In other words, in the first embodiment, the wireless communication system can prevent reception candidate points from increasing in number, which causes a reduction in the signal detection performance. Further, the wireless communication system can perform communication with high power efficiency, thereby enhancing the propagation performance.

Particularly, in the wireless communication system according to the first embodiment, an interference signal with respect to the signal addressed to the terminal device MT1 is cancelled by multiplying the linear filter. For this reason, the interference signal with respect to the signal addressed to the terminal device MT2 becomes large in some cases. According to the first embodiment, however, the modulo arithmetic is performed if the interference signal becomes large, thereby reducing the transmission power and enabling communication with high power efficiency.

Additionally, in the first embodiment, the multiplexed signal generator 1b calculates the interference power of interference caused by the signal addressed to the terminal device MT1, based on the channel state information of the channels from the multiple respective terminal devices MT1 and MT2. Further, the multiplexed signal generator 1b determines to perform the modulo arithmetic if the calculated interference power P is larger than the threshold $P_0$. Meanwhile, the multiplexed signal generator 1b determines not to perform the modulo arithmetic if the calculated interference power P is equal to or smaller than the threshold $P_0$. Thereby, in the first embodiment, the wireless communication system can prevent reception candidate points from increasing in number, which causes a degradation in the signal detection performance. Further, the wireless communication system can perform communication with high power efficiency, thereby enhancing the propagation performance.

Second Embodiment

Hereinafter, a second embodiment of the present invention is explained in detail with reference to the drawings.

The above first embodiment has been explained with respect to the case where the base station device B transmits signals to two terminal devices MT1 and MT2. The second embodiment is explained with respect to a case where a base station device transmits signals to N terminal devices.

<Regarding Wireless Communication System>

Figure 8:
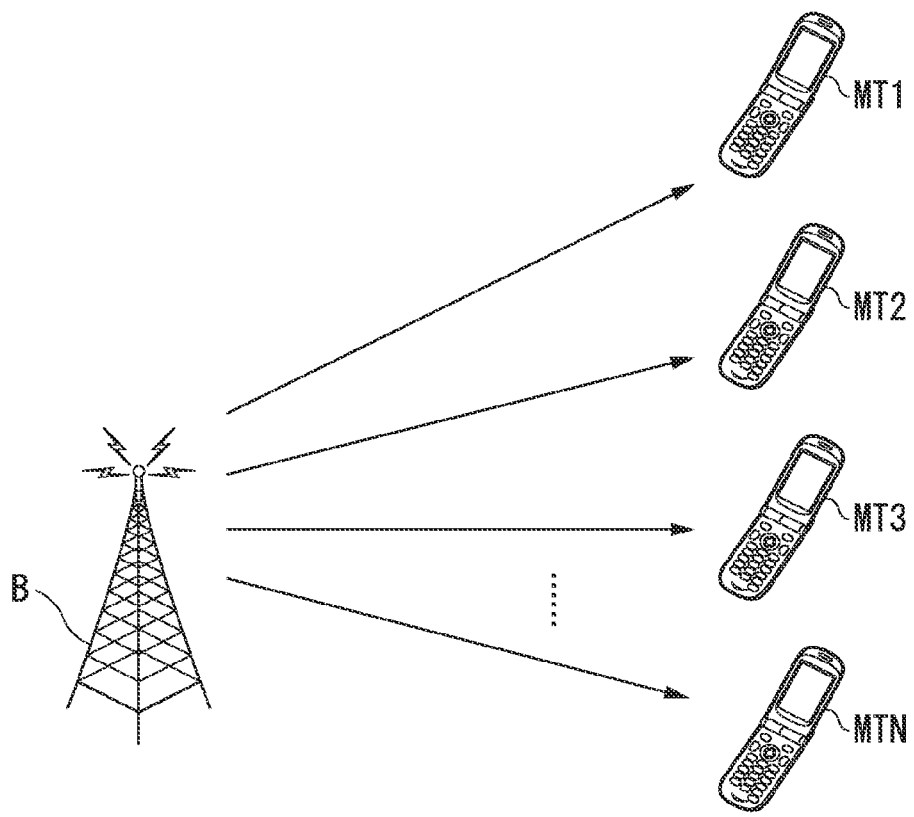
FIG. 8 is a schematic block diagram illustrating a wireless communication system according to a second embodiment of the present invention.

FIG. 8 is a schematic diagram illustrating a wireless communication system according to a second embodiment of the present invention. In this drawing, the base station device B transmits signals to N terminal devices MT1 to MTN.

Hereinafter, the base station device is referred to as a base station device b2. Each of the terminal device MTk (k=1 to N; k is referred to as the terminal number) has the same configuration as that of the terminal device m1 of the first embodiment (shown in FIGS. 6 and 7), and therefore explanations thereof are omitted here. However, the terminal device m1 according to the second embodiment performs channel compensation based on channel state information of channels from N antennas of the base station device B.

<Regarding Base Station Device b2>

Figure 9:
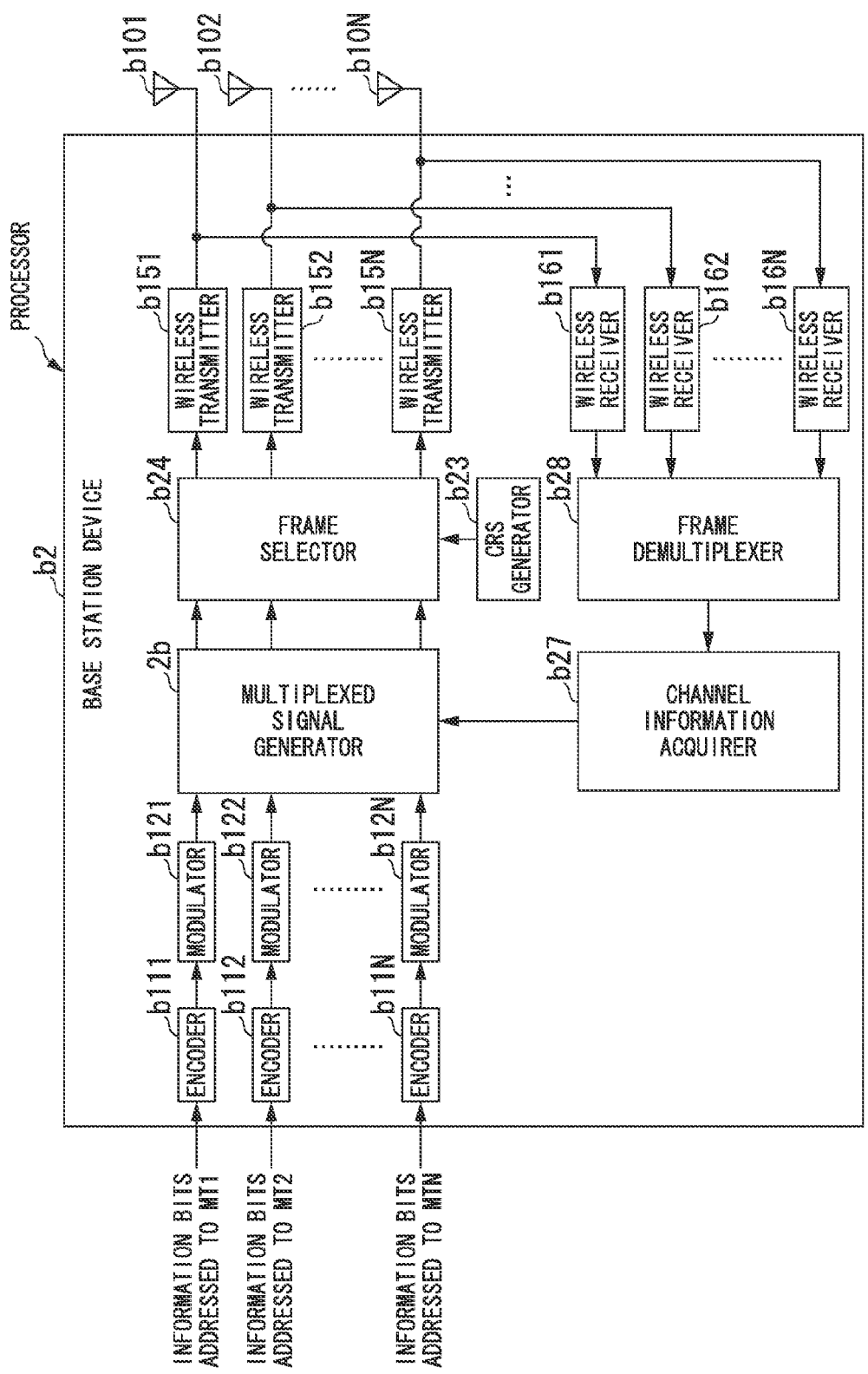
FIG. 9 is a schematic block diagram illustrating a base station device according to the second embodiment.

FIG. 9 is a schematic block diagram illustrating a base station device b2 according to the second embodiment. This drawing is a diagram illustrating a case where the base station device b2 includes N antennas that transmit signals addressed to respective terminal devices, using the same frequency band.

In FIG. 9, the base station device b2 includes: encoders b111 to b11N; modulators b121 to b12N; a multiplexed signal generator 2b; a CRS generator b23; a frame selector b24; wireless transmitters b151 to b15N; antennas b101 to b10N; wireless receivers b161 to b16N; a frame demultiplexer b28; and a channel information acquirer b27.

The encoder b11k receives information bits addressed to the terminal device MTk. The encoder b11k performs error correction coding on the input information bits, and outputs the results respectively to the modulators b12k.

The modulator b12k modulates the input bits and outputs the modulated modulation symbols $s_k$ to the multiplexed signal generator 2b.

The multiplexed signal generator 2b calculates an interference symbol $f_k$ which arises to the wireless signal addressed to the terminal device MTk, based on CSI received from the channel information acquirer b27. The multiplexed signal generator 2b subtracts the calculated interference symbol $f_k$ from the modulation symbol $s_k$ received from the modulator b12k.

Additionally, the multiplexed signal generator 2b generates a dedicated reference symbol for each terminal device m1.

Based on the CSI received from the channel information acquirer b27, the multiplexed signal generator 2b determines, for each terminal device MTk, whether or not to perform the modulo arithmetic. If it is determined to perform the modulo arithmetic, the multiplexed signal generator 2b allocates, based on mapping information preliminarily determined, a modulo symbol $s_k'$ resulting from the modulo arithmetic, a modulation symbol of transmission mode information indicating that the modulo arithmetic is to be performed on the symbols addressed to the terminal device MTk (transmission mode 1), and the dedicated reference symbol. The multiplexed signal generator 2b multiplies the symbols of the allocated symbol stream by a linear filter, and outputs the result to the frame selector b24.

On the other hand, if it is determined not to perform the modulo arithmetic, the multiplexed signal generator 2b allocates, based on the mapping information preliminarily determined, an interference cancelled symbol $s_k-f_k$, a modulation symbol of transmission mode information indicating that the modulo arithmetic is not to be performed on the symbols addressed to the terminal device MTk (transmission mode 2), and the dedicated reference symbol. The multiplexed signal generator 2b multiplies the symbols of the allocated symbol stream by the linear filter, and outputs the result to the frame selector b24.

The CRS generator b23 generates a common reference symbol (CRS) for each antenna, and outputs the generated common reference symbol to the frame selector b24.

According to the mapping information, the frame selector b24 allocates to a predetermined frequency band, the common reference symbol for the antenna b10k, which is received from the CRS generator b23.

Additionally, according to the mapping information, the frame selector b24 allocates the symbol streams addressed to the terminal devices MT1 to MTN which are received from the multiplexed signal generator 2b and result from the multiplication by the linear filter, to a frequency band used for transmission to the terminal devices MT1 to MTN. The frame selector b24 outputs to the wireless transmitters b151 to b15N, the signals allocated to the frequency band in predetermined transmission time unit (frame).

The wireless transmitter b15k receives from the frame selector b24, the signal for each antenna b10k. The wireless transmitter b15k performs digital-to-analog conversion on the input signals, and upconverts the signals resulting from the digital-to-analog conversion into carrier frequency signals. The wireless transmitter b15k transmits the upconverted wireless signals via the antenna b10k.

The wireless receiver b16k receives wireless signals transmitted from the terminal device MTk via the antenna b10k. The wireless receiver b16k downconverts the received wireless signals into baseband signals, and performs analog-to-digital conversion on the downconverted signals. The wireless receiver b16k outputs the signals resulting from the analog-to-digital conversion to the frame demultiplexer b28.

The frame demultiplexer b28 demultiplexes the signals received from the wireless receiver b16k for each terminal device MTk that is the transmission source. The frame demultiplexer b28 outputs the demultiplexed CSI for each terminal device MTk to the channel information acquirer b27.

The channel information acquirer b27 demodulates the signals received from the frame demultiplexer b28. The channel information acquirer b27 extracts from the demodulated information, the CSI estimated by the terminal device MTk. The CSI indicates the state of the channel between each terminal device MTk and each antenna b10k of the base station device. The channel information acquirer b27 outputs the extracted CSI to the multiplexed signal generator 2b.

Figure 10:
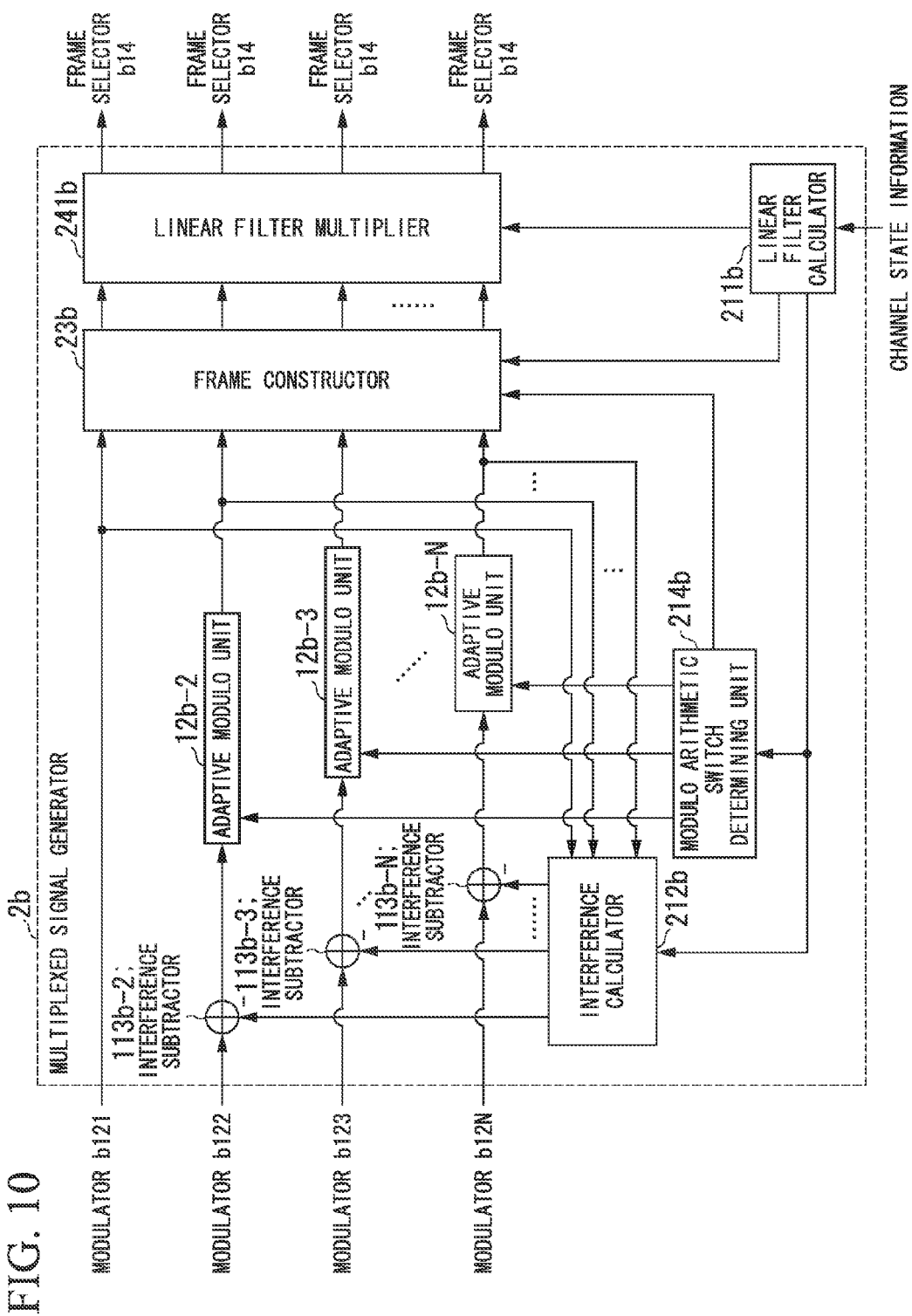
FIG. 10 is a schematic block diagram illustrating a multiplexed signal generator according to the second embodiment.

FIG. 10 is a schematic block diagram illustrating a configuration of the multiplexed signal generator 2b according to the second embodiment. In this drawing, the multiplexed signal generator 2b includes: a linear filter calculator 211b; an interference calculator 212b; interference subtractors 113b-2 to 113b-N; a modulo arithmetic switch determining unit 214b; adaptive modulo units 12b-2 to 12b-N; a frame constructor 23b; and a linear filter multiplier 241b.

The linear filter calculator 211b receives the CSI. The linear filter calculator 211b generates a channel matrix H from the received CSI. Here, an element $h_{pq}$ in the p-th row and the q-th column of the channel matrix H (p=1 to N, q=1 to N) is a channel estimation value of the channel between the antenna b10q (q=1 to N) and the terminal device MTp (p=1 to N).

The linear filter calculator 211b performs QR decomposition on a matrix $H^H$ that is an Hermitian conjugate of the generated channel matrix H to calculate a linear filter (matrix Q). Additionally, the linear filter calculator 211b extracts diagonal elements from a matrix $R^H$ that is an Hermitian conjugate of the calculated matrix R to generate a diagonal matrix A. The linear filter calculator 211b calculates an interference coefficient matrix $B=A^{-1}R^H-I$. Here, $A^{-1}$ denotes an inverse matrix of A. I denotes a unit matrix. In a process of calculating the interference coefficient matrix B, $R^H$ ($r_{22}$* in the first embodiment) is multiplied by $A^{-1}$ to calculate an interference element included in the signal resulting from the channel compensation performed by the terminal device MTk. I is subtracted from $A^{-1}R^H$ to cancel an element of the data signal addressed to the terminal device MTk.

The linear filter calculator 211b sets the (1, x) element of the calculated interference coefficient matrix B to be an interference coefficient $B_{1x}$, and outputs information indicating that interference coefficient to the interference calculator 212b and the modulo arithmetic switch determining unit 214b. Additionally, the linear filter calculator 211b outputs information indicating the linear filter to the linear filter multiplier 241b.

The interference calculator 212b receives the modulation symbol $s_1$ (denoted as transmission data symbol $v_1$) from the modulator b121 and receives the interference cancelled symbol $s_k - f_k$ or the modulo symbol $s_k'$ (=Mod$_r(s_k - f_k)$) (k=2, 3, ..., N) from the adaptive modulo unit 12b-k. Here, the symbol received from the adaptive modulo unit 12b-k is denoted as a transmission symbol $v_k$.

Based on the information received from the linear filter calculator 211b and the received symbol, the interference calculator 212b calculates the interference symbol $f_k$ expressed by the following formula (12).

[Formula 11]

$$f_k = \sum_{l=1}^{N} B_{kl}v_l = \sum_{l=1}^{k-1} B_{kl}v_l \quad (12)$$

The interference calculator 212b outputs the calculated interference symbol $f_k$ respectively to the interference subtractor 113b-k.

The interference subtractor 113b-k (k=2, 3, ..., N) receives a modulation symbol $s_k$ from the modulator b12k, respectively. The interference subtractor 113b-k subtracts from the received modulation symbol $s_k$, the interference symbol $f_k$ received from the interference calculator 212b. The interference subtractor 113b-k outputs to the adaptive modulo unit 12b-k, the interference cancelled symbol $s_k - f_k$ resulting from the subtraction.

The modulo arithmetic switch determining unit 214b receives information indicating the interference coefficient from the linear filter calculator 211b. Based on the interference coefficient indicated by the information received from the linear filter calculator 211b, the modulo arithmetic switch determining unit 214b calculates the interference power $P_k$ expressed by the following formula (13) (referred to as an interference power calculation process).

[Formula 12]

$$P_k = \sum_{l=1}^{N} \|B_{kl}\|^2 T_l = \sum_{l=1}^{k-1} \|B_{kl}\|^2 T_l \quad (13)$$

Figure 14:
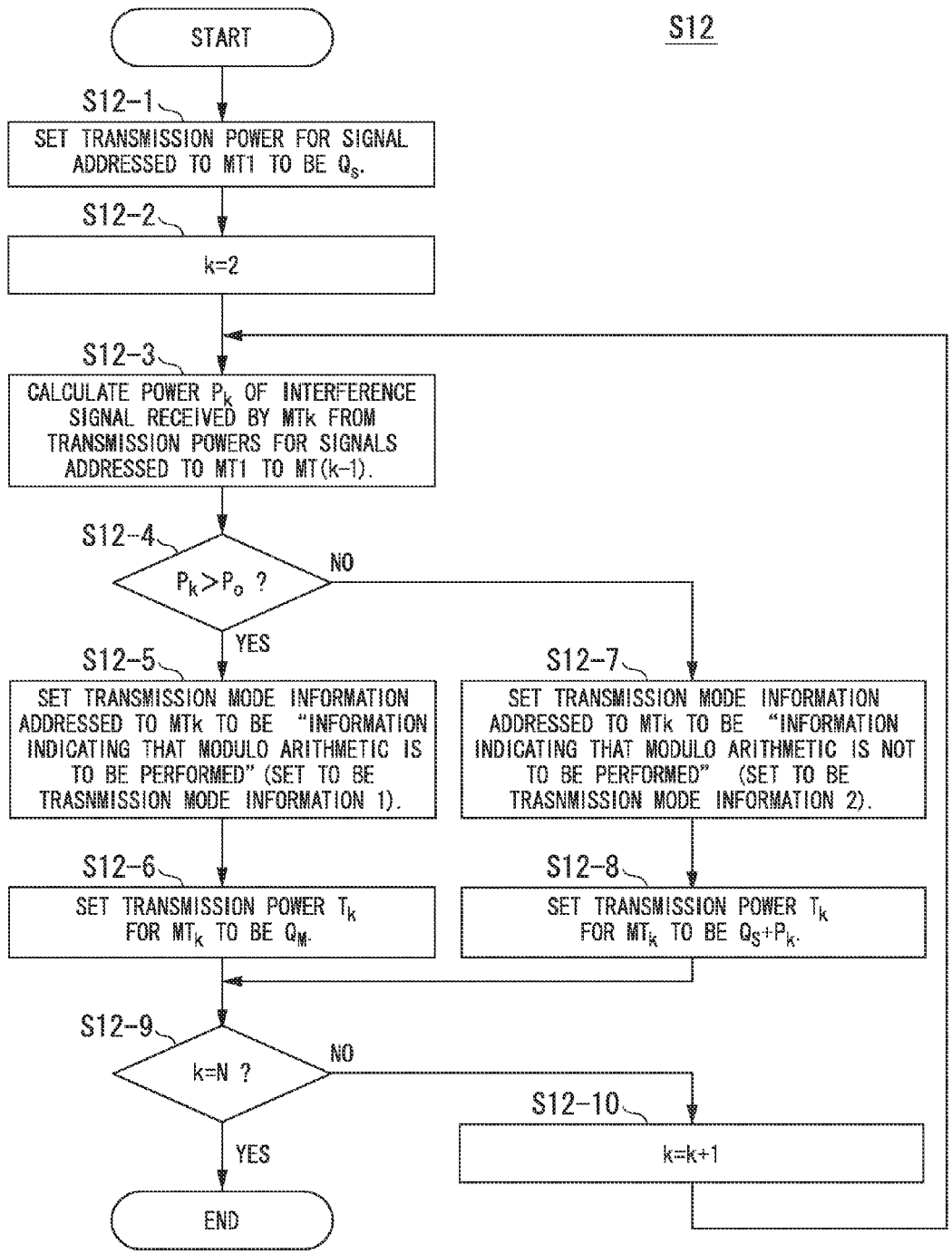
FIG. 14 is a flowchart illustrating an example of operation of an interference power calculation process according to the second embodiment.

$T_1$ will be explained later together with operation of the interference power calculation process (FIG. 14).

If the calculated interference power $P_k$ is larger than a predetermined threshold $P_0$, the modulo arithmetic switch determining unit 214b determines to perform the modulo arithmetic on the symbol stream addressed to the terminal device MTk. In this case, the modulo arithmetic switch determining unit 214b outputs to the frame constructor 23b and the adaptive modulo unit 12b-k, transmission mode information addressed to the terminal device MTk, which indicates that the modulo arithmetic is to be performed (transmission mode 1).

On the other hand, if the interference power $P_k$ is equal to or smaller than the predetermined threshold $P_0$, the modulo arithmetic switch determining unit 214b determines not to perform the modulo arithmetic. In this case, the modulo arithmetic switch determining unit 214b outputs to the frame constructor 23b and the adaptive modulo unit 12b-k, transmission mode information addressed to the terminal device MTk, which indicates that the modulo arithmetic is not to be performed (transmission mode 2).

If the transmission mode information addressed to the terminal device MTk, which is received from the modulo arithmetic switch determining unit 214b, indicates the "transmission mode 1," the adaptive modulo unit 12b-k (k=2, 3, . . . , N) performs the modulo arithmetic on the interference cancelled symbol $s_k-f_k$ received from the interference subtractor 113b-k (see the formula (8)). The adaptive modulo unit 12b-k sets the modulo symbol $s_k'$ resulting from the arithmetic to be a transmission data symbol $v_k$, and outputs to the frame constructor 23b, the transmission data symbol $v_k$ as symbols addressed to the terminal device MTk.

On the other hand, if the transmission mode information addressed to the terminal device MTk, which is received from the modulo arithmetic switch determining unit 214b, indicates the "transmission mode 2," the adaptive modulo unit 12b-k sets the interference cancelled symbol $s_k-f_k$ received from the interference subtractor 113b-k to be a transmission data symbol $v_k$, and outputs to the frame constructor 23b, the transmission data symbol $v_k$ as symbols addressed to the terminal device MTk.

The frame constructor 23b modulates the transmission mode information received from the modulo arithmetic switch determining unit 214b. Additionally, the frame constructor 23b generates a dedicated reference symbol for each terminal device m1.

The frame constructor 23b arranges, in time order indicated by the mapping information, the data symbol $v_k$ received from the adaptive modulo unit 12b-k, the modulation symbol of the modulated transmission mode information, and the generated dedicated reference symbol addressed to the terminal device MTk (symbol stream addressed to the terminal device MTk). Additionally, the frame constructor 23b arranges, in the time order indicated by the mapping information, the transmission data symbol $v_1$ (=$s_1$) received from the modulator b121, the modulation symbol of the transmission mode information indicating the transmission mode 2, and the generated dedicated reference symbol addressed to the terminal device MT1 (symbol stream addressed to the terminal device MT1).

The frame constructor 23b outputs to the linear filter multiplier 241b, the arranged symbol streams (frames) for each terminal device m1.

The linear filter multiplier 241b multiplies, by the linear filter indicated by the information received from the linear filter calculator 211b, a vector obtained by combining symbols $S_k$ (k=1 to N) to be transmitted at the same time, which are of the symbol stream addressed to the terminal device MTk (k=1 to N) and received from the frame constructor 23b. The symbols $S_k''$ (k=1 to N) multiplied by the linear filter is expressed by the following formula (14).

[Formula 13]

$$\begin{pmatrix} S_1'' \\ S_2'' \\ S_3'' \\ \ldots \\ S_N'' \end{pmatrix} = Q \begin{pmatrix} S_1 \\ S_2 \\ S_3 \\ \ldots \\ S_N \end{pmatrix} \quad (14)$$

The linear filter multiplier 241b outputs to the frame selector b14, a symbol stream including the symbol $S_k''$ as the signals to be transmitted from the antenna b10k.

Figure 11:
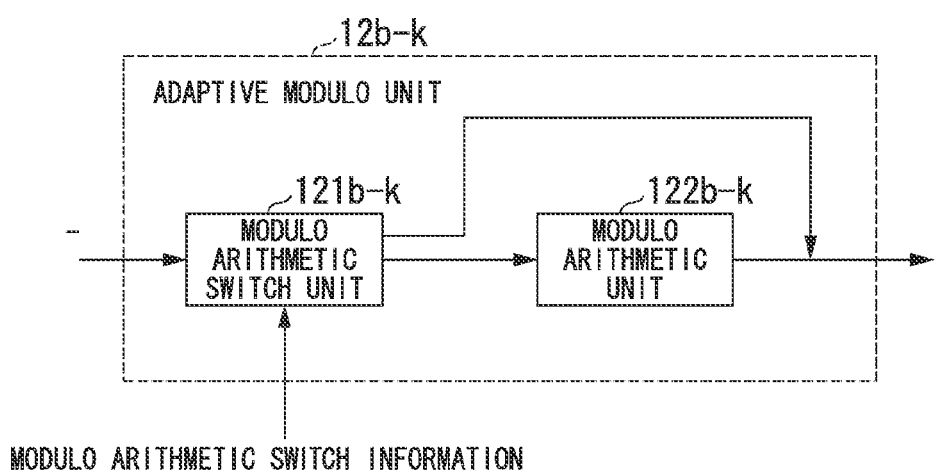
FIG. 11 is a schematic block diagram illustrating a configuration of an adaptive modulo unit according to the second embodiment.

FIG. 11 is a schematic block diagram illustrating a configuration of the adaptive modulo unit 12b-k according to the second embodiment. The adaptive modulo unit 12b-k includes: a modulo arithmetic exchanger 121b-k; and a modulo exchanger 122b-k.

If the transmission mode information addressed to the terminal device MTk, which is received from the modulo arithmetic exchange determining unit 214b, indicates the "transmission mode 1," the modulo arithmetic exchanger 121b-k outputs to the modulo arithmetic unit 122b-k, the interference cancelled symbol $s_k-f_k$ received from the interference subtractor 113b-k.

On the other hand, if the transmission mode information addressed to the terminal device MTk, which is received from the modulo arithmetic switch determining unit 214b, indicates the "transmission mode 2," the modulo arithmetic switch unit 121b-k outputs to the transmission mode information inserter 231b, the interference cancelled symbol $s_k-f_k$ received from the interference subtractor 113b-k.

The modulo arithmetic unit 122b-k performs the modulo arithmetic on the interference cancelled symbol $s_k-f_k$ received from the modulo arithmetic exchanger 121b-k.

Figure 12:
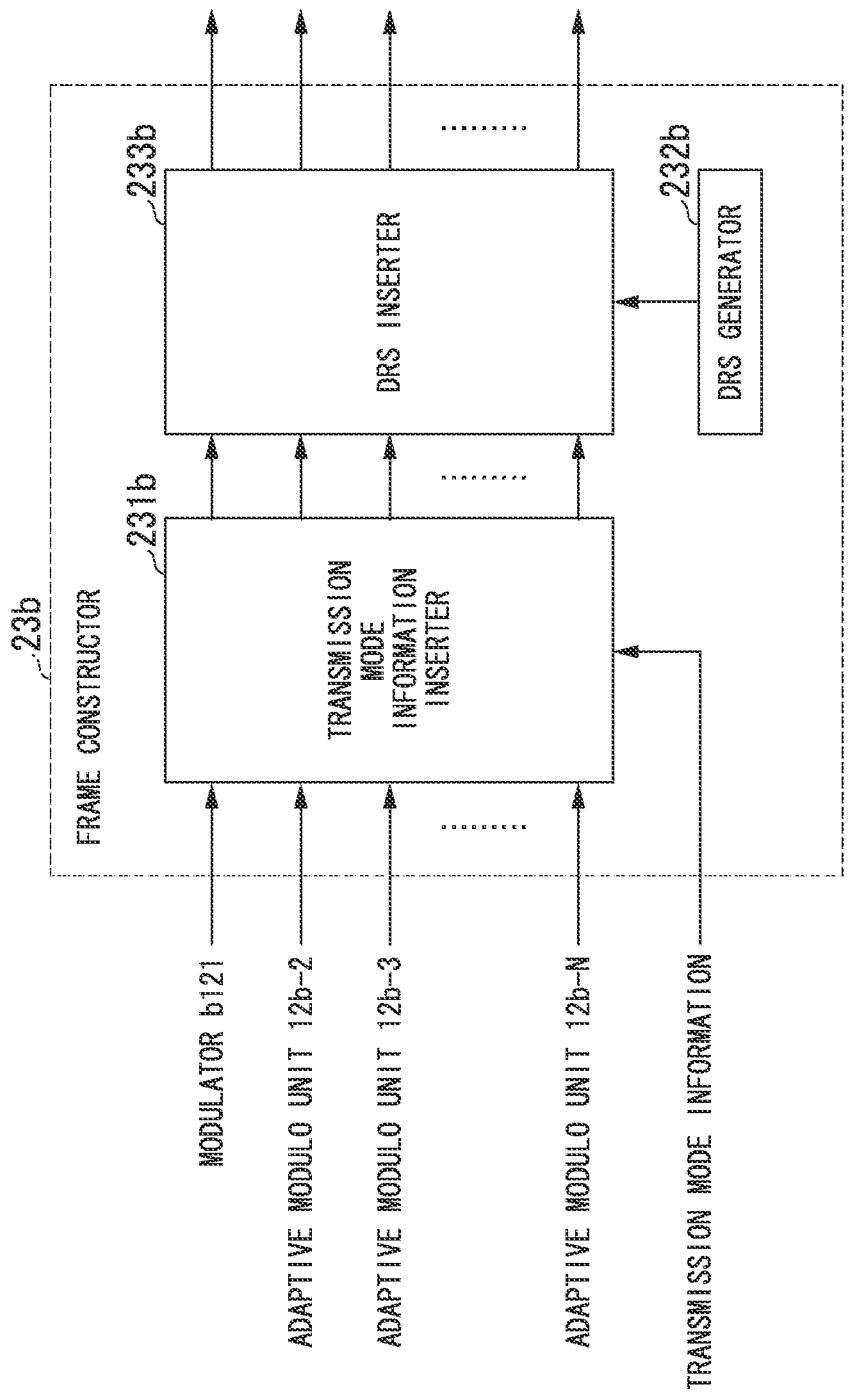
FIG. 12 is a schematic block diagram illustrating a configuration of a frame constructor according to the second embodiment.

FIG. 12 is a schematic block diagram illustrating a configuration of the frame constructor 23b according to the second embodiment. The frame constructor 23b includes: a transmission mode information inserter 231b; a DRS generator 232b; and a DRS inserter 233b.

The transmission mode information inserter 231b modulates the transmission mode information received from the modulo arithmetic switch determining unit 214b. The transmission mode information inserter arranges, in time order indicated by the mapping information, the transmission data symbol $v_k$ received from the modulo arithmetic unit 122b-k (k=2 to N), and the modulation symbol of the modulated transmission mode information (symbol stream addressed to the terminal device MTk). Additionally, the transmission mode information inserter 231b arranges, in time order indicated by the mapping information, the modulation symbol $s_1$ received from the modulator b121, and the modulation symbol of the transmission mode information indicating the transmission mode 2 (symbol stream addressed to the terminal device MT1). The transmission mode information inserter 231b outputs to the DRS inserter 233b, the arranged symbol stream for each terminal device m1.

The DRS generator 232b generates a dedicated reference symbol for each terminal device m1. The DRS generator 232b outputs to the DRS inserter 233b, the generated dedicated reference symbol for each terminal device m1.

The DRS inserter 233b inserts the dedicated reference symbol for each terminal device m1 which is received from the DRS generator 232b, into the symbol stream addressed to that terminal device m1 which is received from the transmission mode information inserter 231b. Here, the DRS inserter 233b inserts the dedicated reference symbol at the time indicated by the mapping information.

The DRS inserter 233b outputs to the linear filter multiplier 241b, the symbol stream (frame) for each terminal device m1 into which the dedicated reference symbol is inserted.

<Operation of Base Station Device b2>

Figure 13:
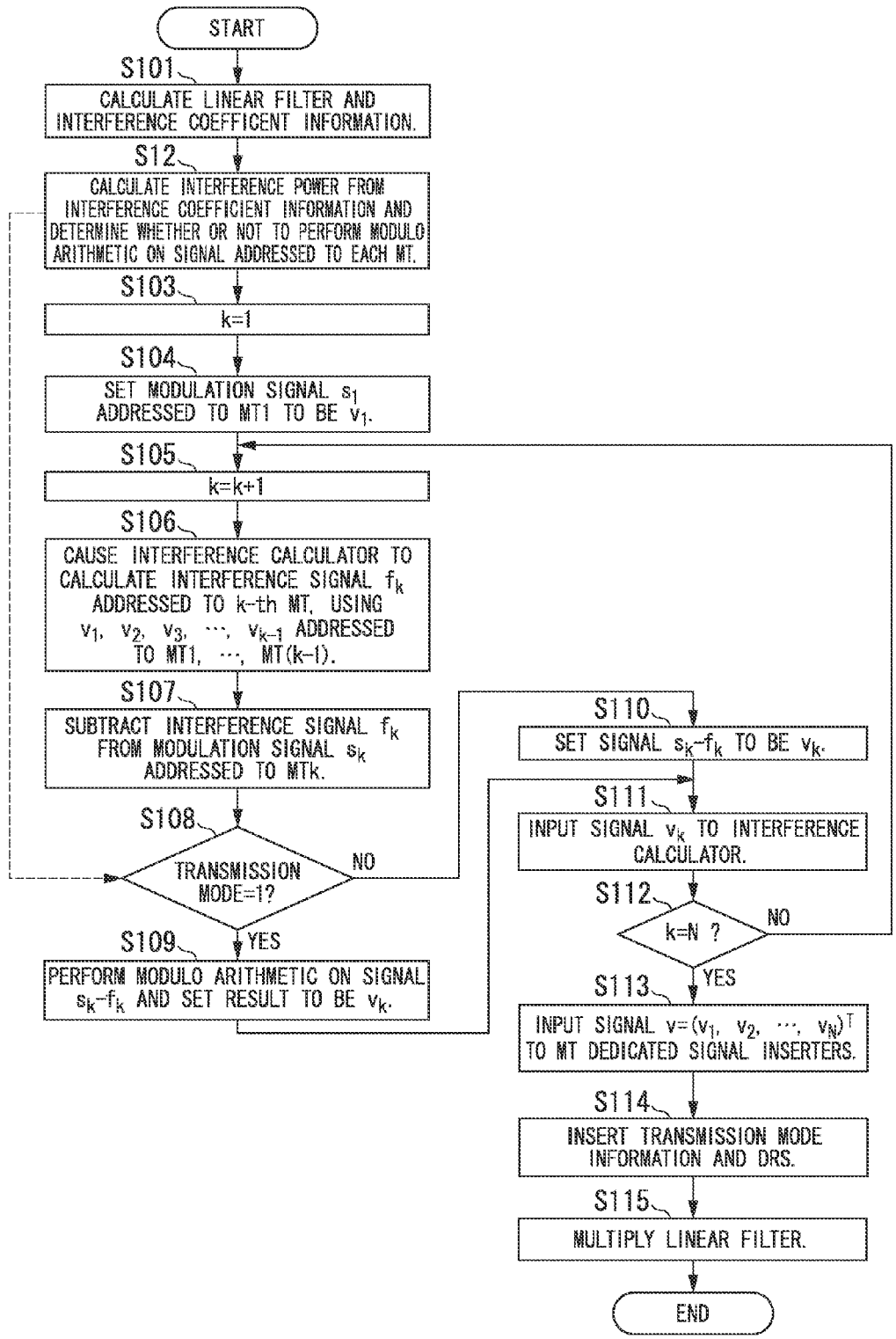
FIG. 13 is a flowchart illustrating operation of the multiplexed signal generator according to the second embodiment.

FIG. 13 is a flowchart illustrating operation of the multiplexed signal generator 2b according to the second embodiment.

(Step S101) The linear filter calculator 211b calculates the linear filter (matrix Q) and the interference coefficient matrix B, and inputs the interference coefficient information to the modulo arithmetic switch determining unit 214b and the interference calculator 212b. Thereafter, the operation proceeds to step S12.

(Step S12) The modulo arithmetic switch determining unit 214b calculates the interference power $P_k$ based on the interference coefficient information, and determines whether or not to perform the modulo arithmetic on the symbols addressed to each terminal device MTk. Additionally, the modulo arithmetic switch determining unit 214b generates transmission mode information indicating the result of the determination. Thereafter, the operation proceeds to step S103.

(Step S103) The interference calculator 212b substitutes 1 in the variable k. Thereafter, the operation proceeds to step S104.

(Step S104) The interference calculator 212b sets the modulation symbol $s_1$ addressed to the terminal device MT1 to be the transmission data symbol $v_1$. Thereafter, the operation proceeds to step S105.

(Step S105) The interference calculator 212b adds 1 to k. Thereafter, the operation proceeds to step S106.

(Step S106) The interference calculator 212b calculates the interference symbol $f_k$ which arises to the wireless signal addressed to the terminal device MTk, using the interference coefficient matrix B calculated in step S101 and the transmission data symbols $v_1$ to $v_{k-1}$ addressed to the terminal devices MT1 to MT(k−1) (see the formula (12)). Thereafter, the operation proceeds to step S107.

(Step S107) The interference subtractor 113b-k subtracts from the modulation symbol $s_k$ addressed to the terminal device MTk, the interference symbol $f_k$ calculated in step S106, thereby calculating the interference cancelled symbol $s_k - f_k$. Thereafter, the operation proceeds to step S108.

(Step S108) The modulo arithmetic switch unit 121b-k determines whether or not the transmission mode information addressed to the terminal device MTk, which is generated in step S12, indicates the "transmission mode 1." If the transmission mode information addressed to the terminal device MTk indicates the "transmission mode 1" (Yes), the operation proceeds to step S109. On the other hand, if the transmission mode information addressed to the terminal device MTk indicates other than the "transmission mode 1" (No), the operation proceeds to step S110.

(Step S109) The modulo arithmetic unit 122b-k performs the modulo arithmetic on the interference cancelled symbol $s_k - f_k$ calculated in step S108. The modulo arithmetic unit 122b-k sets the modulo symbol $s_k'$ resulting from the modulo arithmetic to be the transmission data symbol $v_k$. Thereafter, the operation proceeds to step S111.

(Step S110) The modulo arithmetic unit 122b-k sets the interference cancelled symbol $s_k - f_k$ to be the transmission data symbol $v_k$. Thereafter, the operation proceeds to step S111.

(Step S111) The modulo arithmetic unit 122b-k inputs to the interference calculator 212b, $v_k$ substituted in step S109 or S110. Thereafter, the operation proceeds to step S112.

(Step S112) The interference calculator 212b determines whether or not k=N. If it is determined that k=N (Yes), the operation proceeds to step S113. On the other hand, if it is determined that k≠N (No), the operation returns to step S105.

(Step S113) The frame constructor 23b receives the transmission data symbols $v_1$ to $v_N$ generated in step S104, S109, or S110. Thereafter, the operation proceeds to step S114.

(Step S114) The frame constructor 23b inserts into the symbol stream, the transmission mode information and the dedicated reference symbol. Thereafter, the operation proceeds to step S115.

(Step S115) The linear filter multiplier 241b multiplies, by the linear filter, a vector obtained by combining the transmission data symbols $v_k$ (see the formula (14)). Thereafter, the operation ends.

FIG. 14 is a flowchart illustrating an example of operation of the interference power calculation process according to the second embodiment. This drawing shows operation of the process in step S12 shown in FIG. 13.

(Step S12-1) The modulo arithmetic switch determining unit 214b sets the power of the modulation symbol $s_1$ addressed to the terminal device MT1 to be the transmission power Qs. Here, Qs is the average power obtained by averaging the powers of symbols obtained by modulating data signals. Thereafter, the operation proceeds to step S12-2.

(Step S12-2) The modulo arithmetic switch determining unit 214b substitutes 2 in the variable k. Thereafter, the operation proceeds to step S12-3.

(Step S12-3) The modulo arithmetic switch determining unit 214b calculates the interference power $P_k$ using the transmission power $T_l$ (l=1 to k−1) calculated in step S12-6 or S12-8 (see the formula (13)). Here, when k=2, the modulo arithmetic switch determining unit 214b sets the transmission power $T_1$ to be Qs calculated in step S12-1. For example, when k=2, the transmission power $P_2 = B_{21}^2 Qs$ (the product of the square of $B_{21}$ and Qs). The operation proceeds to step S12-4.

(Step S12-4) The modulo arithmetic switch determining unit 214b determines whether or not the interference power $P_k$ calculated in step S12-3 is larger than the threshold $P_0$. If it is determined that the interference power $P_k$ is larger than the threshold $P_0$ (Yes), the operation proceeds to step S12-5. On the other hand, if it is determined that the interference power $P_k$ is equal to or smaller than the threshold $P_0$ (No), the operation proceeds to step S12-7.

(Step S12-5) The modulo arithmetic switch determining unit 214b determines the transmission mode information addressed to the terminal device MTk to be the "transmission mode 1." Thereafter, the operation proceeds to step S12-6.

Figure 37:
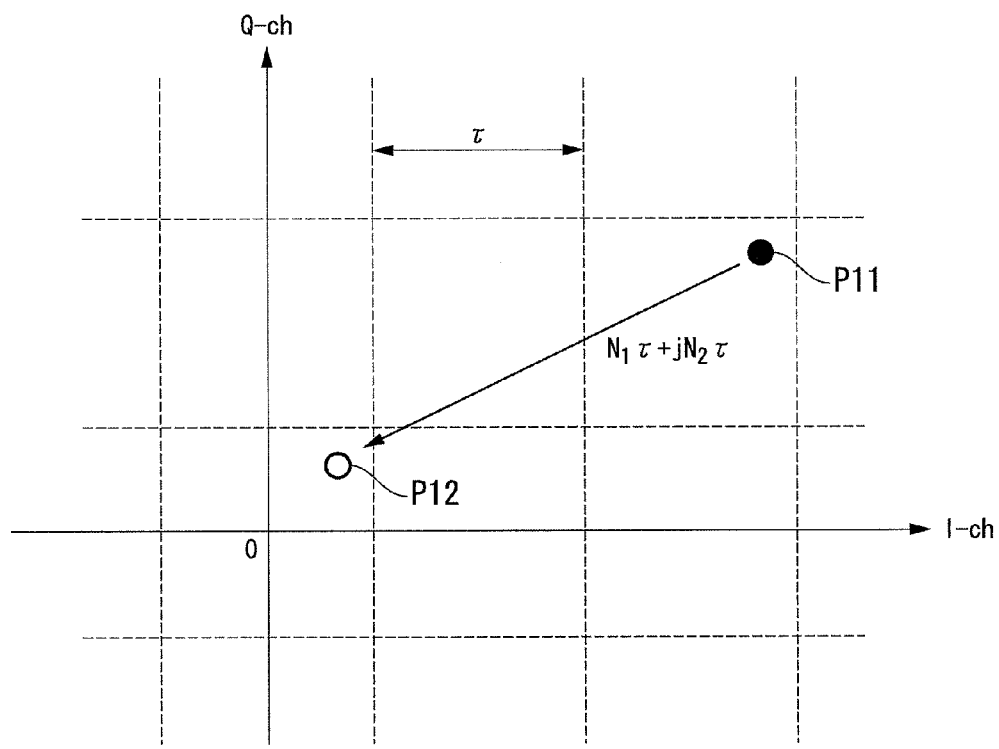
FIG. 37 is a schematic diagram illustrating modulo arithmetic according to related art.
Figure 38:
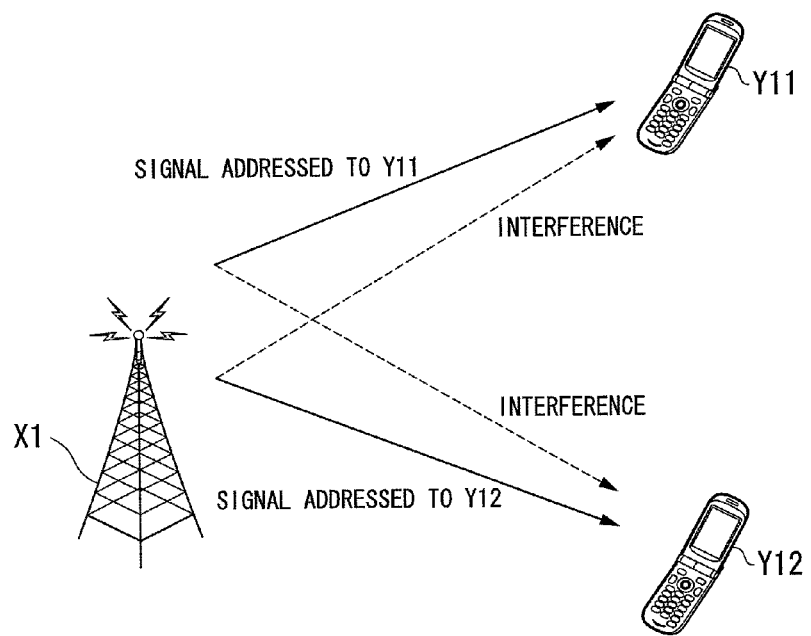
FIG. 38 is a schematic diagram illustrating a wireless communication system according to the related art.
Figure 39:
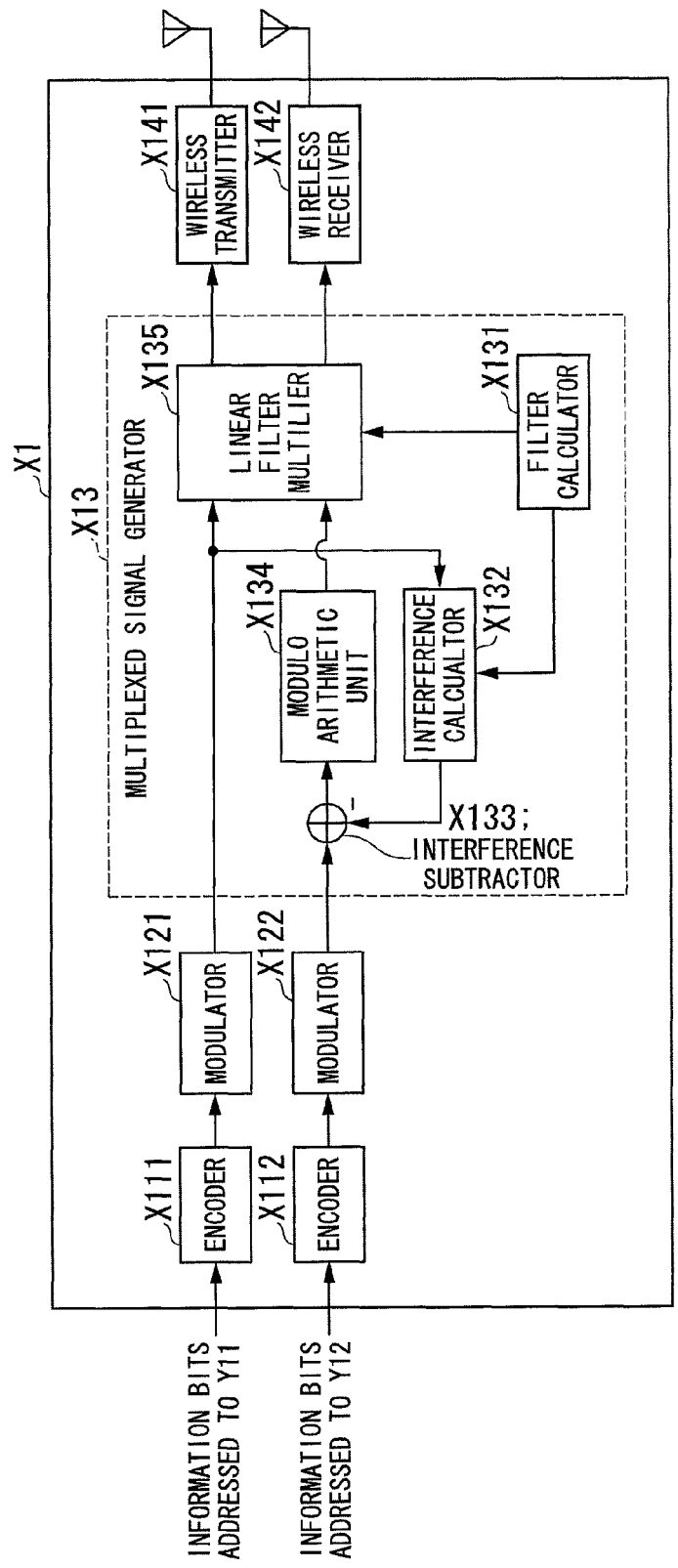
FIG. 39 is a schematic block diagram illustrating a configuration of a base station device according to the related art.
Figure 40:
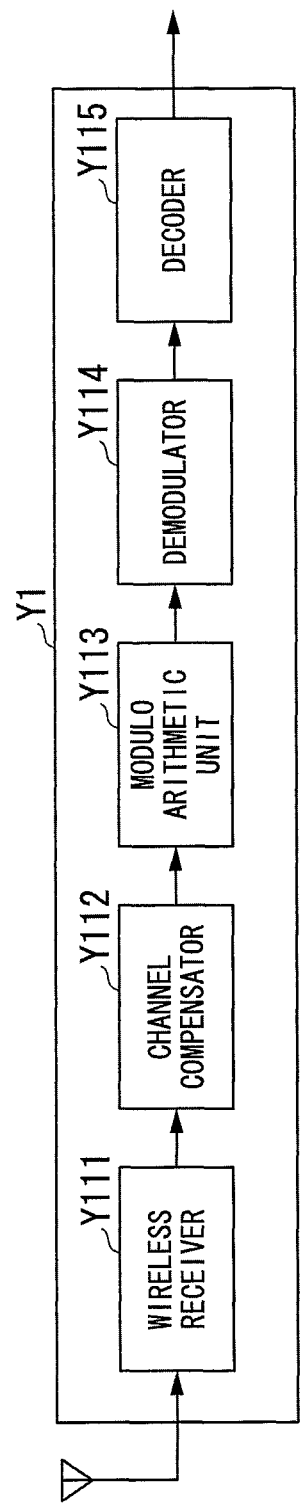
FIG. 40 is a schematic block diagram illustrating a configuration of the base station device according to the related art.
Figure 41:
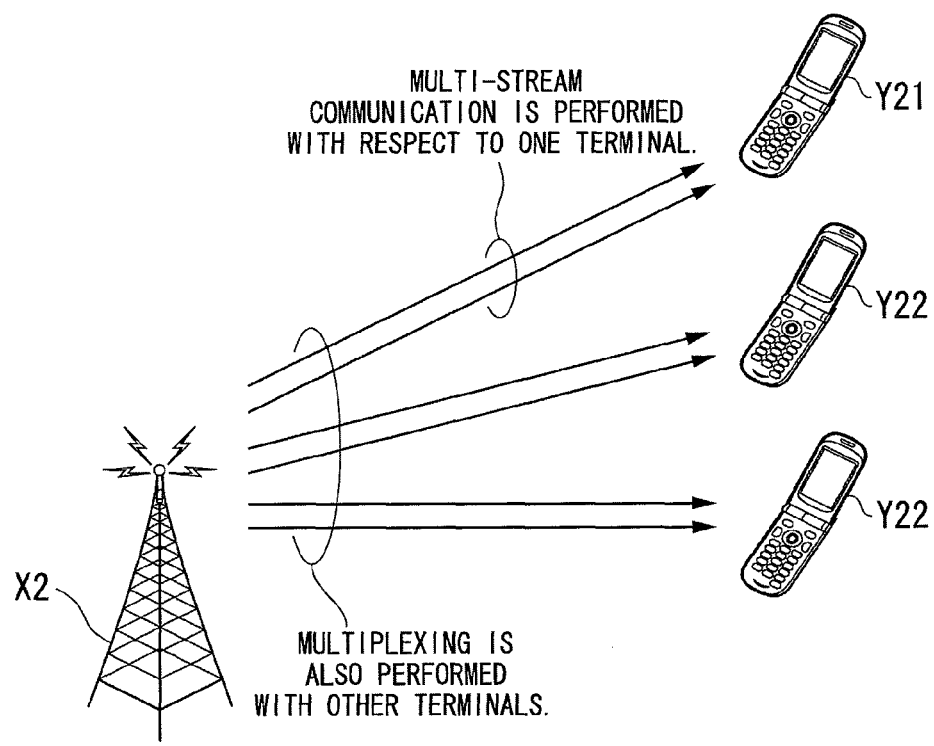
FIG. 41 is another schematic diagram illustrating a wireless communication system according to the related art.

(Step S12-6) The modulo arithmetic switch determining unit 214b sets $Q_M$ to be the transmission power $T_k$. Here, $Q_M$ is the average power of the modulo symbols $s_k'$, and is the power under the assumption that signals are distributed at the equal probability on signal points included within the range defined by [−τ/2, τ/2] of the I-ch and [−τ/2, τ/2] of the Q-ch with the origin as the center on the constellation plane (see FIG. 37).

(Step S12-7) The modulo arithmetic switch determining unit 214b determines the transmission mode information addressed to the terminal device MTk to be the "transmission mode 2." Thereafter, the operation proceeds to step S12-8.

(Step S12-8) The modulo arithmetic switch determining unit 214b sets $Q_S + P_k$ to be the transmission power $T_k$. Here, $Q_S + P_k$ denotes the average power of the interference cancelled symbol $s_k - f_k$. Thereafter, the operation proceeds to step S12-9.

(Step S12-9) The modulo arithmetic switch determining unit 214b determines whether or not k=N. If it is determined that k=N (Yes), the operation ends. On the other hand, if it is determined that k≠N (No), the operation proceeds to step S12-10.

(Step S12-10) The modulo arithmetic switch determining unit 214b adds 1 to k. Thereafter, the operation returns to step S12-3.

<Regarding Threshold $P_0$>

The above threshold $P_0$ is defined as follows.

Figure 15:
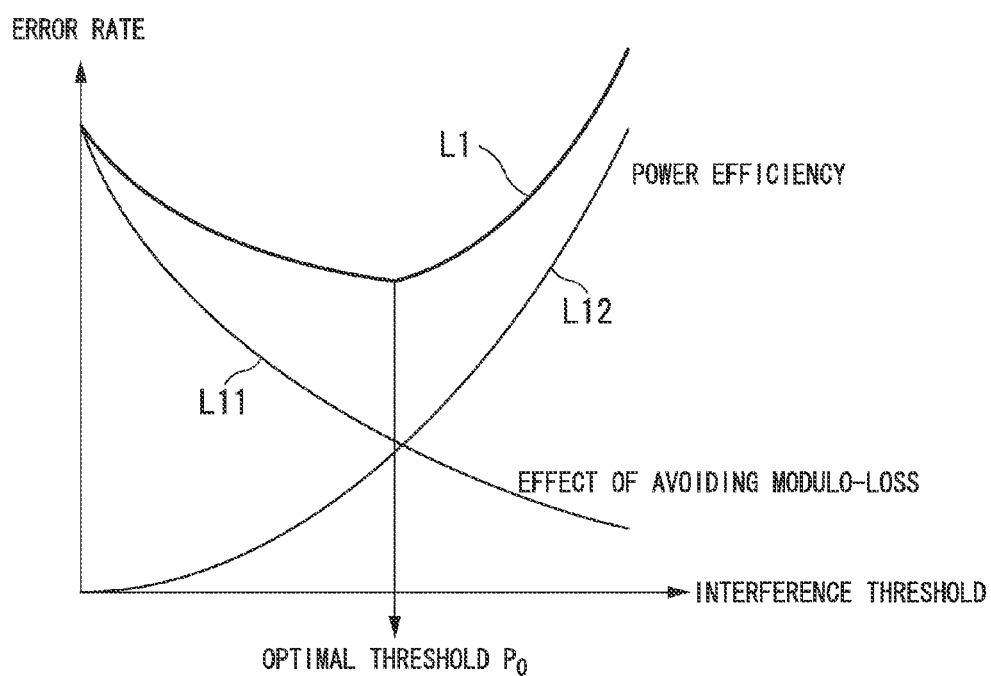
FIG. 15 is a diagram illustrating a threshold according to the second embodiment.

FIG. 15 is a diagram illustrating the threshold $P_0$ according to the second embodiment. In this drawing, a horizontal axis denotes the interference power, and a vertical axis denotes an error rate.

A curve L11 appended with a reference symbol L11 indicates the relationship between the interference power and the error rate in a case that the modulo arithmetic is not performed. The curve L11 shows that as the threshold $P_0$ decreases and thus a possibility of performing the modulo arithmetic increases, modulo loss associated with the modulo arithmetic increases, thereby causing many errors. On the other hand, a curve L12 appended with a reference symbol L12 shows that as the threshold $P_0$ increases and thus a possibility of performing the modulo arithmetic decreases, errors increase since interference cannot efficiently be cancelled.

The curve L1 appended with the reference symbol L1 is obtained as a sum of the curves L11 and L12. In the second embodiment, the minimum value of this curve L1 is set to be the threshold $P_0$.

Thus, according to the second embodiment, the multiplexed signal generator 2b multiplexes a signal which has been subjected to the modulo arithmetic and is addressed to the terminal device MTk associated with the "transmission mode 1," and a signal not which is not subjected to the modulo arithmetic and is addressed to the terminal device MTk associated with the "transmission mode 2." Thereby, in the second embodiment, the wireless communication system can multiplex a signal having the small interference power and a signal having the large interference power, while performing the modulo arithmetic on the signal having the large interference and not performing the modulo arithmetic on the signal having the interference power.

Particularly, in the wireless communication system according to the second embodiment, an interference signal with respect to the signal addressed to the terminal device MTk is strengthened by multiplying the linear filter in some cases. According to the second embodiment, however, the modulo arithmetic is performed if the interference signal becomes large, thereby reducing the transmission power and enabling communication with high power efficiency.

Third Embodiment

Hereinafter, a third embodiment of the present invention is explained in detail with reference to the drawings.

In the second embodiment, the base station device b2 determines whether or not to perform the modulo arithmetic based on the interference power $P_k$. In the third embodiment, whether or not to perform the modulo arithmetic is determined based on the order of performing the process of subtracting interference (referred to as the interference cancelling order; which is equal to the order of the terminal device MTk (terminal number k)).

A schematic diagram illustrating a wireless communication system according to the third embodiment is the same as that of the second embodiment (FIG. 8), and explanations thereof are omitted here. Hereinafter, the base station device B according to the third embodiment is referred to as a base station device b3. A configuration of each terminal device MTk (k=1 to N) is the same as that of the terminal device m1 of the first embodiment (FIGS. 6 and 7), and therefore explanations thereof are omitted here. However, the terminal device m1 according to the third embodiment performs channel compensation based on channel state information of channels from N antennas of the base station device B.

<Regarding Base Station Device b3>

Figure 16:
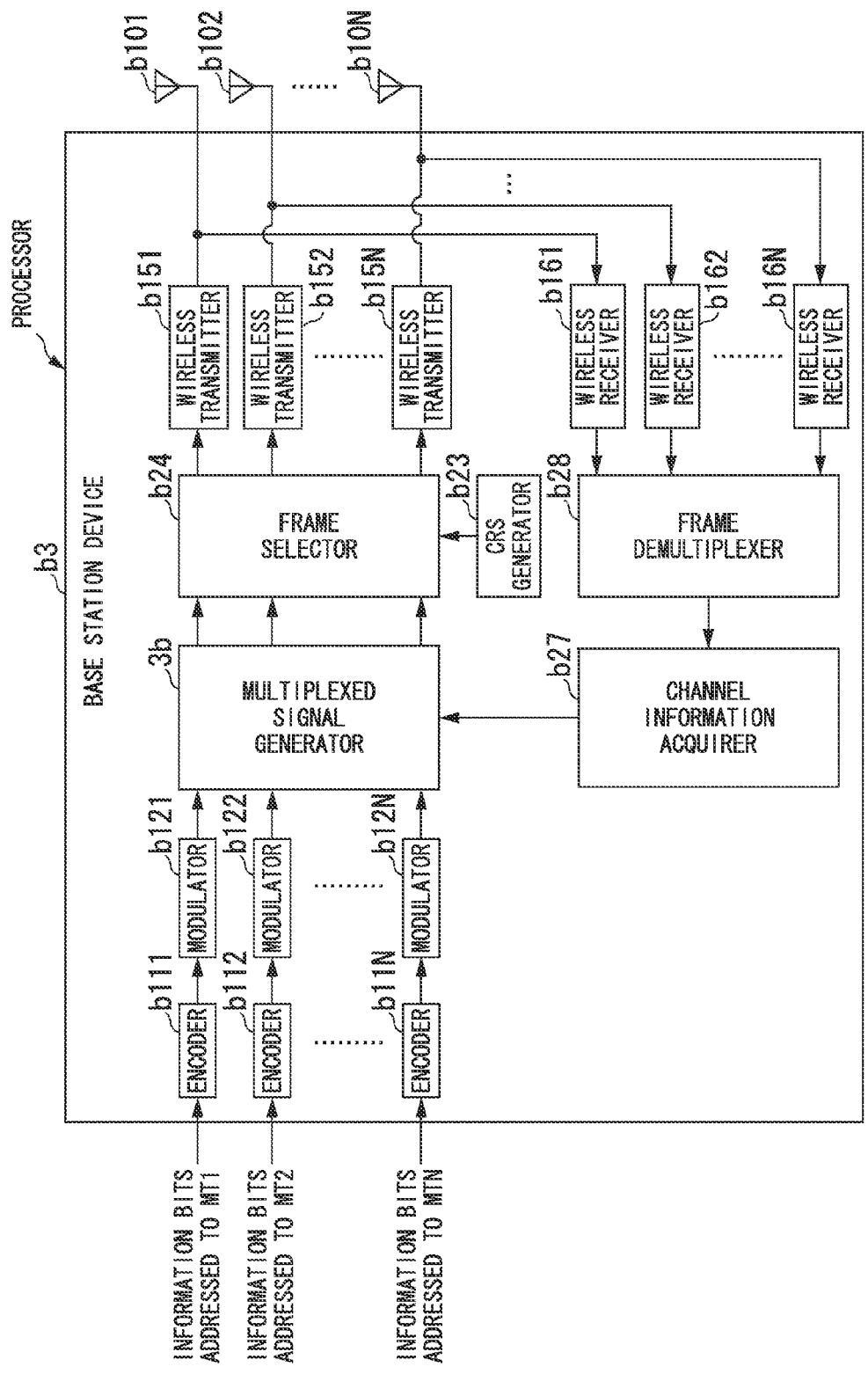
FIG. 16 is a schematic block diagram illustrating a base station device according to a third embodiment of the present invention.

FIG. 16 is a schematic block diagram illustrating a configuration of a base station device b3 according to the third embodiment of the present invention. If the base station device b3 according to the third embodiment (FIG. 16) is compared to the base station device b2 according to the second embodiment (FIG. 9), the multiplexed signal generator 3b differs. However, other constituent elements (the encoders b111 to b11N, the modulators b121 to b12N, the CRS generator b23, the frame selector b24, the wireless transmitters b151 to b15N, the antennas b101 to b10N, the wireless receivers b161 to b16N, the frame demultiplexer b28, and the channel information acquirer b27) have the same functions as those of the second embodiment. Explanations of the same functions as those of the second embodiment are omitted here.

Figure 17:
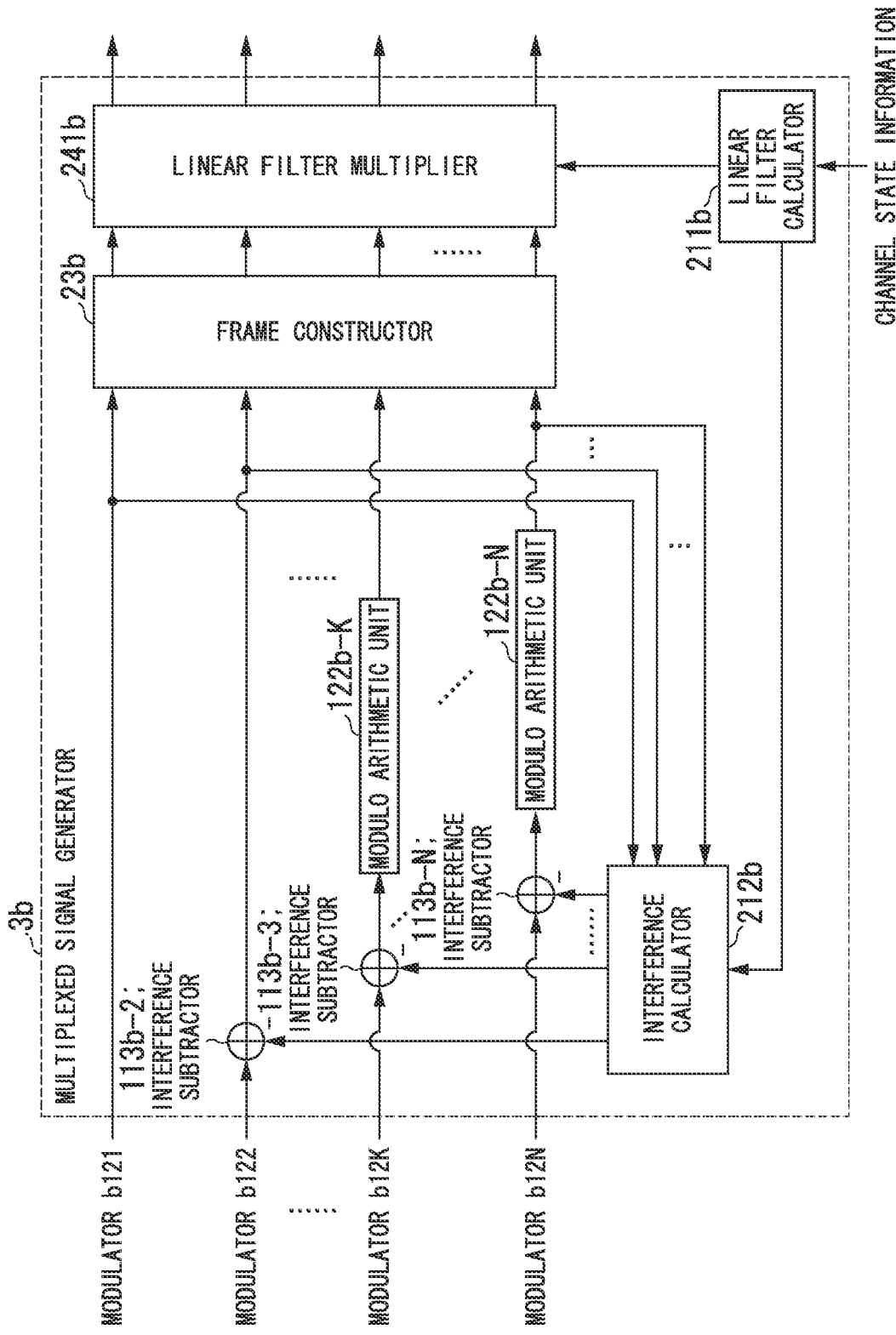
FIG. 17 is a schematic block diagram illustrating a multiplexed signal generator according to the third embodiment.

FIG. 17 is a schematic block diagram illustrating a configuration of the multiplexed signal generator 3b according to the third embodiment. If the multiplexed signal generator 3b according to the third embodiment (FIG. 17) is compared to the multiplexed signal generator 2b according to the second embodiment (FIG. 10), the differences are in that the multiplexed signal generator 3b does not include the adaptive modulo units 12b-2 to 12b-(K−1) (K is a natural number that is 3 or greater) and the modulo arithmetic switch determining unit 214b, and that the multiplexed signal generator 3b includes modulo arithmetic units 122b-K to 122b-N in lieu of the adaptive modulo units 12b-K to b12-N. However, other constituent elements (the linear filter calculator 211b, the interference calculator 212b, the interference subtractors 113b-2 to 113b-N, the frame constructor 23b, and the linear filter multiplier 241b) have the same functions as those of the second embodiment. Explanations of the same functions as those of the second embodiment are omitted here.

Each of the modulo arithmetic units 122b-K to 122b-N has the same function as that of the modulo arithmetic unit 122b-k shown in FIG. 11, and therefore explanations thereof are omitted here.

<Regarding Operation of Base Station Device b3>

Figure 18:
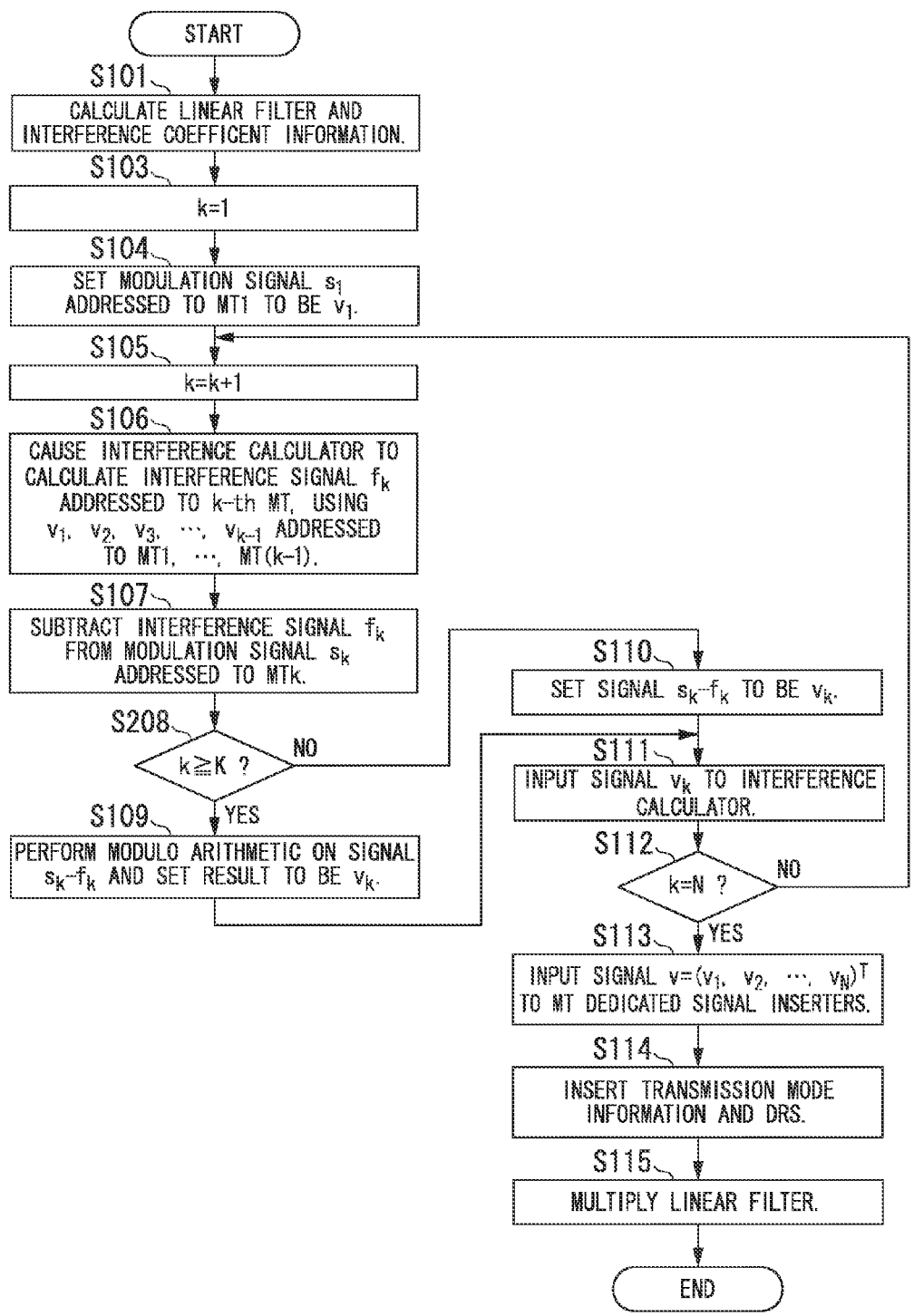
FIG. 18 is a flowchart illustrating operation of the multiplexed signal generator according to the third embodiment.

FIG. 18 is a flowchart illustrating operation of the multiplexed signal generator 3b according to the third embodiment. If the operation of the multiplexed signal generator 3b according to the third embodiment (FIG. 18) is compared to the operation of the multiplexed signal generator 2b according to the second embodiment (FIG. 13), the differences are in that the process in step S12 is not included in FIG. 18 and that a process in step S208 is included in lieu of the process in step S108. However, other processes (steps S101, S103 to S107, S109 to S115) are the same as those of the second embodiment. Explanations of the same processes as those of the second embodiment are omitted here.

(Step S208) The multiplexed signal generator 3b determines whether or not the variable k is equal to or greater than a predetermined threshold K. If it is determined that the variable k is equal to or greater than the threshold K (Yes), the operation proceeds to step S109. On the other hand, if it is determined that the variable k is smaller than the threshold K (No), the operation proceeds to step S110.

<Regarding Threshold K>

The above threshold K is defined as follows.

Figure 19:
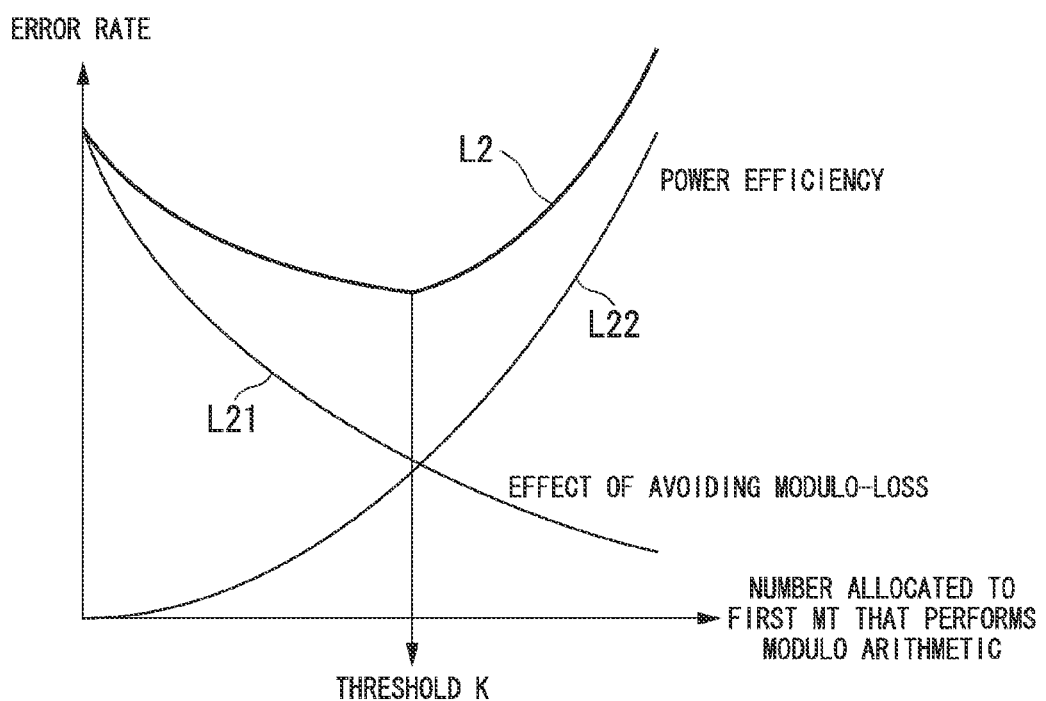
FIG. 19 is a diagram illustrating a threshold K according to the third embodiment.

FIG. 19 is a diagram illustrating the threshold K according to the third embodiment. In this drawing, a horizontal axis denotes the terminal number k (k allocated to the terminal device MTk) of the first terminal device that performs the modulo arithmetic. In other words, the modulo arithmetic is not performed on the interference cancelled symbols addressed to the terminal devices MT1 to MT(k−1), but is performed on the interference cancelled symbols addressed to the terminal device MTk to MTN. Additionally, a vertical axis denotes an error rate.

A curve L21 appended with a reference symbol L21 shows that as the number of MTs which perform the modulo arithmetic increases, modulo loss associated with the modulo arithmetic increases, thereby causing many errors to occur. On the other hand, a curve L22 appended with a reference symbol L22 shows that as the number of MTs which perform the modulo arithmetic decreases, errors increase since interference cannot be cancelled with the efficient power. The curve L2 appended with the reference symbol L2 is obtained as a sum of the curves L21 and L22. In the third embodiment, the minimum value of this curve L2 is set to be the threshold K.

Thus, according to the third embodiment, each of the interference subtractors 113b-2 to 113b-N subtracts an interference signal from the signal addressed to the terminal device MTk, according to the interference cancelling order (order of the terminal device MTk). The modulo arithmetic units 122b-K to the modulo arithmetic unit 122b-N perform modulo arithmetic on the signals addressed to the reception devices MTK to MTN whose interference cancelling orders are latter than the threshold K. In other words, in the third embodiment, the wireless communication system performs the modulo arithmetic on signals addressed to the terminal devices MTK to MTN whose interference cancelling orders are late and which have the statistically large interference power, and does not perform the modulo arithmetic on signals addressed to the terminal devices MT1 to MT(k−1) whose interference cancelling orders are early and which have the small interference power. Thereby, in the third embodiment, if the interference cancelling order is early and the interference power is low, it is possible to prevent the reception candidate points from increasing, which causes deterioration of the signal detection performance. Further, if the interference cancelling order is late and the interference power is high, communication with high power efficiency can be performed, thereby enhancing the propagation performance.

In the third embodiment, $R^H$ is a lower rectangular matrix. This shows that the signal addressed to the terminal device MTk, whose order of being subjected to interference cancelling is latter, statistically has the smaller interference power of interference caused by the signals addressed to the other terminal devices MT1 to MT(k−1). For example, when N=4, the signal addressed to the terminal device MT1 is not affected by interference from another terminal device. Additionally, the signal addressed to the terminal device MT2 is affected by interference from the signal addressed to the terminal device MT1, but is not affected by interferences from signals addressed to the other terminal devices MT3 to MTN. The signal addressed to the terminal device MT3 is affected by interferences from the signals addressed to the terminal devices MT1 and MT2, but is not affected by the signal addressed to the terminal device MT4. The signal addressed to the terminal device MT4 is affected by interferences from all the signals addressed to the terminal devices MT1 to MT3. Thus, as the interference cancelling order of the terminal device MTk is earlier, the terminal device MTk is affected by interferences from signals addressed to a greater number of terminal devices MT1 to MT(k−1), thereby making the interference power likely to be higher. For this reason, in the third embodiment, the necessity or unnecessity of the modulo arithmetic is switched based on the interference cancelling order of the terminal device MTk. Thus, the modulo arithmetic is performed only on the terminal device MTk statistically having the high interference power, thereby enhancing the propagation performance.

<Simulation>

Figure 20:
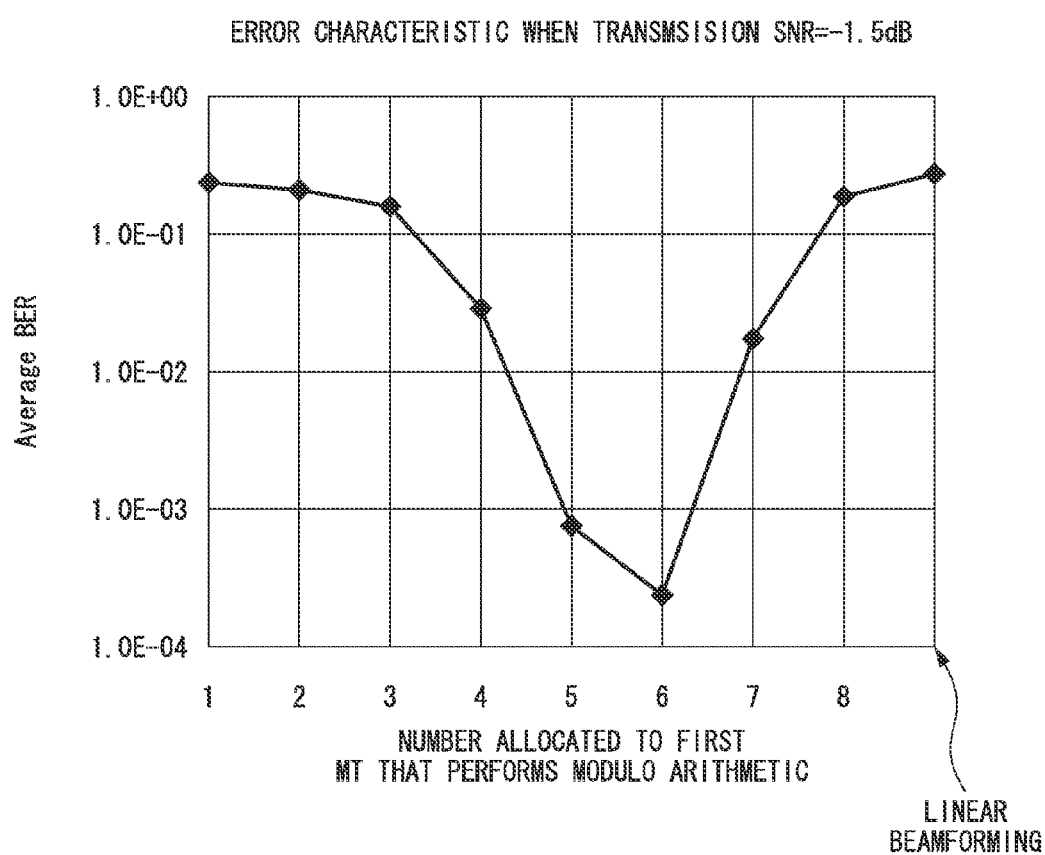
FIG. 20 is a schematic diagram illustrating the relationship between the threshold K and the error rate characteristic according to the third embodiment.

FIG. 20 is a schematic diagram illustrating the relationship between the threshold K and the error rate characteristic according to the third embodiment. In this drawing, a horizontal axis denotes the terminal number k allocated to the first MT that performs the modulo arithmetic. Additionally, a vertical axis denotes a BER (Bit Error Rate). This BER is obtained by averaging the BERs for all the terminal devices MT1 to MTN when the transmission SNR (Signal Noise Ratio) is −1.5 dB.

FIG. 20 is a result of specifically simulating the relationship shown in FIG. 19. Here, for this simulation, the number of antennas of the base station device b3 and the number of the terminal device MT are set to be 8 (N=8), a turbo coding is used as the error correction coding, and QPSK is used as the modulation scheme.

FIG. 20 shows the fact that the average BER becomes the minimum value when k=6, and that the error rate becomes the minimum by setting the threshold K=6.

Additionally, in FIG. 20, K=1 corresponds to the error rate characteristic in the case of MU-MIMO THP in which the modulo arithmetic is performed on all the terminal devices. Additionally, the rightmost corresponds to the error rate characteristic in the case in which no modulo arithmetic is performed (in the case of linear beam-forming). In other words, FIG. 20 shows that the wireless communication system according to the third embodiment (for example, K=6) could achieve a smaller error rate than that in the case of the related art.

Fourth Embodiment

Hereinafter, a fourth embodiment of the present invention is explained in detail with reference to the drawings.

The third embodiment has been explained with reference to the case where the base station device b3 transmits the transmission mode information, and the terminal device MTk obtains the transmission mode information. The fourth embodiment is explained with respect to a case where the base station device b3 does not transmit transmission mode information, and the terminal device MTk detects transmission mode information.

A schematic diagram illustrating a wireless communication system according to the fourth embodiment is the same as that of the second embodiment (FIG. 8), and therefore explanations thereof are omitted here. Hereinafter, the base station device B according to the fourth embodiment is referred to as a base station device b4. Additionally, each of the terminal devices MT1 to MTN is referred to as a terminal device m4.

<Regarding Base Station Device b4>

Figure 21:
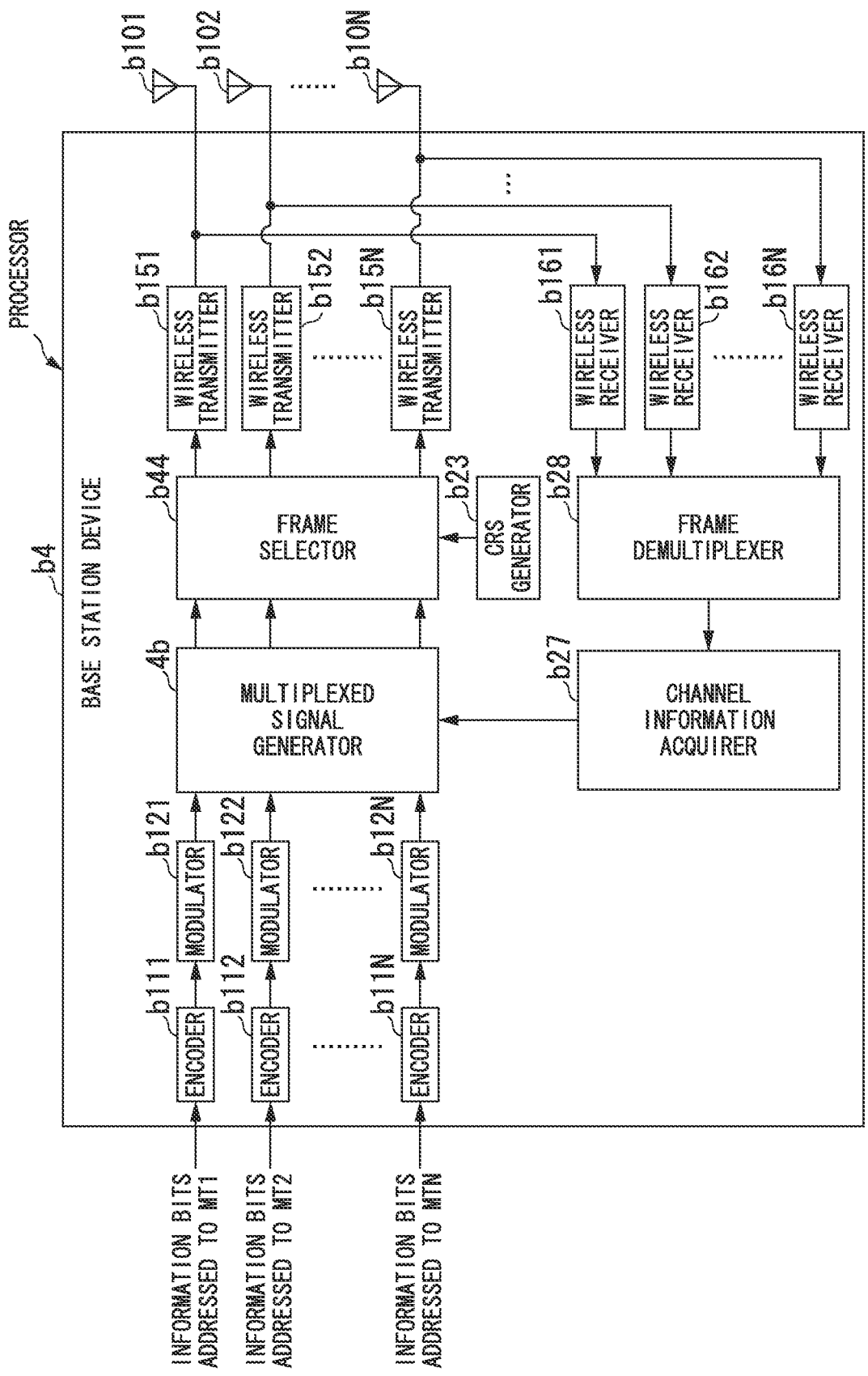
FIG. 21 is a schematic block diagram illustrating a base station device according to a fourth embodiment of the present invention.

FIG. 21 is a schematic block diagram illustrating a configuration of a base station device b4 according to the fourth embodiment of the present invention. If the base station device b4 according to the fourth embodiment (FIG. 21) is compared to the base station device b3 according to the third embodiment (FIG. 16), a multiplexed signal generator 4b and a frame selector b44 differ. However, other constituent elements (the encoders b111 to b11N, the modulators b121 to b12N, the CRS generator b23, the wireless transmitters b151 to b15N, the antennas b101 to b10N, the wireless receivers b161 to b16N, the frame demultiplexer b28, and the channel information acquirer b27) have the same functions as those of the third embodiment. Explanations of the same functions as those of the third embodiment are omitted here.

The multiplexed signal generator 4b differs from the multiplexed signal generator 3b in that the multiplexed signal generator 4b does not arrange modulation symbols of transmission mode information. The details of the multiplexed signal generator 4b will be explained later.

The frame selector b44 allocates to a predetermined frequency band, a common reference symbol for the antenna b10k which is received from the CRS generator b23.

Additionally, the frame selector b44 allocates a symbol stream addressed to the terminal device MTk which is received from the multiplexed signal generator 4b, to a frequency band to be used for transmitting signals to the terminal device MTk. The frame selector b44 outputs the signals allocated to the frequency band, to the wireless transmitter b15k in predetermined transmission time unit (frame).

Figure 22:
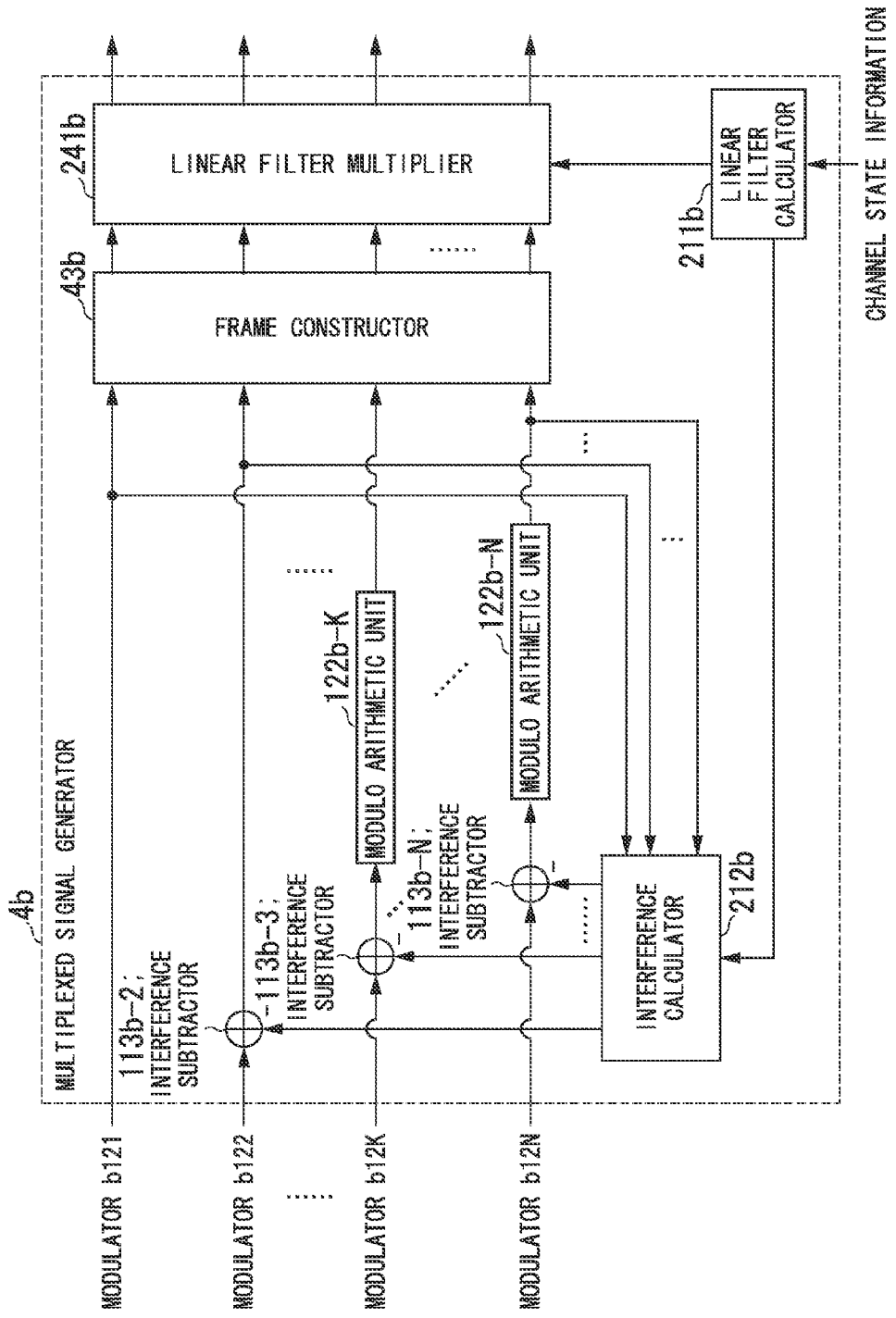
FIG. 22 is a schematic block diagram illustrating a multiplexed signal generator according to the fourth embodiment.

FIG. 22 is a schematic block diagram illustrating a configuration of the multiplexed signal generator 4b according to the fourth embodiment. If the multiplexed signal generator 4b according to the fourth embodiment (FIG. 22) is compared to the multiplexed signal generator 3b according to the third embodiment (FIG. 17), a frame constructor 43b differs. However, other constituent elements (the linear filter calculator 211b, the interference calculator 212b, the interference subtractors 113b-2 to 113b-N, the modulo arithmetic units 122b-K to 122b-N, and the linear filter multiplier 241b) have the same functions as those of the third embodiment. Explanations of the same functions as those of the third embodiment are omitted here.

Figure 23:
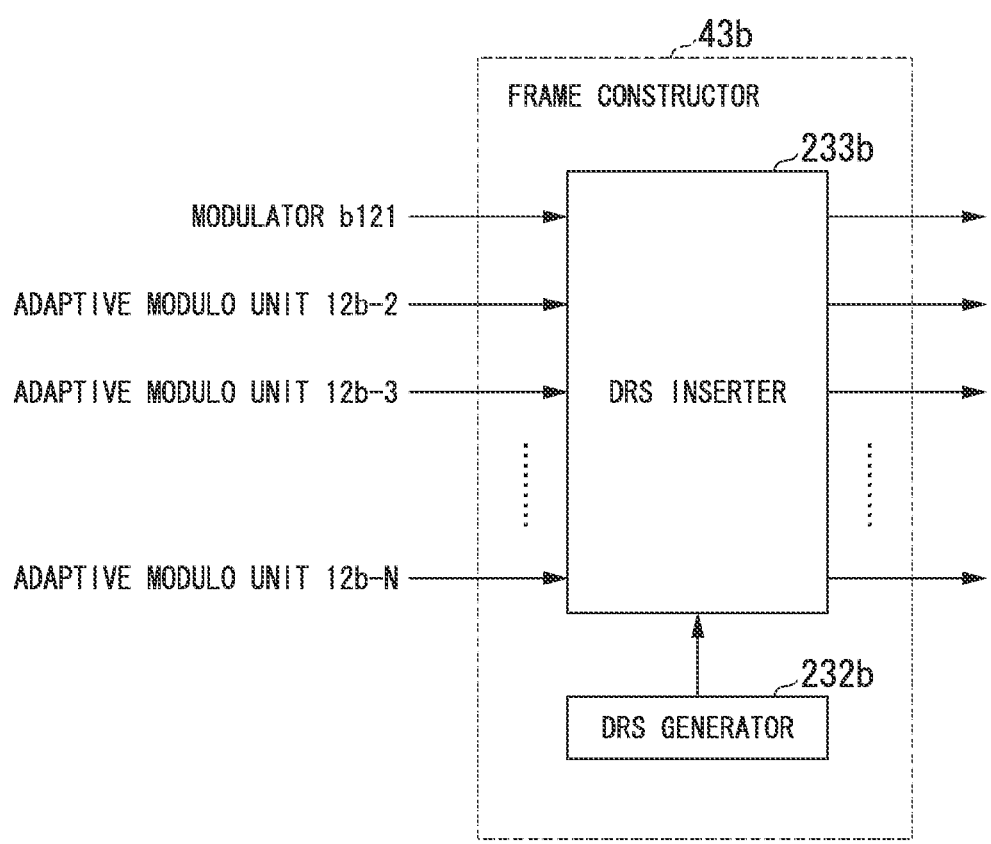
FIG. 23 is a schematic block diagram illustrating a configuration of a frame constructor according to the fourth embodiment.

FIG. 23 is a schematic block diagram illustrating a configuration of the frame constructor 43b according to the fourth embodiment. If the frame constructor 43b according to the fourth embodiment (FIG. 23) is compared to the frame constructor 23b according to the second embodiment (FIG. 12), the difference is in that the frame constructor 43b does not include the transmission mode information inserter 231b. However, the other constituent elements (the DRS generator 232b and the DRS inserter 232b) have the same functions as those of the second embodiment. Explanations of the same functions as those of the second embodiment are omitted here.

Figure 24:
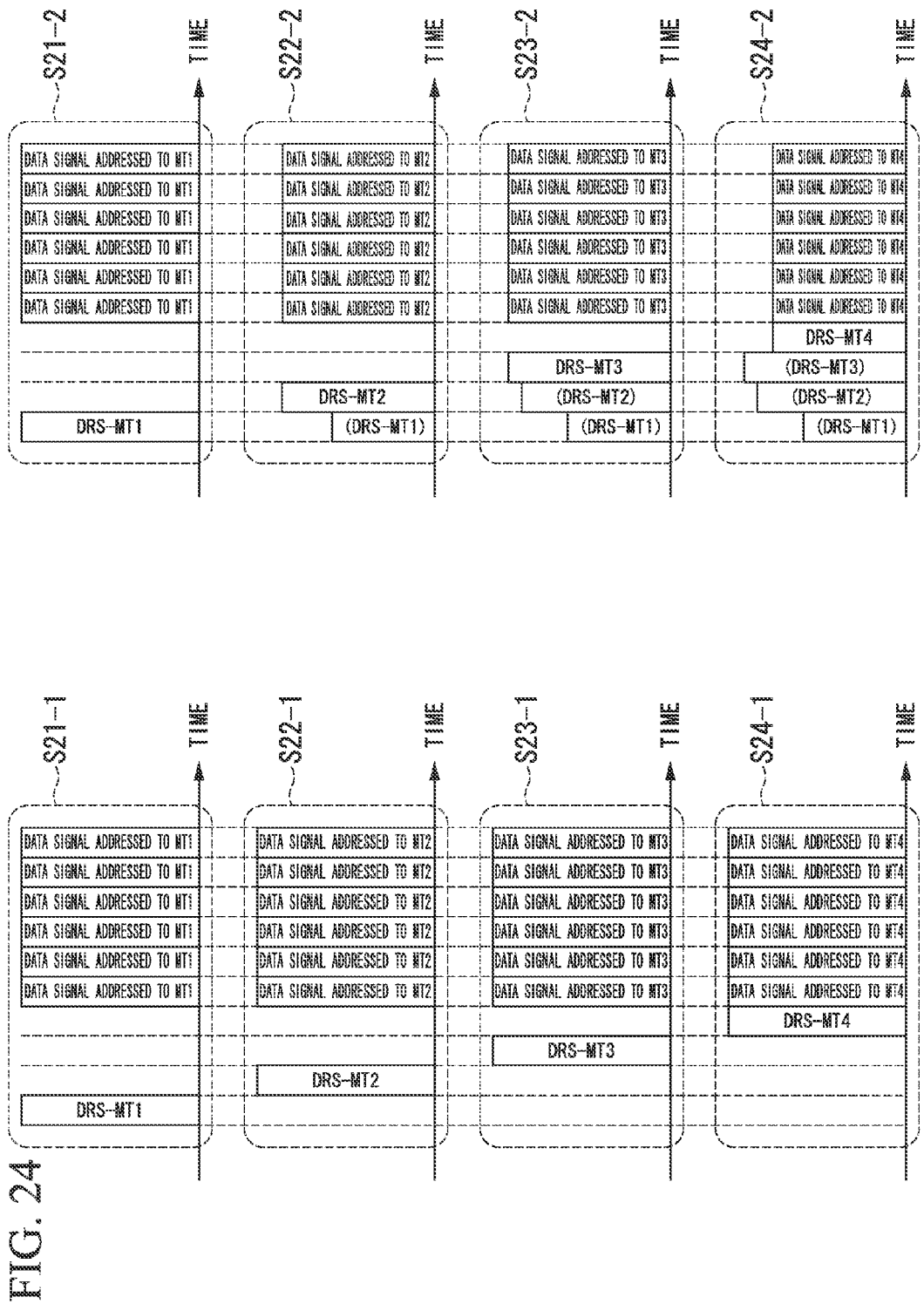
FIG. 24 is a schematic diagram illustrating an example of wireless signals according to the fourth embodiment.

However, the mapping information used by the DRS generator 232b is information indicating that the dedicated reference symbols addressed to the respective terminal devices MTk are arranged in time order that is the ascending order of the terminal number (see FIG. 24). Here, the terminal number indicates the interference cancelling order. For this reason, the arrangement order of the dedicated reference symbols addressed to the terminal devices MTk is equal to the interference cancelling order.

<Regarding Wireless Signal>

FIG. 24 is a schematic diagram illustrating an example of wireless signals according to the fourth embodiment. In this drawing, a horizontal axis denotes a time axis. Additionally, this drawing shows wireless signals transmitted in the same frequency band, in a manner such that the wireless signals addressed to one terminal device are separated from the wireless signals addressed to another terminal device. Additionally, this drawing illustrates a case where N=4.

In FIG. 24, the wireless signals S21-1 to S24-1 denote wireless signals transmitted by the base station device b4 using the antennas b101 to b104 and addressed to the terminal devices MT1 to MT4, respectively. Additionally, the reception signals S21-2 to S24-2 denote reception signals received by the terminal devices MT1 to MT4, respectively.

The wireless signals S21-1 to S24-1 shown in FIG. 24 show that signals of the dedicated reference symbols addressed respectively to the terminal devices MT1 to MT4 (DRS-MT1 to DRS-MT4) are arranged in time order that is ascending order of the terminal number k (k=1 to 4).

Additionally, the reception signals S21-2 to S24-2 shown in FIG. 24 show that the terminal device MTk receives the signals of the dedicated reference symbols addressed to the terminal devices MT1 to MTk, and does not receive the signals of the dedicated reference symbols addressed to the terminal devices MT(k+1) to MTN.

<Regarding Terminal Device m4>

Figure 25:
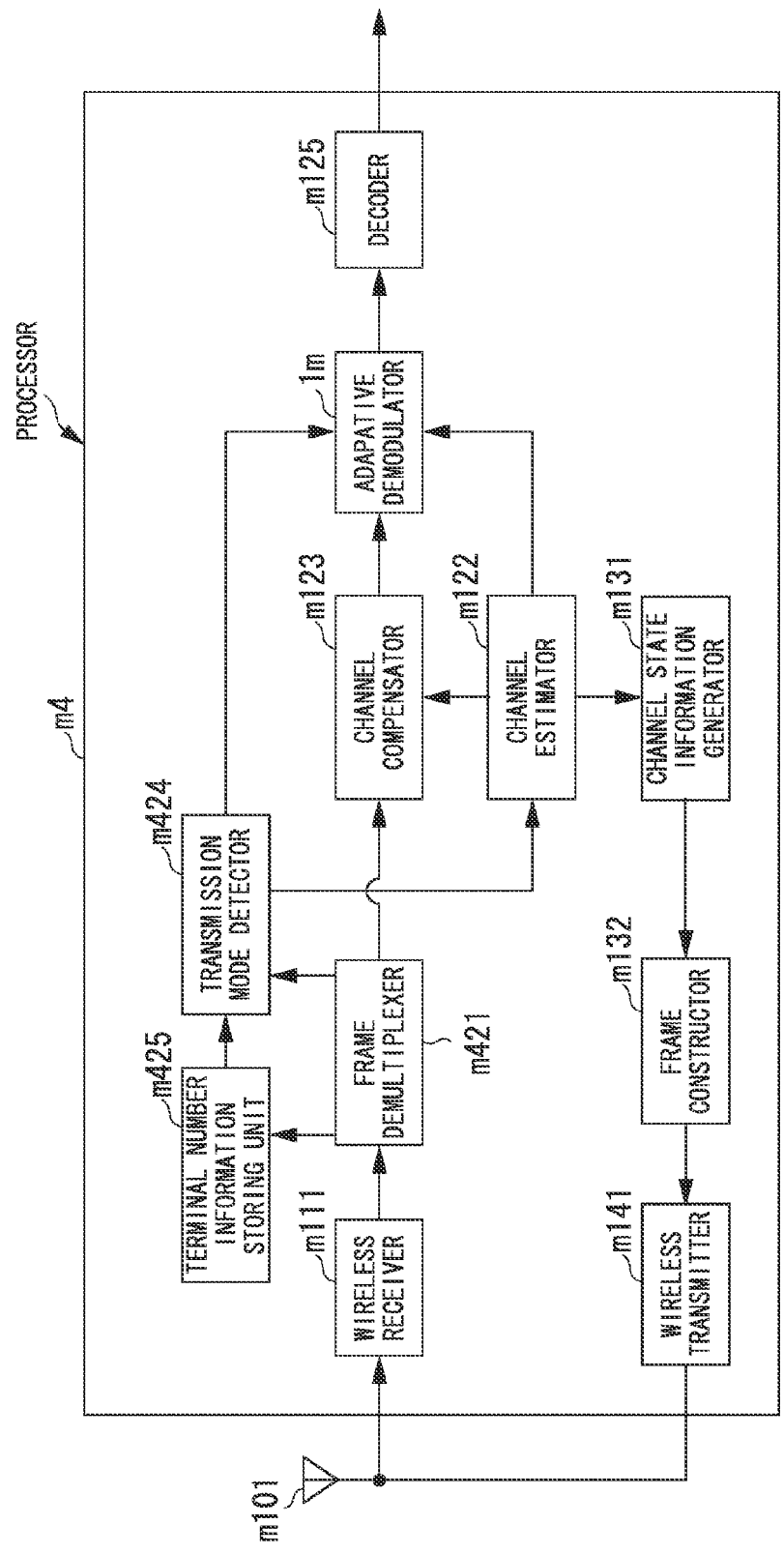
FIG. 25 is a schematic diagram illustrating a terminal device according to the fourth embodiment.

FIG. 25 is a schematic block diagram illustrating a configuration of the terminal device m4 according to the fourth embodiment. This drawing is a diagram illustrating a case in which the terminal device m4 includes one antenna.

If the terminal device m4 according to the fourth embodiment (FIG. 25) is compared to the terminal device m1 according to the first embodiment (FIG. 6), a frame demultiplexer m421, a terminal number information storing unit m425, and a transmission mode detector m424 differ. However, other constituent elements (the antenna unit m101, the wireless receiver mill, the channel estimator m122, the channel compensator m123, the adaptive demodulator 1m, the decoder m124, the channel state information generator m131, the frame constructor m132, and the wireless transmitter m141) have the same functions as those of the first embodiment. Explanations of the same functions as those of the first embodiment are omitted here. However, the channel estimator m122 and the channel compensator m123 estimate channel states of channels from the N antennas of the base station device b4, and perform channel compensation based on the channel state information indicating the estimated channel states.

The frame demultiplexer m421 demultiplexes signals in the frequency band to which the signals addressed to the terminal device m4 are allocated, based on the mapping information preliminarily reported from the base station device b4. Additionally, the frame demultiplexer m421 outputs to the channel compensator m123, the data signals addressed to the terminal device m4 among the demultiplexed signals.

Further, the frame demultiplexer m421 outputs to the transmission mode detector m424, the signal of the dedicated reference symbol addressed to each terminal devices MTk (including the terminal device m4) among the demultiplexed signals. Specifically, if a signal having the amplitude equal to or larger than a predetermined threshold is present in a time band to which the signal of the dedicated reference symbol addressed to the terminal device MTk is present, the frame demultiplexer m421 outputs to the transmission mode detector m424, the signals of those dedicated reference symbols in the time order of the arrangement. Moreover, the frame demultiplexer m421 outputs to the channel estimator m122, signals of common reference symbols among the demultiplexed signals.

The transmission mode detector m424 extracts a signal of the dedicated reference symbol addressed to the terminal device m4, which is the last in the time order of the arrangement of the signals of the dedicated reference symbols. The transmission mode detector m424 outputs to the channel estimator m122, the extracted signals of the dedicated reference symbols addressed to the terminal device m4.

Additionally, the transmission mode detector m424 counts the number of the signals of the dedicated reference symbols addressed to each terminal device MTk which are received from the frame demultiplexer m421 (the result of the counting is set to be $K_1$). This $K_1$ indicates the terminal number allocated to the terminal device m4.

Additionally, the terminal number information storing unit m425 preliminarily stores the threshold K common between the base station device b4 and the terminal device m4.

The transmission mode detector m424 compares $K_1$ and the threshold K indicated by the information read from the terminal number information storing unit m425. If it is determined as a result of the comparison that $K_1 \geq K$, the transmission mode detector m424 determines to perform the modulo arithmetic, and generates transmission mode information indicating "transmission mode 1." If $K_1 < K$, the transmission mode detector m424 determines not to perform the modulo arithmetic, and generates transmission mode information indicating "transmission mode 2."

The transmission mode detector m424 outputs the generated transmission mode information to the adaptive demodulator 1m.

<Regarding Reception Signal>

Hereinafter, reception signals to be received by the terminal devices MT1 to MTN are explained. Here, a case of N=4 is explained.

The DRS inserter 233b inserts, in time order, the dedicated reference symbols denoted by wireless signal vectors $p_1$ to $p_4$ expressed by the following formula (15). The base station device b4 transmits signals of the inserted dedicated reference symbols.

[Formula 14]

$$\begin{pmatrix} \vec{p}_1^T \\ \vec{p}_2^T \\ \vec{p}_3^T \\ \vec{p}_4^T \end{pmatrix} = \begin{pmatrix} p_1 & 0 & 0 & 0 \\ 0 & p_2 & 0 & 0 \\ 0 & 0 & p_3 & 0 \\ 0 & 0 & 0 & p_4 \end{pmatrix} \quad (15)$$

In the formula (15), the wireless signal vectors $p_1$ to $p_4$, which are the elements in the left side, denote wireless signals to be transmitted using the antennas b101 to b104. Additionally, regarding the matrix in the right side, the rows denote wireless signals to be transmitted using the respective antennas in order from the antenna b101 to the antenna b104, and the columns denote wireless signals to be transmitted at the respective transmission times in order from the transmission time t11 to the transmission time t14. Here, the transmission times t11 to t14 are continuous in a unit time such that t11<t12<t13<t14. Additionally, the values $p_1$ to $p_4$ of the elements of the matrix correspond to the signals $p_1$ to $p_4$ of the dedicated reference symbols.

For example, regarding the formula (15), the wireless signal vector $p_1$ indicates that the signal $p_1$ of the dedicated reference symbol is transmitted at the transmission time t11 and that no wireless signal is transmitted at the transmission times t12 to t14. Additionally, regarding the formula (15), the wireless signal vector $p_2$ indicates that the signal $p_2$ of the dedicated reference symbol is transmitted at the transmission time t12 and that no wireless signal is transmitted at the transmission times t11, t13, and t14 (see the wireless signals S21-1 to S24-1 shown in FIG. 24).

In this case, the terminal devices MT1 to MT4 receive reception signals denoted as reception signal vectors $p_1'$ to $p_4'$ expressed by the following formula (16).

[Formula 15]

$$\begin{pmatrix} \vec{p}_1'^T \\ \vec{p}_2'^T \\ \vec{p}_3'^T \\ \vec{p}_4'^T \end{pmatrix} = R^H \begin{pmatrix} p_1 & 0 & 0 & 0 \\ 0 & p_2 & 0 & 0 \\ 0 & 0 & p_3 & 0 \\ 0 & 0 & 0 & p_4 \end{pmatrix} = \begin{pmatrix} r_{11}^* p_1 & 0 & 0 & 0 \\ r_{12}^* p_1 & r_{22}^* p_2 & 0 & 0 \\ r_{13}^* p_1 & r_{23}^* p_2 & r_{33}^* p_3 & 0 \\ r_{14}^* p_1 & r_{24}^* p_2 & r_{34}^* p_4 & r_{44}^* p_4 \end{pmatrix} \quad (16)$$

Regarding the formula (16), the reception signal vectors $p_1'$ to $p_4'$, which are the elements in the left side, indicate the reception signals received by the terminal devices MT1 to MT4. Additionally, regarding the matrix in the right side, the rows indicate the reception signals received by the respective terminal devices in order from the terminal device MT1 to the terminal device MT4, and the columns indicate the wireless signals received at the respective reception times in order from the reception time t21 to the reception time t24. Here, the reception times t21 to t24 are continuous in a unit time such that t21<t22<t23<t24.

For example, regarding the formula (16), the reception signal vector $p_1'$ indicates that the terminal device MT1 receives the signal $r_{11}^* p_1$ at the reception time t21, and receives no reception signal at the reception times t22 to t24. Additionally, regarding the formula (16), the reception signal vector p2' indicates that the terminal device MT2 transmits the signal $r_{12}^* p_1$ and the signal $r_{22}^* p_2$ respectively at the reception times t21 and t22, and transmits no wireless signal at the reception times t23 and t24 (see the wireless signals S21-2 to S24-2 shown in FIG. 24).

Thus, according to the fourth embodiment, the transmission mode detector m424 determines whether the transmission mode information is the information indicating "transmission mode 1" or the information indicating "transmission mode 2," based on the interference processing order indicated by the positions to which the dedicated reference signals are allocated. Specifically, if the interference processing order is equal to or latter than the threshold K, the transmission mode detector m424 determines the transmission mode information to be the "transmission mode 1." If the interference processing order is earlier than the threshold K, the transmission mode detector m424 determines the transmission mode information to be the "transmission mode 2." Thereby, in the fourth embodiment, even if the base station device b4 does not transmit transmission mode information, the terminal device MTk can determine the transmission mode, thereby reducing overhead of the control information.

Additionally, the fourth embodiment has been explained with respect to the case in which the interference cancelling order of the terminal device m4 is equal to the time order of the terminal device m4 that transmits the DRS. However, the present invention is not limited thereto, as long as all the terminal devices m4 store information indicating at what time and by which frequency DRS addressed to each terminal corresponding to the interference cancelling order is transmitted.

Fifth Embodiment

Hereinafter, a fifth embodiment of the present invention is explained with reference to the drawings.

The above first to fourth embodiments have been explained with respect to the case in which each of the terminal devices MT1 to MTN receives one signal stream at the same time and using the same frequency. The fifth embodiment is explained with respect to a case in which each of the terminal devices MT1 to MTN receives multiple streams.

<Regarding Wireless Communication System>

Figure 26:
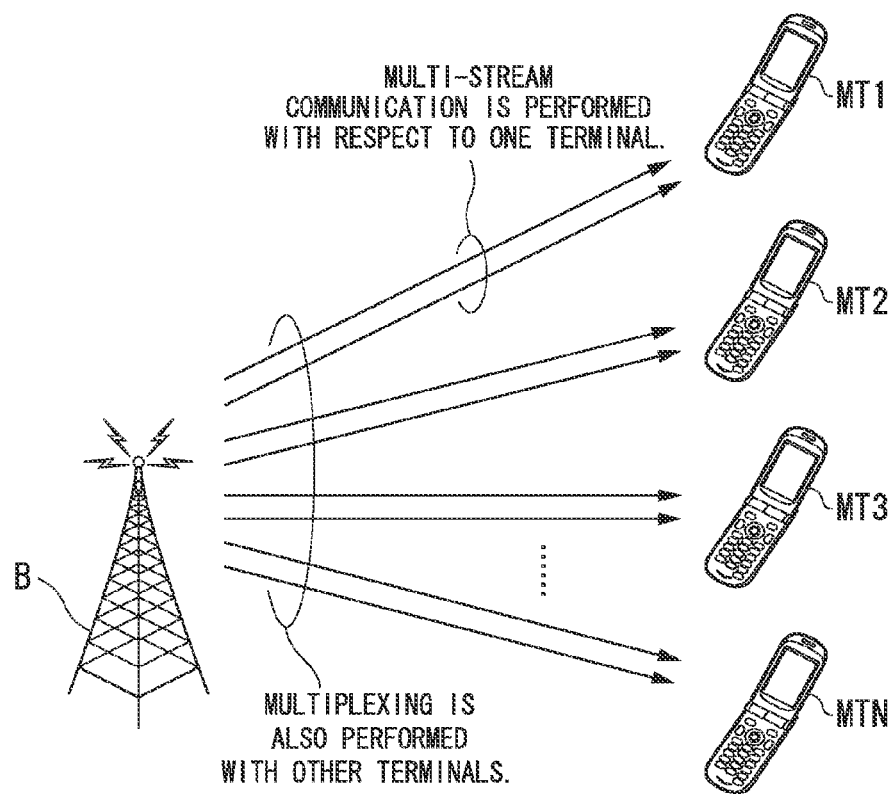
FIG. 26 is a schematic diagram illustrating a wireless communication system according to a fifth embodiment of the present invention.

FIG. 26 is a schematic diagram illustrating a wireless communication system according to the fifth embodiment. In this drawing, the base station device B transmits signals to the N terminal devices MT1 to MTN. Here, the signal addressed to each of the terminal devices MT1 to MTN is constituted of multiple streams.

Here, the terminal device MTk includes $I_k$ antennas m10$i$ (i=1 to $I_k$). The base station device B includes J antennas b10$j$ (j=1 to J) (J≥$\Sigma^{k=1\ to\ N} I_k$; $\Sigma^{k=1\ to\ N}$ indicates to calculate a sum for k=1 to N).

<Regarding Base Station Device b5>

Figure 27:
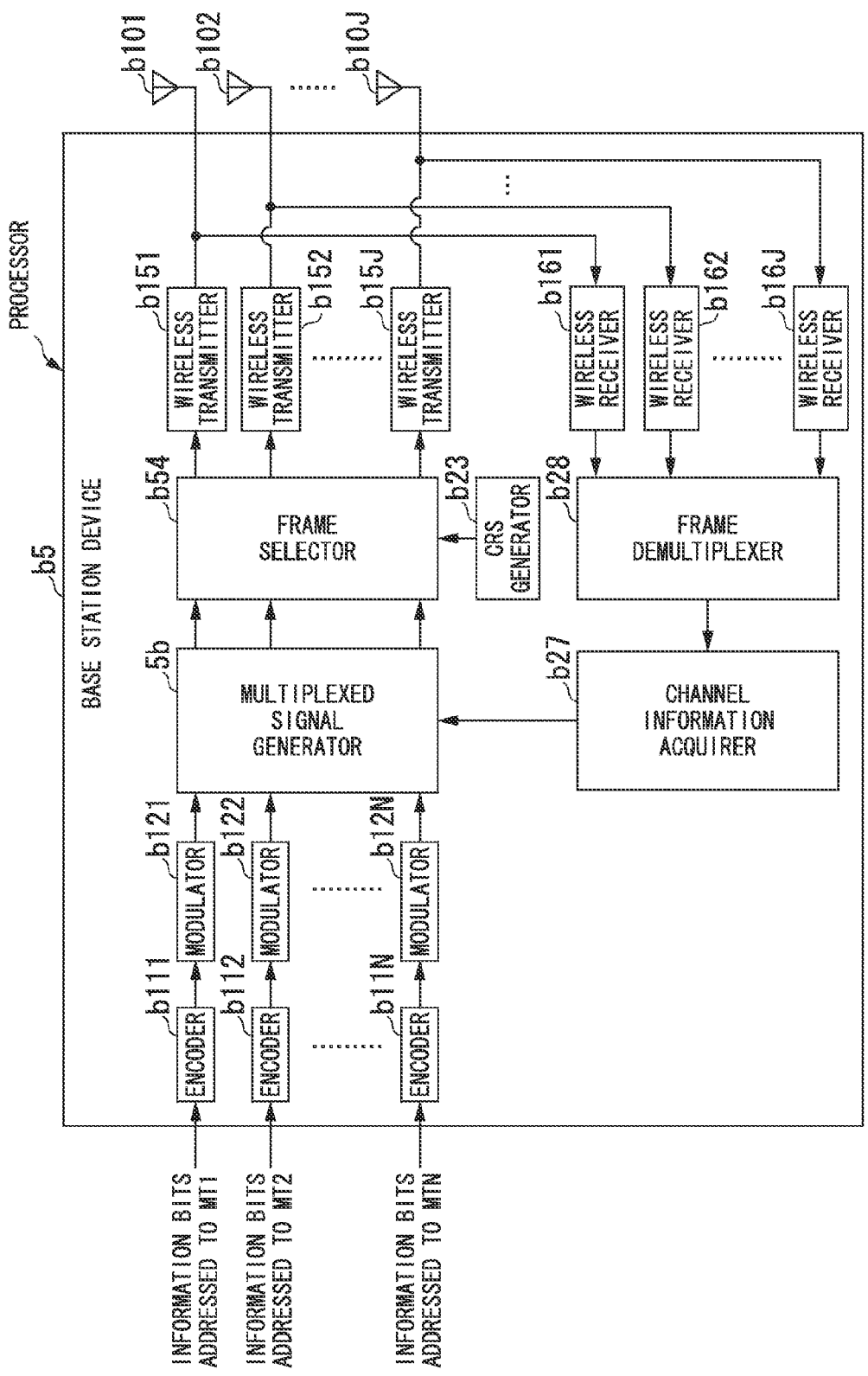
FIG. 27 is a schematic block diagram illustrating a base station device according to the fifth embodiment.

FIG. 27 is a schematic block diagram illustrating a configuration of a base station device b5 according to the fifth embodiment of the present invention. This drawing shows a case in which the base station device b5 includes J antennas, each of which transmits signals addressed to N terminal devices using the same frequency band.

If the base station device b5 according to the fifth embodiment (FIG. 27) is compared to the base station device b2 according to the second embodiment (FIG. 9), a multiplexed signal generator 5$b$ and a frame selector b54 differ. However, other constituent elements (the encoders b111 to b11N, the modulators b121 to b12N, the CRS generator b23, the wireless transmitters b151 to b15J, the antennas b101 to b10J, the wireless receivers b161 to b16J, the frame demultiplexer b28, and the channel information acquirer b27) have the same functions as those of the second embodiment. Explanations of the same functions as those of the second embodiment are omitted here.

Based on the mapping information, the frame selector b54 allocates to a predetermined frequency band, a common reference symbol for the antenna b10$j$ which is received from the CRS generator b23. The frame selector b54 outputs the signal for each antenna b10$j$ which has been allocated to the frequency band, to the wireless transmitter b15$j$ connected to the antenna 10$j$, in predetermined transmission time unit (frame). Additionally, based on the mapping information, the frame selector b54 allocates to the frequency band for transmitting signals to the terminal device MTk, a symbol stream for each antenna b10$j$ which is received from the multiplexed signal generator 5$b$ and is addressed to the terminal device MTk associated with the antenna b10$j$ (j=1 to N). The frame selector b54 outputs to the wireless transmitter b15$j$ connected to the associated antenna b10$j$, the signal for the antenna b10$j$ which is allocated to the frequency band, in predetermined transmission time unit (frame).

Figure 28:
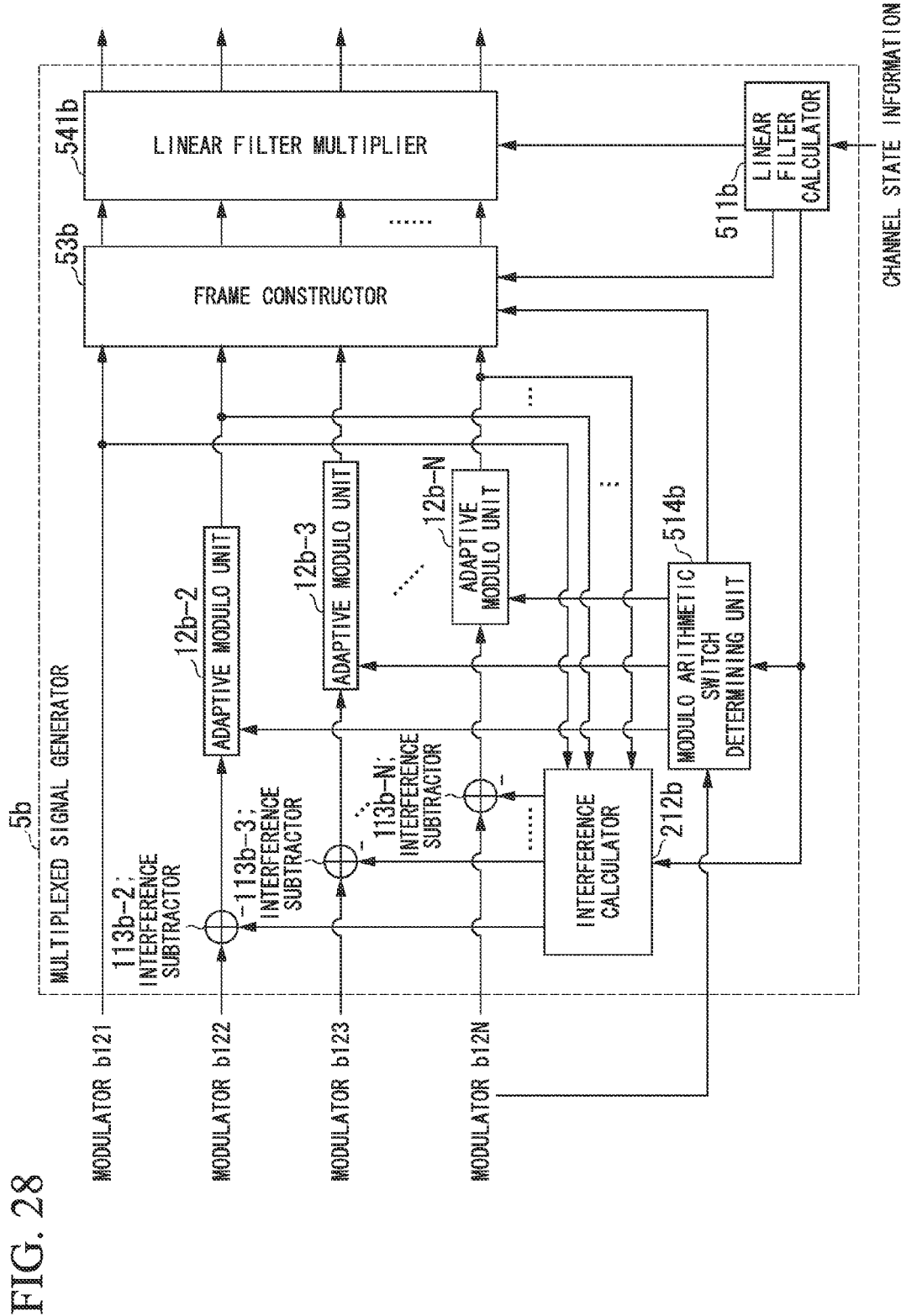
FIG. 28 is a schematic block diagram illustrating a configuration of a multiplexed signal generator according to the fifth embodiment.

FIG. 28 is a schematic block diagram illustrating a configuration of the multiplexed signal generator 5$b$ according to the fifth embodiment. If the multiplexed signal generator 5$b$ according to the fifth embodiment (FIG. 28) is compared to the multiplexed signal generator 2$b$ according to the second embodiment (FIG. 10), a linear filter calculator 511$b$, a modulo arithmetic switch determining unit 514$b$, a frame constructor 53$b$, and a linear filter multiplier 541$b$ differ. However, other constituent elements (the interference calculator 212$b$, the interference subtractors 113$b$-2 to 113$b$-N, and the adaptive modulo arithmetic units 112$b$-2 to 12$b$-N) have the same functions as those of the second embodiment. Explanations of the same functions as those of the second embodiment are omitted here. In the second embodiment, however, the interference calculator 212$b$, the interference subtractor 113$b$-$k$, and the adaptive modulo arithmetic unit 12$b$-$k$ perform the processes on symbols for every stream. On the other hand, in the fifth embodiment, the processes are performed on symbols for every $I_k$ streams. For example, the modulation symbol $s_k$ is constituted of $I_k$ streams and is expressed by a vector including $I_k$ elements.

The linear filter calculator 511$b$ receives CSI. The linear filter calculator 511$b$ generates a channel matrix H from the received CSI. Here, $h_{pq}$, which is the element in the p-th row and the q-th column of the channel matrix H (p=1 to $\Sigma^{k=1\ to\ N} I_k$, q=1 to J), is a channel estimation value of the channel between the antenna b10$q$ and the antenna m10$i$ of the terminal device MTk. The channel matrix is expressed by the following formula (17).

[Formula 16]

$$H = [H_1^T, H_2^T, \ldots, H_N^T]^T \quad (17)$$

Here, T denotes a transpose. Additionally, $H_k$ denotes a channel matrix of the channel between the antenna b10$q$ and the terminal device MTk, and is an $I_k \times J$ matrix. Here, a matrix obtained by extracting the channel matrixes $H_1$ to $H_{k-1}$ for the terminal devices MT1 to MTk−1 from the channel matrix H is denoted as $H_{-k}$. In other words, $H_{-k}$ is expressed by the following formula (18).

[Formula 17]

$$H_{-k} = [H_1^T, H_2^T, \ldots, H_{k-1}^T]^T \quad (18)$$

[Regarding Calculation Process by Linear Filter]

The linear filter calculator 511$b$ calculates a linear filter (matrix Q) as follows.

Firstly, the linear filter calculator 511$b$ performs singular value decomposition on $H_{-k}$. The singular value decomposition of $H_{-k}$ is expressed by the following formula (19).

[Formula 18]

$$H_{-k} = U_{-k} \Sigma_{-S} [V_{-k}^{Im}, V_{-k}^{ker}]^H \quad (19)$$

Here, the matrix $U_{-k}$ denotes an $R_1$ ($=\Sigma^{h=2\ to\ k-1} I_h$)×$R_1$ unitary matrix. Additionally, the matrix $\Sigma_{-k}$ is an $R_1 \times J$ matrix whose elements other than the diagonal elements (the element in the $r_1$-th row and $r_1$-th column ($r_1$=1 to $R_1$)) are "0" and whose diagonal elements are non-negative. The matrix $V^{Im}_{-k}$ is a J×$R_1$ matrix. The matrix $V^{ker}_{-k}$ is a J×$R_2$ ($=\Sigma^{h=k\ to\ N} I_h$) matrix.

The rank of $H_{-k}$ is $R_1$ at most. Accordingly, the column vectors of the matrix $V^{ker}_{-k}$ obtained by excluding from the first $R_1$ columns of $[V^{Im}_{-k}, V^{ker}_{-k}]$ become basis vectors in null space. These matrixes are in the relationship expressed by the following formula (20).

[Formula 19]

$$H_{-k} V^{ker}_{-k} = U_{-k} \Sigma_{-k} [V_{-k}^{Im}, V_{-k}^{ker}]^H V^{ker}_{-k} = U_{-k} \Sigma_{-k} [0, I]^H = 0 \quad (20)$$

Here, I denotes an $R_2 \times R_2$ unit matrix. The formula (20) shows that when the vector having the symbols $S_k$ to $S_N$ as elements ($S_1$ denotes a vector having symbols of $I_1$ streams, as elements) is multiplied by the matrix $V^{ker}_{-k}$, signals addressed to the terminal devices MTk to MTN do not reach the terminal devices MT1 to MT(k−1).

Figure 29:
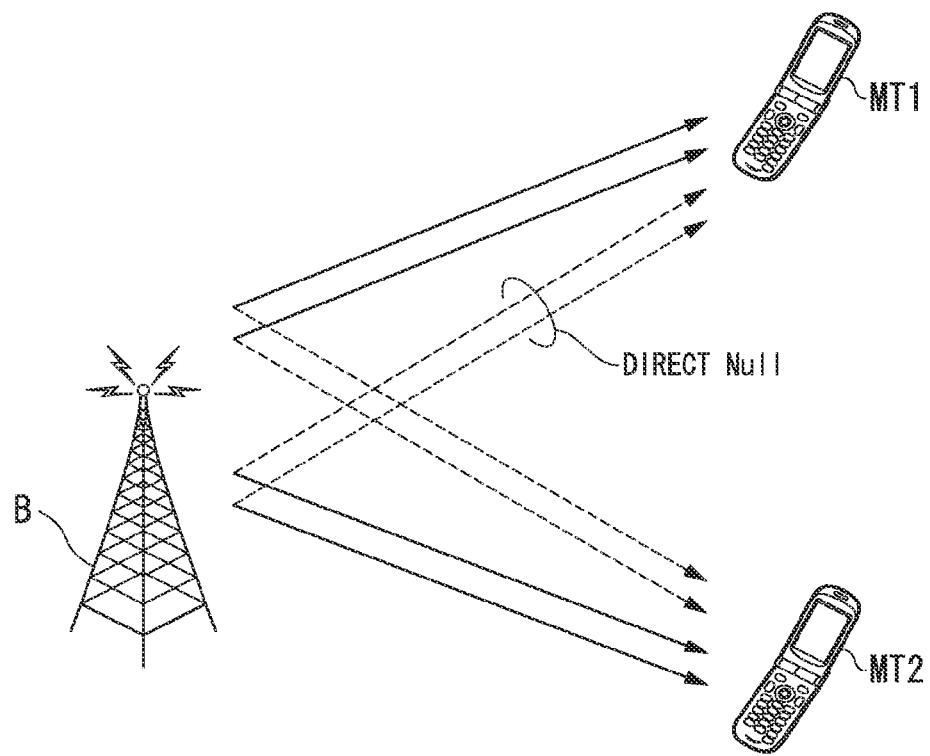
FIG. 29 is a schematic diagram illustrating an example of wireless signals according to the fifth embodiment.

FIG. 29 is a diagram illustrating an example of wireless signals according to the fifth embodiment. This drawing shows the case where N=2. This drawing shows that the signal addressed to the terminal device MT2, which is transmitted from the base station device B, does not reach the terminal device MT1.

With reference back to FIG. 28, the linear filter calculator 511b performs singular value decomposition on the matrix $H_k V^{ker}_{-k}$ obtained by multiplying the matrix $H_k$ by the $V^{ker}_{-k}$ calculated, thereby calculating a reception filter for the terminal device MTk (matrix $U_k^H$) and a dedicated filter (matrix $V^{Im}_k$). The singular value decomposition of $H_k V^{ker}_{-k}$ is expressed by the following formula (21).

[Formula 20]

$$H_k V^{ker}_{-k} = U_k^H \Sigma_k [V_k^{Im}, V_k^{ker}]^H \quad (21)$$

Here, the matrix $U_k^H$ is an $I_k \times I_k$ unitary matrix. Additionally, the matrix a is an $I_k \times R_2$ matrix whose elements other than the diagonal elements (elements in the $r_2$-th row and the $r_2$-th column ($r_2=1$ to $R_2$)) are "0" and the diagonal elements are non-negative. Additionally, the matrix $V^{Im}_k$ is an $R_2 \times I_k$ matrix. The matrix $V^{ker}_k$ is an $R_2 \times R_3$ ($=R_2-I_k=\Sigma^{h=k+1\ to\ N} I_h$) matrix.

The rank of $H_k V^{ker}_{-k}$ is $I_k$ at most. Accordingly, the column vectors of the matrix $V^{ker}_k$ obtained by excluding from the first $I_k$ column of $[V^{Im}_k, V^{ker}_k]$ become basis vectors in null space. These matrixes are in the relationship expressed by the following formula (22).

[Formula 21]

$$U_k H_k V^{ker}_{-k} V_k^{Im} = U_k U_k^H \Sigma_k [V_k^{Im}, V_k^{ker}]^H V_k^{Im} = \Sigma_k [I,0]^H = \Sigma_k \quad (22)$$

Here, I denotes an $R_1 \times R_1$ unit matrix.

The linear filter calculator 511b generates a linear filter using the calculated matrixes $V^{ker}_{-k}$ and $V^{Im}_k$. The linear filter is expressed by a matrix Q in the following formula (23).

[Formula 22]

$$Q = [V^{ker}_{-1} V_1^{Im}, V^{ker}_{-2} V_2^{Im}, \ldots, V^{ker}_{-N} V_N^{Im}] \quad (23)$$

[Regarding Process of Calculating Interference Coefficient Matrix]

The linear filter calculator 511b calculates the interference coefficient matrix B (interference coefficient filter) using the matrix HQ obtained by multiplying the matrix Q by the matrix H. The matrix HQ is expressed by the following formula (24).

[Formula 23]

$$HQ = T = \begin{pmatrix} T_{11} & 0 & \cdots & 0 \\ T_{21} & T_{22} & \ddots & \vdots \\ \vdots & & \ddots & 0 \\ T_{N1} & \cdots & \cdots & T_{NN} \end{pmatrix} \quad (24)$$

Here, the element $T_{pk}$ of the matrix T (referred to as an element matrix $T_{pk}$) is an $I_k \times I_k$ matrix. The formula (24) shows that when the element matrix $T_{pk}$ is treated as one element, HQ is a lower triangular matrix. Here, the element matrix $T_{pk}$ indicates a channel state in a case that the signal addressed to the terminal device MTk reaches the terminal device MTp.

The linear filter calculator 511b generates a diagonal matrix A obtained by extracting the diagonal elements from the calculated matrix T. Additionally, the linear filter calculator 511b calculates the interference coefficient matrix $B = A^{-1} T - I$. Here, $A^{-1}$ denotes an inverse matrix of A. I denotes a unit matrix. The interference coefficient matrix B is expressed by the following formula (25).

[Formula 24]

$$B = \begin{pmatrix} 0 & 0 & \cdots & 0 \\ T_{22}^{-1} T_{21} & 0 & \ddots & \vdots \\ \vdots & \ddots & \ddots & 0 \\ T_{NN}^{-1} T_{N1} & \cdots & T_{NN}^{-1} T_{N(N-1)} & 0 \end{pmatrix} \quad (25)$$

As explained above, the linear filter calculator 511b performs the process of calculating the linear filter and the process of calculating the interference coefficient matrix.

The linear filter calculator 511b outputs information indicating the calculated linear filter (matrix Q) to the linear filter multiplier 541b. Additionally, the linear filter calculator 511b outputs to the frame constructor 53b, the reception filter information indicating the calculated reception filter (matrix $U_k^H$). Further, the linear filter calculator 511b outputs the calculated interference coefficient matrix B to the interference calculator 212b and the modulo arithmetic switch determining unit 514b.

The modulo arithmetic switch determining unit 514b receives modulation symbols $s_1$ to $s_N$ from the modulators b121 to b12N. Here, the modulation symbol $s_k$ is constituted of $I_k$ streams. Based on the modulation symbols $S_1$ to $s_N$, and the interference coefficient matrix indicated by the information received from the linear filter calculator 511b, the modulo arithmetic switch determining unit 514b calculates the interference power $P_k$ expressed by the following formula (26) (referred to as an interference power calculation process).

[Formula 25]

$$P_k = tr(\Psi_k) \quad (26)$$

$$\Psi_k = diag\left\{ \sum_{1 \le l \le k-1} (T_{kk}^{-1} T_{kl}) \Pi_l (T_{kk}^{-1} T_{kl})^H \right\}$$

Figure 34:
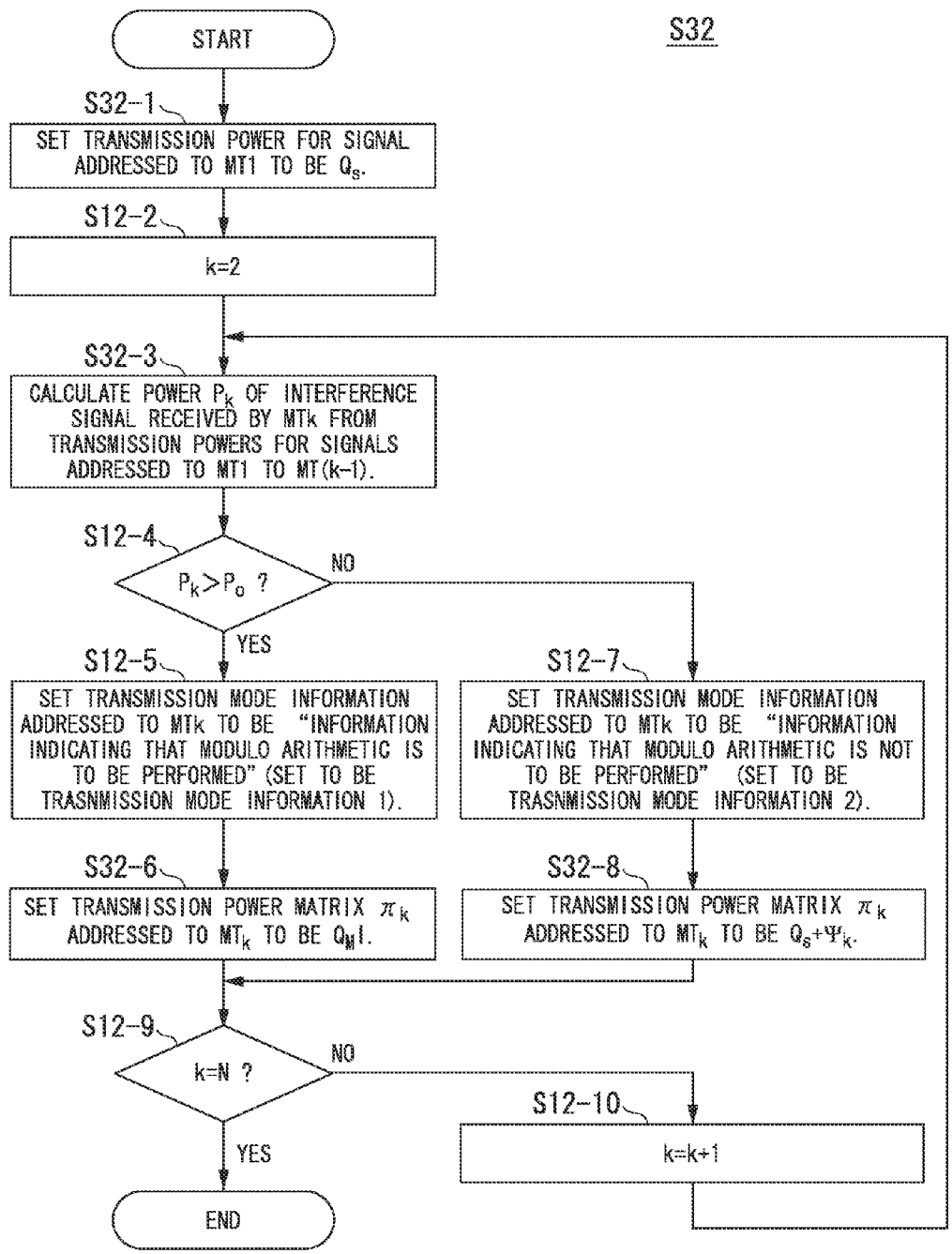
FIG. 34 is a flowchart illustrating an example of operation of an interference power calculation process according to the fifth embodiment.

Here, tr(X) denotes a trace (a sum of the diagonal elements of a matrix). Additionally, diag{X} denotes to make the non-diagonal elements of a matrix X be 0. The transmission power matrix $\Pi_l$ will be explained later together with operation of the interference power calculation process (FIG. 34).

If the calculated interference power $P_k$ is larger than a predetermined threshold $P_0$, the modulo arithmetic exchange determining unit 514b determines to perform the modulo arithmetic on the symbol stream addressed to the terminal device MTk. In this case, the modulo arithmetic exchange determining unit 514b outputs to the frame constructor 53b and the adaptive modulo unit 12b-k, transmission mode information addressed to the terminal device MTk, which indicates that the modulo arithmetic is to be performed (transmission mode 1).

On the other hand, if the interference power $P_k$ is equal to or smaller than the predetermined threshold $P_0$, the modulo arithmetic exchange determining unit 514b determines not to perform the modulo arithmetic. In this case, the modulo arithmetic exchange determining unit 514b outputs to the frame constructor 53b and the adaptive modulo unit 12b-k, transmission mode information addressed to the terminal device MTk, which indicates that the modulo arithmetic is not to be performed (transmission mode 2).

The frame constructor 53b modulates the transmission mode information received from the modulo arithmetic switch determining unit 514b and the reception filter information received from the linear filter calculator 511b. Additionally, the frame constructor 53b generates a dedicated reference symbol for each terminal device m5.

Figure 31:
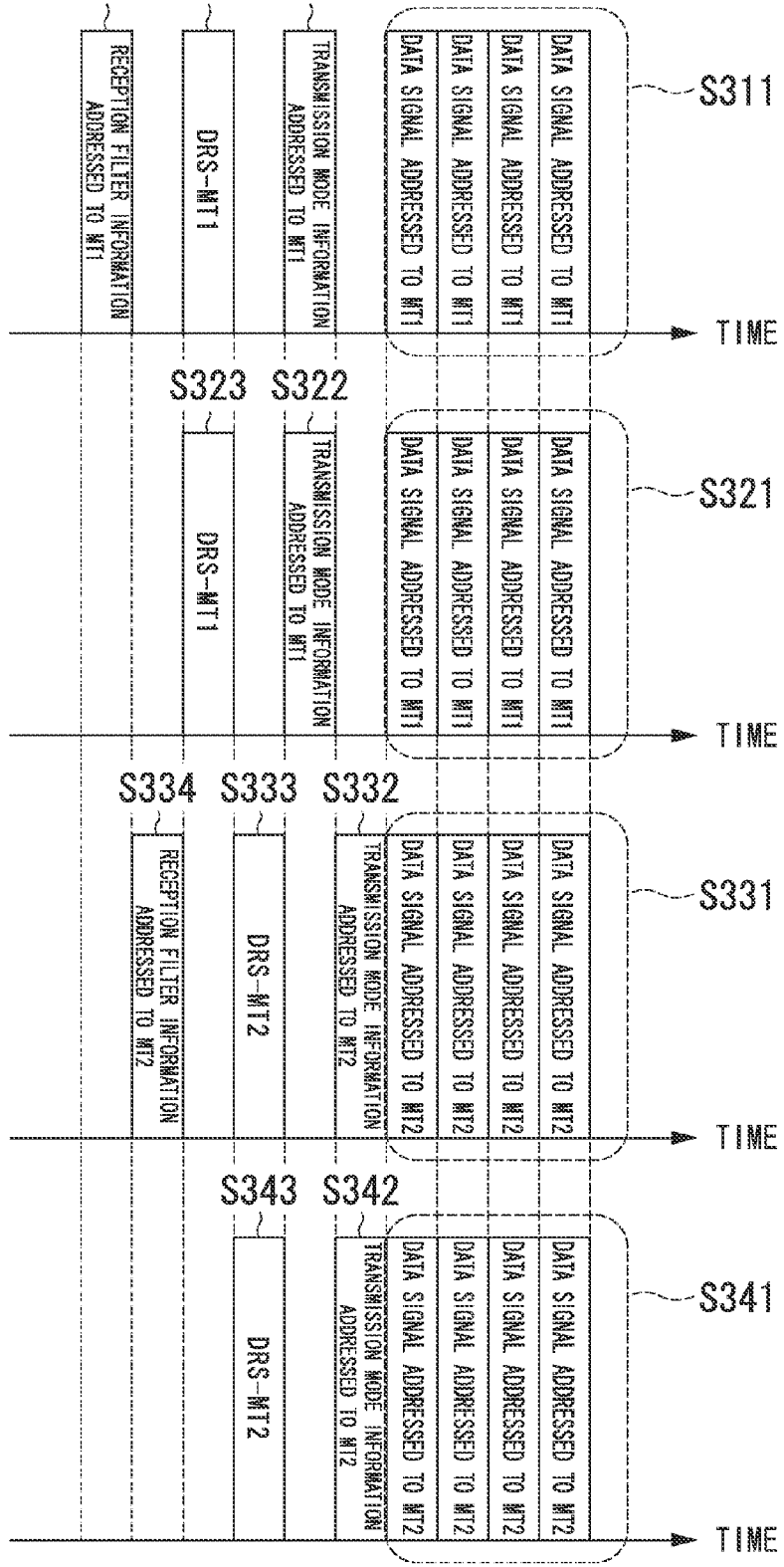
FIG. 31 is a schematic diagram illustrating an example of wireless signals to be transmitted by the base station device according to the fifth embodiment.

The frame constructor 53b arranges, in time order indicated by the mapping information, for each antenna b10$j$ ($j=j_{ks}$ ($=\Sigma^{h=1 \text{ to } k-1} I_h+1$) to $j_{kE}$ ($=\Sigma^{h=1 \text{ to } k} I_h$)), the data symbol $v_k$ received from the adaptive modulo unit 12b-k, the modulation symbol of the transmission mode information addressed to the terminal device MTk, the modulation symbol of the reception filter information addressed to the terminal device MTk, and the generated dedicated reference symbol addressed to the terminal device MTk (symbol stream addressed to the terminal device MTk for each antenna; see FIG. 31).

Additionally, the frame constructor 53b arranges, in the time order indicated by the mapping information, for each antenna b10$j$ (j=1 to $I_j$), the transmission data symbol $v_1$ ($=s_1$) received from the modulator b121, the modulation symbol of the transmission mode information addressed to the terminal device MT1 which indicates the transmission mode 2, the modulation symbol of the reception filter information addressed to the terminal device MT1, and the generated dedicated reference symbol addressed to the terminal device MT1 (symbol stream addressed to the terminal device MT1 for each antenna).

The frame constructor 53b outputs to the linear filter multiplier 541b, the arranged symbol streams addressed to the terminal devices MT1 to MTN for each terminal device b10$j$.

The linear filter multiplier 541b multiplies, by the linear filter Q indicated by the information received from the linear filter calculator 511b, a vector obtained by combining symbols $S_k$ to be transmitted at the same time, which are the symbols of the symbol stream addressed to the terminal device MTk and are received from the frame constructor 53b.

The linear filter multiplier 541b outputs to the frame selector b54, the J signals multiplied by the linear filter Q as the symbol streams for each antenna b10$j$.

Figure 30:
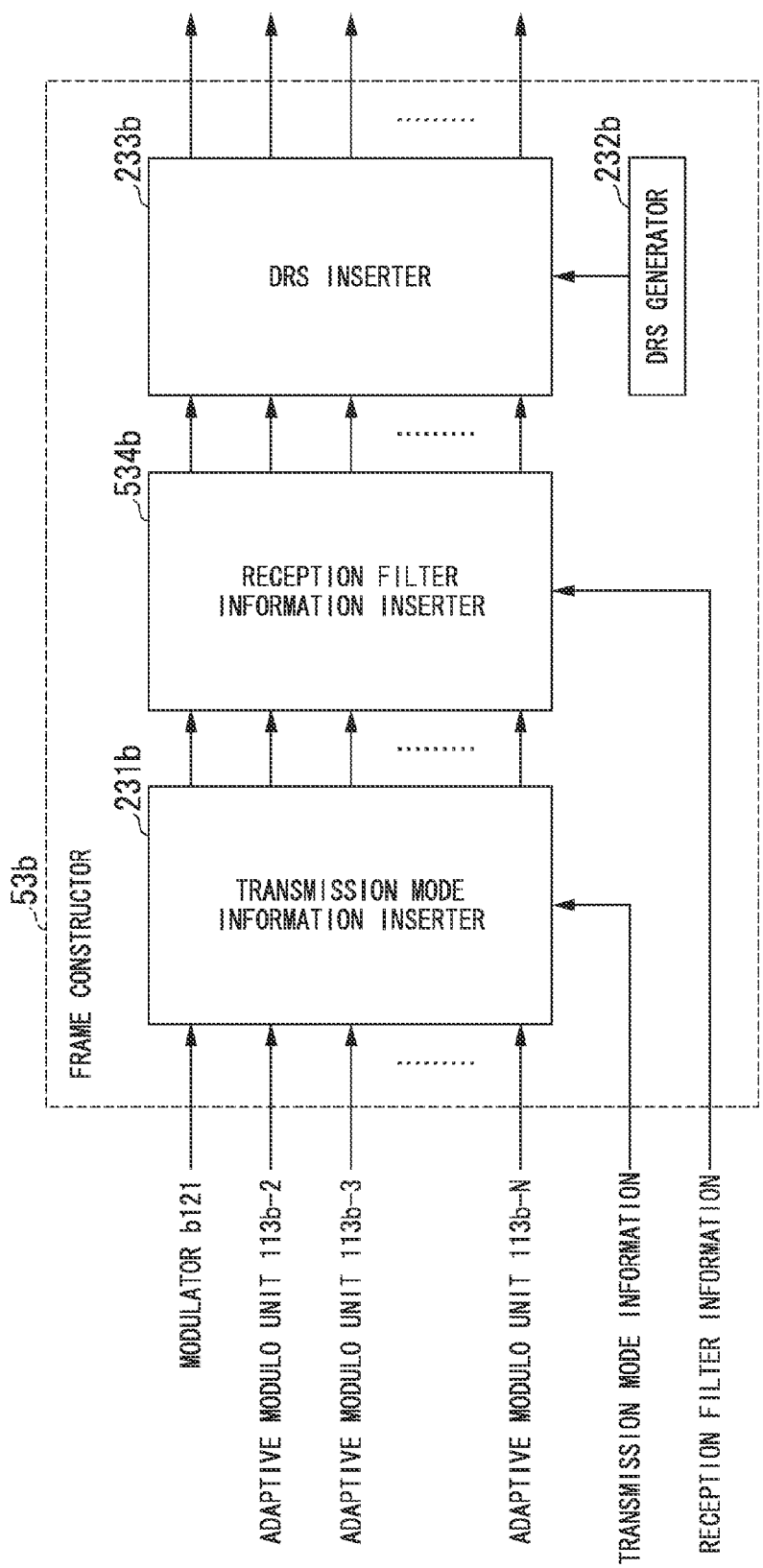
FIG. 30 is a schematic block diagram illustrating a configuration of a frame constructor according to the fifth embodiment.

FIG. 30 is a schematic block diagram illustrating a configuration of the frame constructor 53b according to the fifth embodiment.

If the frame constructor 53b according to the fifth embodiment (FIG. 30) is compared to the frame constructor 23b according to the second embodiment (FIG. 12), a reception filter information inserter 534b differs. However, the other constituent elements (the transmission mode information inserter 231b, the DRS generator 232b, and the DRS inserter 232b) have the same functions as those of the second embodiment. Explanations of the same functions as those of the second embodiment are omitted here.

The reception filter information inserter 534b modulates reception filter information for each terminal device m5 which is received from the linear filter calculator 511b. The reception filter information inserter 534b inserts modulation symbols of the modulated reception filter information for each terminal device m5, into the symbol stream for the antenna b10$j_{ks}$ of that terminal device m5, which is received from the transmission mode information inserter 231b.

<Regarding Wireless Signal>

FIG. 31 is a schematic diagram illustrating an example of wireless signals to be transmitted by the base station device b5 according to the fifth embodiment. In this drawing, a horizontal axis denotes a time axis. This drawings shows wireless signals in the case where J=4, N=2, and $I_1=I_2=2$. Additionally, this drawing shows wireless signals transmitted in the same frequency band, in a manner such that the wireless signals for a stream addressed to one terminal device are separated from the wireless signals for a stream addressed to another terminal device. The upper two stages show streams addressed to the MT1, and the lower two stages show streams addressed to the MT2.

In FIG. 31, the wireless signals addressed to the terminal device MT1 include signals S311 of the modulation symbols $s_1$, a signal S312 of the transmission mode information addressed to the terminal device MT1 (transmission mode 2 in the fifth embodiment), a signal S313 of the dedicated reference symbol for the terminal device MT1 (DRS-MT1), and a signal S314 of the reception filter information addressed to the terminal device MT1 (the reception filter information addressed to MT1).

Additionally, the wireless signals addressed to the terminal device MT1 include signals S321 of the modulation symbols $s_1$, a signal S322 of the transmission mode information addressed to the terminal device MT1 (transmission mode 2 in the fifth embodiment), and a signal S323 of the dedicated reference symbol addressed to the terminal device MT1 (DRS-MT1).

In FIG. 31, the wireless signals addressed to the terminal device MT2 include signals 5331 of the modulation symbols $s_2$, a signal 5332 of the transmission mode information addressed to the terminal device MT2, a signal S333 of the dedicated reference symbol for the terminal device MT2 (DRS-MT2), and a signal S334 of the reception filter information addressed to the terminal device MT2 (the reception filter information addressed to MT2).

Additionally, the wireless signals addressed to the terminal device MT2 include signals S341 of the modulation symbols $s_2$, a signal S342 of the transmission mode information addressed to the terminal device MT2, and a signal S343 of the dedicated reference symbol addressed to the terminal device MT2 (DRS-MT2).

<Regarding Terminal Device m5>

Figure 32:
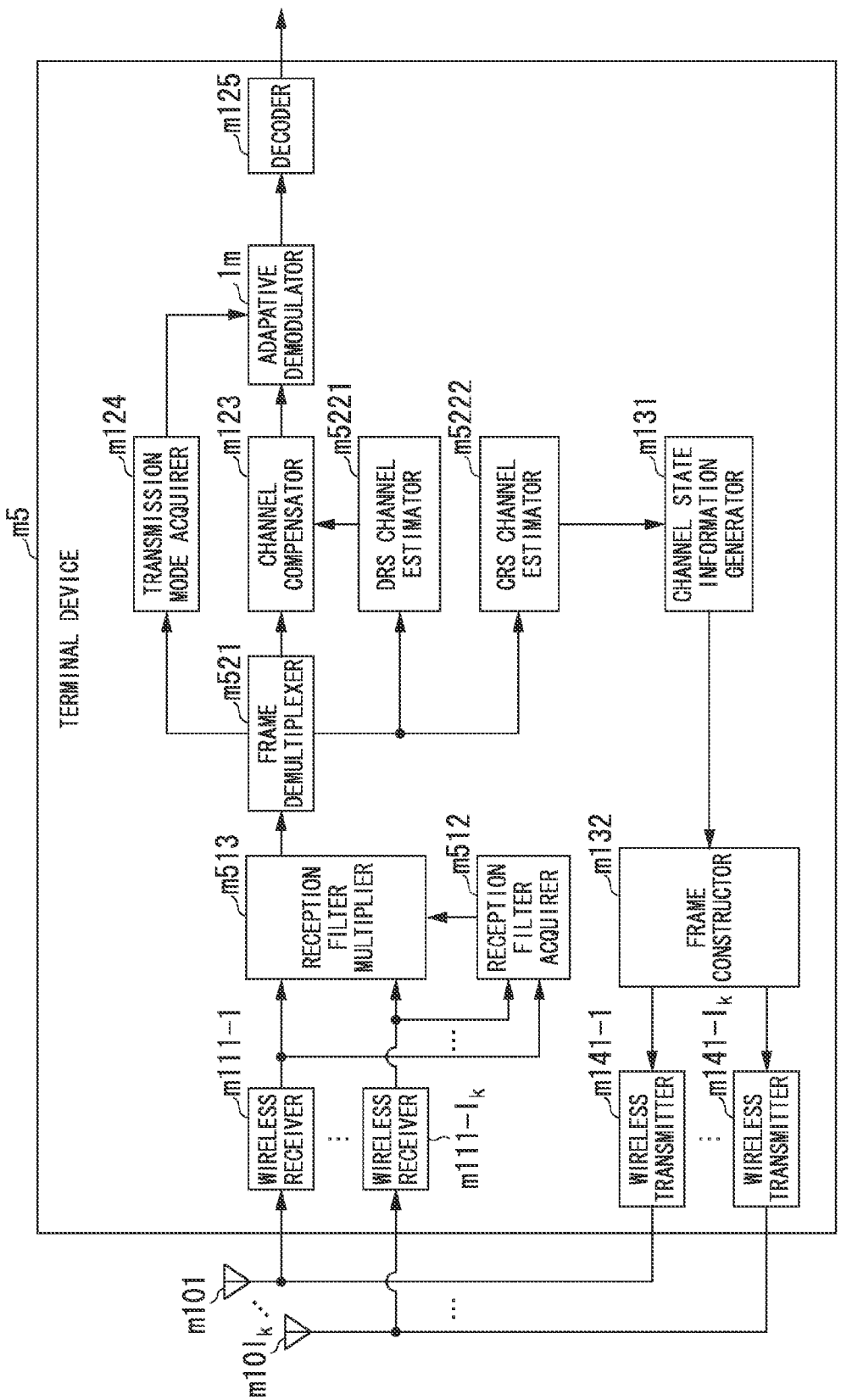
FIG. 32 is a schematic diagram illustrating a terminal device according to the fifth embodiment.

FIG. 32 is a schematic block diagram illustrating a configuration of the terminal device m5 according to the fifth embodiment. This drawing is a diagram illustrating a configuration of the terminal device MTk and illustrating a case in which the terminal device MTk includes $I_k$ antennas.

If the terminal device m5 according to the fifth embodiment (FIG. 32) is compared to the terminal device m1 according to the first embodiment (FIG. 6), a reception filter acquirer m512, a reception filter multiplier m513, a frame demultiplexer m521, a DRS channel estimator m5221, and the CRS channel estimator m5222 differ. However, other constituent elements (the channel compensator m123, the transmission mode acquirer m124, the adaptive demodulator 1$m$, the decoder m124, the channel state information generator m131, and the frame constructor m132) have the same functions as those of the first embodiment. Explanations of the same functions as those of the first embodiment are omitted here.

However, the terminal device m5 includes $I_k$ wireless receivers m111-1 to m111-$I_k$ and $I_k$ wireless transmitters m141-1 to m141-$I_k$. The $I_k$ wireless receivers m111-1 to m111-$k$ and $I_k$ wireless transmitters m141-1 to m141-$I_k$ have the same functions as those of the wireless receiver m111 and the wireless transmitters m141 of the terminal device m1, respectively.

Based on the mapping information preliminarily reported from the base station device b5, the reception filter acquirer m512 extracts the reception filter information addressed to the terminal device m5 from the signals received from the wireless receivers m111-1 to m111-$I_k$. The reception filter acquirer m512 outputs to the reception filter multiplier m513, the extracted reception filter information addressed to the terminal device m5.

The reception filter multiplier m513 multiplies the signals received from the wireless receivers m111-1 to m111-$I_k$ by the reception filter indicated by the reception filter information received from the reception filter acquirer m512. Thereby, the signals resulting from the multiplication become signals in the case that a channel matrix is a matrix $\Sigma_k$ (see the formula (22)). The reception filter multiplier m513 outputs the signals resulting from the multiplication to the frame demultiplexer m521.

Based on the mapping information preliminarily reported from the base station device b5, the frame demultiplexer m521 demultiplexes signals addressed to the terminal device m5, from the signals received from the wireless receivers m111-1 to m111-$I_k$.

Additionally, the frame demultiplexer m521 outputs to the CRS channel estimator m5222, a signal of the common reference symbol among the demultiplexed signals. Further, the frame demultiplexer m521 outputs to the DRS channel estimator m5221, a signal of the dedicated reference symbol addressed to the terminal device m5 among the demultiplexed signals. Moreover, the frame demultiplexer m521 outputs to the channel compensator m123, signals of the data signals addressed to the terminal device m5 among the demultiplexed signals.

Based on the signal of the dedicated reference symbol received from the frame demultiplexer m521, the DRS channel estimator m5221 estimates the channel state of the channel on which the wireless signals of the $I_k$ streams addressed to the terminal device m5 transmitted by the base station device b5 pass until the wireless signals are received by the antennas m101 to m10$I_k$. Here, a channel matrix indicating the estimated channel state is $\Sigma_k$. The DRS channel estimator m5221 outputs to the channel compensator m523, CSI indicating the estimated channel state.

Based on the signal of the common reference symbol received from the frame demultiplexer m521, the CRS channel estimator m5222 estimates the channel state of the channel between each of the antennas b101 to b10J and each of the antennas m101 to m10$I_k$. The CRS channel estimator m5222 outputs to the channel state information generator m131, CSI indicating the estimated channel state.

<Regarding Operation of Base Station Device b5>

Figure 33:
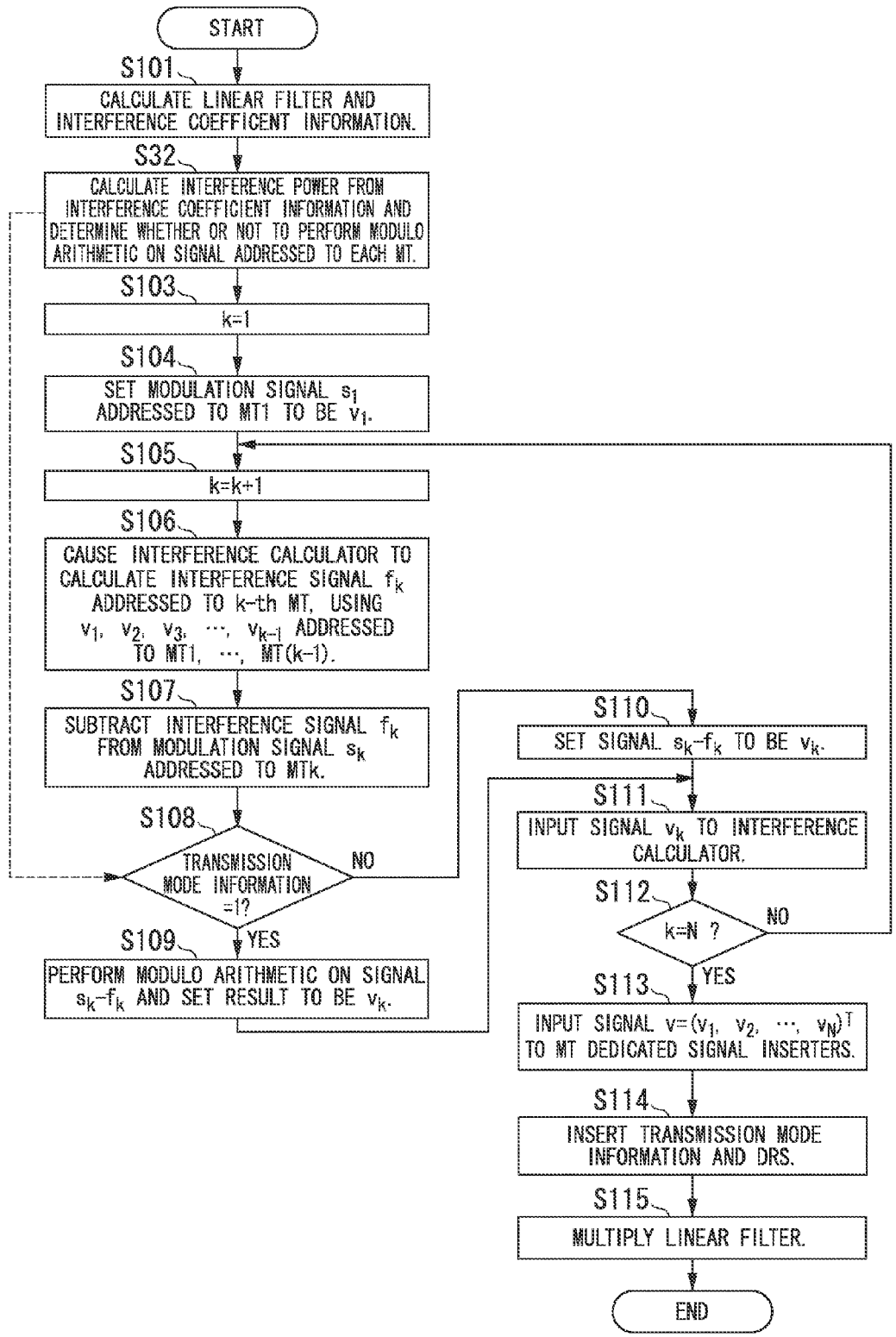
FIG. 33 is a flowchart illustrating operation of the multiplexed signal generator according to the fifth embodiment.

FIG. 33 is a flowchart illustrating operation of the multiplexed signal generator 5b according to the fifth embodiment. If the operation of the multiplexed signal generator 5b according to the fifth embodiment (FIG. 33) is compared to the operation of the multiplexed signal generator 2b according to the second embodiment (FIG. 13), a process in step S32 differs. However, the other processes (steps S101, and S103 to S125) are the same as those of the second embodiment. Explanations of the same processes as those of the second embodiment are omitted here.

FIG. 34 is a flowchart illustrating an example of operation of the interference power calculation process according to the fifth embodiment. This drawing illustrates operation of the process in step S32 shown in FIG. 33. If the operation of the interference power calculation process according to the fifth embodiment (FIG. 34) is compared to the operation of the interference power calculation process according to the second embodiment (FIG. 14), processes in steps S32-1, S32-3, S32-6, and S32-8 differ. However, other processes (steps S12-2, S12-4, S12-5, S12-7, S12-9, and S12-10) are the same as those of the second embodiment. Explanations of the same processes as those of the second embodiment are omitted here.

(Step S32-1) The modulo arithmetic switch determining unit 514b sets to be a transmission power matrix $Q_S$, a matrix whose diagonal elements are set to be the powers of the modulation symbols $s_1$ addressed to the terminal device MT1 for the respective antennas b101 to b10$I_L$. Here, the powers set to the diagonal elements of the matrix $Q_S$ are the average powers obtained by averaging, for each antenna, the powers of symbols per frame. Thereafter, the operation proceeds to step S12-2.

(Step S32-3) The modulo arithmetic switch determining unit 514b calculates the interference power $P_k$ using the transmission power matrix $\Pi_1$ (1=1 to k−1) calculated in step S32-6 or S32-8 (see the formula (26)). Here, when k=2, the modulo arithmetic switch determining unit 514b sets the transmission power matrix $\Pi_1$ to be $Q_S$ calculated in step S32-1. Thereafter, the operation proceeds to step S12-4.

(Step S32-6) The modulo arithmetic switch determining unit 514b sets $Q_M$I to be the transmission power matrix $\Pi_k$. Here, $Q_M$ is the average power of the modulo symbol $s_k'$, and is the power under the assumption that signals are distributed at the equal probability on signal points included within the range defined by [−τ/2, τ/2] of the I-ch and [τ/2, τ/2] of the Q-ch with the origin as the center on the constellation plane (see FIG. 37). Additionally, I denotes a unit matrix.

(Step S32-8) The modulo arithmetic switch determining unit 514b sets $Q_S+\Psi_k$ to be the transmission power matrix $\Pi_k$. Here, $Q_S$ is a matrix whose diagonal elements are set to be the average powers obtained by averaging the powers of the modulation symbols $s_1$ per frame. Here, each of the diagonal elements of $Q_S+\Psi_k$ indicates the average power of the interference cancelled symbol $s_k-f_k$ for each antenna. Thereafter, the operation proceeds to step S12-9.

Thus, according to the fifth embodiment, the multiplexed signal generator 5b multiplexes multiple stream signals which are signals addressed to the terminal device MTk associated with the "transmission mode 1" and which have been subjected to the modulo arithmetic, and multiple stream signals which are signals addressed to the terminal device MTk associated with the "transmission mode 2" and which are not subjected to the modulo arithmetic. Thereby, in the fifth embodiment, the wireless communication system can multiplex a signal having the small interference power and a signal having the large interference power, while performing the modulo arithmetic on the signal having the large interference power and not performing the modulo arithmetic on the signal having the small interference power, thereby enhancing the propagation performance.

The first, the second, and the fifth embodiments have been explained with respect to the cases where the base station devices b1, b2 and b5 generate transmission mode information indicating the "transmission mode 1" or the "transmission mode 2." However, the present invention is not limited thereto, and the base station devices b1, b2 and b5 may generate only the transmission mode information indicating the "transmission mode 1" or only transmission mode information indicating the "transmission mode 2." In this case, if transmission mode information is received or reported, the base station devices b1, b2 and b5, or the terminal devices m1 and m5 perform processes by the transmission mode indicated by that transmission mode information. If transmission mode information is not received or reported, the base station devices b1, b2 and b5, or the terminal devices m1 and m5 perform processes by a transmission mode other than the transmission mode indicated by the transmission mode information to be received or reported.

Additionally, the threshold may be set to be $P_0=0$ in the above first, the second, and the fifth embodiments. In this case, the base station devices b1, b2 and b5, and the terminal devices m1 and m5 may be configured not to perform the modulo arithmetic if the terminal devices m1 and m5 receive no interference from the terminal device m1 and m5 whose interference cancelling orders are earlier (i.e., the channels are orthogonal). Additionally, if the base station devices b1, b2 and b5, and the terminal devices m1 and m5 receive even a little interference, that is, if the transmission power increases due to interferences from the signals addressed to other terminal devices m1 and m5, the base station devices b1, b2 and b5, and the terminal devices m1 and m5 can perform the modulo arithmetic to decrease the transmission power. As a matter of course, in this case, the channels that the base station devices b1, b2 and b5 obtain using the channel information reported from the terminal devices m1 and m5 may be orthogonal. Actual channels may not perfectly be orthogonal when the base station devices b1, b2 and b5 transmit data signals.

Further, the communication in each of the above embodiments may be applied to an uplink. Additionally, the communication in each of the above embodiments may be OFDM (Orthogonal Frequency Divisional Multiplexing) communication. In this case, the processes for symbols in each of the above embodiments are performed for every subcarrier or for every multiple subcarriers. Hereinafter, a configuration in this case is explained.

Figure 35:
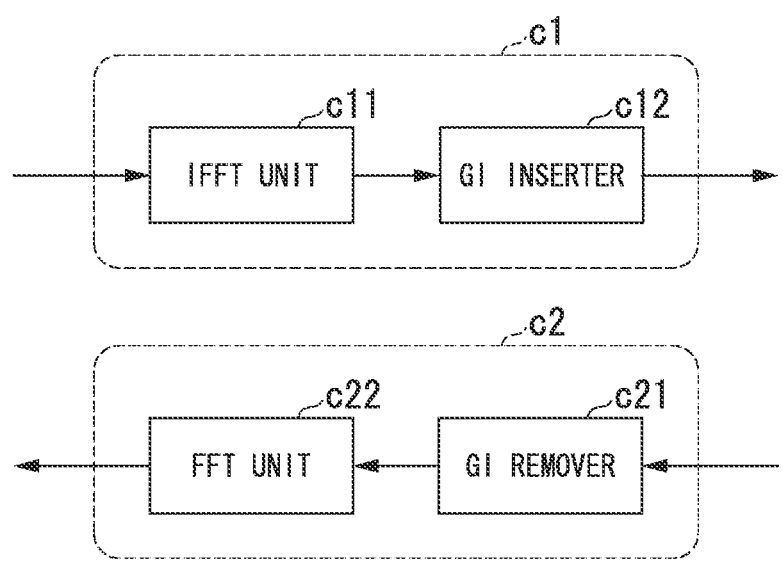
FIG. 35 is a schematic diagram illustrating a configuration for an OFDM process.

FIG. 35 is a schematic block diagram illustrating a configuration of performing an OFDM process. In this drawing, a unit c1 appended with a reference symbol c1 includes: an IFFT unit (Inverse Fast Fourier Transform) c11; and a GI (Guard Interval) inserter c12. A unit c2 appended with a reference symbol c2 includes: a GI remover c21; and an FFT unit (Fast Fourier Transform) c22.

The IFFT unit c11 performs inverse Fourier transform on the input signal, and outputs the result to the GI inserter c12. The GI inserter c12 inserts a guard interval into the signal received from the IFFT unit c11, and outputs the result. The GI remover c21 removes the guard interval from the input signal, and outputs the result to the FFT unit c22. The FFT unit c22 performs fast Fourier transform on the signal received from the GI remover c21, and outputs the result.

In case that the OFDM communication is performed in downlink in each of the above embodiments, for example, each of the base station devices b1 to b5 is provided with the unit c1 between each of the frame selectors b14, b24, b44, or b54 and each of the wireless transmitters b151 to b15N. Additionally, in this case, the unit c2 shown in FIG. 35 is included in the terminal device m1 between the wireless receiver m111 and the frame demultiplexer m121, and is included in the terminal device m5 between each of the wireless receivers m111-1 to m111-$I_k$ and each of the reception filter acquirer m512 and the reception filter multiplier m513.

Additionally, in a case that OFDM communication is performed in uplink in each of the above embodiments, for example, each of the base station device b1 to b5 is provided with the unit c2 shown in FIG. 35 between each of the wireless receivers b161 to b16N and the channel information acquirer b17 or the frame demultiplexer b28. Further, in this case, each of the terminal device m1, m4, and m5 is provided with the unit c1 shown in FIG. 35 between the frame constructor m132 and the wireless transmitter m141 or each of the wireless transmitter m141-1 to m141-$I_k$.

Additionally, in each of the above embodiments, the base station device b1 to b5 and the terminal devices m1, m4, and m5 may transmit the signal of the common reference symbol, the signal of the dedicated reference symbol, and the signal of the transmission mode information by frequency division multiplexing, not by time division multiplexing, or by multiplexing using an orthogonal code to be used for CDMA (Code Division Multiple Access) or the like, or a code such as a CAZAC (Constant Amplitude Zero Auto Correlation) sequence, or by a combination of these means.

Additionally, in each of the above embodiments, the base station device b1 to b5 and the terminal devices m1, m4, and m5 may perform communication using MU-MIMO THP by performing, in lieu of the process using the linear filter, a process based on the MMSE (Minimum Mean Square Error) criterion disclosed in, for example, Non-Patent Document 2, or a process using the ordering disclosed in Non-Patent Document 2.

Additionally, in each of the above embodiments, the terminal devices m1, m4, and m5 may quantize the values of each row of the channel matrix H and transmit the resultant value as CSI to the base station device b1 to b5. Further, the terminal devices m1, m4, and m5 and the base station devices b1 to b5 may preliminarily store patterns of the quantized information (referred to as a codebook) each indicating the quantized value, and the terminal devices m1, m4, and m5 may transmit to the base station devices b1 to b5, identification information that identifies that pattern as CSI.

FIG. 36 is a schematic diagram illustrating an example of the codebook.

Additionally, in each of the above embodiments, the interference cancelling order means the order of the terminal device MTk for which the base station device b1 to b5 sequentially cancel interference, that is, the order of the terminal number from MT1, followed by MT2, MT3, . . . , and MTN. Here, wireless signals addressed to each terminal device MTk are generated by subtracting from modulation signals addressed to the terminal device MTk, at least interference from wireless signals addressed to the terminal device MT1 ($1 \le k-1$) with the earlier order to the terminal device MTk.

Additionally, in each of the above embodiments, part of the units of the base station devices b1 to b5 and the terminal devices m1, m4, and m5 may be performed in the processor. For example, regarding the base station devices b1 to b5, only the multiplexed signal generators 1b to 5b and the wireless transmitters b151 to b15J may be performed in the processor. Alternatively, part of the other units may be added to these units. Further, for example, regarding the terminal devices m1, m4, and m5, only the adaptive demodulator 1m and the transmission mode acquirer m124 or the transmission mode detector m424 may be performed in the processor. Alternatively, part of the other units may be added to these units.

Additionally, in each of the above third embodiments, the base station device b3 may report information indicating the terminal number k to the terminal device MTk. For example, in a case that the base station device b3 and the terminal device MTk preliminarily store the threshold K, a transmission mode can be determined by comparing the terminal number k to the threshold K.

Further, in the third and fourth embodiments, each of the terminal devices m1 and m4 may include multiple transmission antennas. In this case, the base station devices b3 and b4 transmit multiple stream signals similarly to the base station device b5, and each of the terminal devices m1 and m4 receives multiple stream signals similarly to the terminal device m5.

Additionally, each of the above third embodiments has been explained with respect to the case where the total number of the antennas included in the base station devices b1 to b5 and the antennas included in the terminal devices m1, m4, and m5 is equal to the number of data streams. However, the present invention is not limited thereto. For example, in a case that some terminal devices m1, m4, and m5 are configured to receive signals physically using two antennas, but combine the received signals into one signal, the number of antennas may be logically assumed to be one (for processes by the terminal devices m1, m4, and m5, or the base station devices b1 to b5).

A computer may implement part of the terminal devices m1, m4, and m5 and the base station devices b1 to b5 of the above embodiments, such as: the encoders b111 to b11N; the modulators b121 to b12N; the multiplexed signal generators 1b, 2b, 3b, 4b, and 5b; the CRS generators b13 and b23; the frame selectors b14, b24, b44, and b54; the wireless transmitters b151 to b15J; the wireless receivers b161 to b16J; the channel information acquirer b17; the linear filter calculators 111b, 211b, and 511b; the interference calculators 112b and 212b; the interference subtractors 113b, and 113b-2 to 113b-N; the modulo arithmetic switch determining unit 114b, 214b, and 514b; the adaptive modulo unit 12b, and 12b-2 to 12b-N; the frame constructors 13b, 23b, 43b, and 53b; the linear filter multipliers 141b, 241b, and 541b; the modulo arithmetic switch units 121b and 121b-k; the modulo arithmetic units 122b and 122b-k; the transmission mode information inserters 131b and 231b; the DRS generators 132b and 232b; the DRS inserters 133b and 233b; the wireless receivers m111 and m111-1 to m111-$I_k$; the frame demultiplexers m121 and m421; the channel estimator m122; the channel compensator m123; the transmission mode acquirer m124; the adaptive demodulator 1m; the decoder m124; the channel state information generator m131; the frame constructor m132; the wireless transmitters m141, and m141-1 to m141-$I_k$; the modulo arithmetic switch unit 111m; the modulo arithmetic unit 112m; the demodulator 113m; the frame demultiplexer b28; the channel information acquirer b27; the transmission mode detector m424; the reception filter information inserter 534b; the reception filter acquirer m512; the reception filter multiplier m513; the frame demultiplexer m521; the DRS channel estimator m5221; and the CRS channel estimator m5222. In this case, a computer-readable recording medium may store a program for implementing these control functions, so that a computer system reads and executes the program stored in the recording medium and thereby implement the control functions. Here, the "computer systems" are computer systems included in the terminal devices m1, m4, and m5, or the base station devices b1 to b5, and include OS and hardware, such as a peripheral device. Additionally, the "computer readable recording medium" includes a portable medium such as a flexible disc, a magneto-optical disc, a ROM, and a CD-ROM, and a storage device such as a hard disk built in the computer system. Further, the "computer readable recording medium" may include a medium that dynamically stores a program for a short period of time, such as a communication line used when a program is transmitted via a network such as the Internet or a communication line such as a telephone line. Additionally, the "computer readable recording medium" may include a medium that stores a program for a predetermined period of time, such as a volatile memory built in a computer system serving as a server or client when the program is transmitted via a network such as the Internet or a communication line such as a telephone line. Moreover, the program may be a program for implementing part of the aforementioned functions. Further, the program may be a program that can implement the aforementioned functions in combination with a program already recorded in the computer system.

Additionally, part or all of the terminal devices m1, m4, and m5 and the base station devices b1 to b5 of the above embodiments may be implemented as an integrated circuit, such as an LSI (Large Scale Integration). Each functional block of the terminal devices m1, m4, and m5 and the base station devices b1 to b5 may be individually made as a processor. Alternatively, part or all of the terminal devices m1, m4, and m5 and the base station devices b1 to b5 may be integrated to make a processor. Further, the circuit integration method is not limited to the LSI, but may be a dedicated circuit or a general-purpose processor. Moreover, if a circuit integration technology substituting the LSI is invented along with the progress of the semiconductor technology, an integrated circuit made by that technology may be used.

Although an embodiment of the present invention has been explained in detail with reference to the drawings, the specific configuration is not limited thereto, and various design modifications may be made without departing from the scope of the present invention.

INDUSTRIAL APPLICABILITY

The present invention is suitable to be used for a transmission device, a reception device, and a wireless communication system, and can enhance the propagation performance.

DESCRIPTION OF REFERENCE NUMERALS

B, b1 to b5: base station device
MT1 to MTN, m1, m4, m5: terminal device
b111 to b11N: encoder
b121 to b12N: modulator
1b, 2b, 3b, 4b, 5b: multiplexed signal generator
b13, b23: CRS generator
b14, b24, b44, b54: frame selector b151
b151 to b15J: wireless transmitter
b101 to b10J: antennas
b161 to b16J: wireless receiver
b17: channel information acquirer
111b, 211b, 511b: linear filter calculator (coefficient calculator)
112b, 212b: interference calculator
113b, 113b-2 to 113b-N: interference subtractor
114b, 214b, 514b: modulo arithmetic exchange determining unit (modulo exchange determining unit)
12b, 12b-2 to 12b-N: adaptive modulo unit (adaptive reside unit)
13b, 23b, 43b, 53b: frame constructor
141b, 241b 541b: linear filter multiplier (coefficient multiplier)
121b, 121b-k: modulo arithmetic exchanger
122b, 122b-k: modulo arithmetic unit (modulo arithmetic unit)
131b, 231b: transmission mode information inserter
132b, 232b: DRS generator
133b, 233b: DRS inserter (dedicated reference signal inserter)
m101: antenna
m111, m111-1 to m111-$I_k$: wireless receiver
m121, m421: frame demultiplexer
m122: channel estimator
m123: channel compensator
m124: transmission mode acquirer
1m: adaptive demodulator m125: decoder
m131: channel state information generator
m132: frame constructor
m141, m141-1 to m141-$I_k$: wireless transmitter
111m: modulo arithmetic exchanger
112m: modulo arithmetic unit
113m: demodulator
b28: frame demultiplexer
b27: channel information acquirer
b49: terminal number information storing unit
m425: terminal number information storing unit
m424: transmission mode detector
534b: reception filter information inserter
m512: reception filter acquirer
m513: reception filter multiplier
m521: frame demultiplexer
m5221: DRS channel estimator
m5222: CRS channel estimator

The invention claimed is:

1. A transmission device including a plurality of transmission antennas and configured to spatially multiplex and transmit a plurality of signals addressed to a plurality of reception devices, the transmission device comprising:
a multiplexed signal generator configured to determine whether to set each one of the plurality of reception devices to be a first reception device or a second reception device, a power suppression process of suppressing a power of a transmission signal from which an interference is cancelled being performed for the first reception device, the power suppression process being not performed for the second reception device, the multiplexed signal generator being configured to generate a multiplexed signal by multiplexing signals addressed to the plurality of reception devices, a first signal of the signals which is addressed to the first reception device having been subjected to the power suppression process, and a second signal of the signals which is addressed to the second reception device being not subjected to the power suppression process,
wherein the multiplexed signal generator comprises:
a modulo switch determining unit configured to determine whether to set each one of the plurality of reception devices to be the first reception device or the second reception device and to generate and output first transmission mode information that specifies the first reception device and second transmission mode information that specifies the second reception device; and
an adaptive modulo unit configured to generate the first and second signals based on the first and second transmission mode informations received from the modulo switch determining unit.

2. The transmission device according to claim 1, wherein the power suppression process is modulo arithmetic.

3. The transmission device according to claim 1, wherein in a case that an interference power of interference to at least one of the plurality of reception devices which is caused by at least a third signal of the signals which is respectively addressed to at least a remaining one of the plurality of reception devices is higher than a threshold, the modulo switch determining unit is configured to determine to set the at least one of the plurality of reception devices to be the first reception device, and
in a case that the interference power of the interference is lower than the threshold, the modulo switch determining unit is configured to determine to set the at least one of the plurality of reception devices to be the second reception device.

4. The transmission device according to claim 1, wherein the multiplexed signal generator comprises:
a coefficient calculator configured to calculate interference coefficients relating respectively to the plurality of reception devices, based on channel state informations of channels to the plurality of reception devices;
an interference calculator configured to calculate an interference signal interfering with at least one of the signals which is addressed respectively to at least one of the plurality of reception devices, based on the interference coefficients calculated by the coefficient calculator and at least a third signal of the signals which is addressed respectively to at least a remaining one of the plurality of reception devices, at least the third signal causing the interference signal; and
an interference subtractor configured to subtract the interference signal from the at least one of the signals,
wherein the adaptive modulo unit is configured to generate, based on the first and second transmission mode informations received from the modulo switch determining unit, the first and second signals respectively from fourth and fifth signals of the at least one of the signals from which the interference subtractor has subtracted the interference signal, the fourth and fifth signals being addressed respectively to the first and second reception devices.

5. The transmission device according to claim 1, wherein the multiplexed signal generator comprises:
a modulo switch determining unit configured to determine whether to set each one of the plurality of reception devices to be the first reception device or the second reception device, and to generate and output at least first transmission mode information that specifies the first reception device, and
the transmission device further comprising:
a frame constructor configured to insert into the first signal, a sixth signal of the first transmission mode infatuation generated by the modulo switch determining unit.

6. The transmission device according to claim 1, further comprising:
a frame constructor configured to insert into the second signal, a seventh signal of the second transmission mode information generated by the modulo switch determining unit.

7. The transmission device according to claim 2, wherein the multiplexed signal generator comprises:
a coefficient calculator configured to calculate interference coefficients respectively relating to the plurality of reception devices, based on channel state informations of channels to the plurality of reception devices;
an interference calculator configured to calculate an interference signal interfering with at least one of the signals which is addressed respectively to at least one of the plurality of reception devices, based on the interference coefficients calculated by the coefficient calculator and at least a third signal of the signals which is addressed respectively to at least a remaining one of the plurality of reception devices, at least the third signal causing the interference signal; and
an interference subtractor configured to subtract the interference signal from the at least one of the signals;
a modulo arithmetic unit configured to perform modulo arithmetic on the first signal addressed to the first reception device having a larger number in an order of the plurality of reception devices than a threshold number; and a multiplexed signal generator configured to multiplex the first signal having been subjected to the modulo arithmetic and the second signal from which the interference signal has been subtracted by the interference subtractor and which is addressed to the second reception device having a smaller number in the order than the threshold number.

8. The transmission device according to claim 7, further comprising:
a frame constructor configured to insert into the first signal, an eighth signal of first transmission mode information that specifies the first reception device having the larger number in the order than the threshold number.

9. The transmission device according to claim 8, wherein the frame constructor is configured to insert into the second signal, a ninth signal of second transmission mode information that specifies the second reception device having the smaller number in the order than the threshold number.

10. A reception device configured to receive a plurality of signals addressed to a plurality of reception devices which are spatially multiplexed, the reception device comprising:
a transmission mode determining unit configured to determine whether a signal received is a first signal addressed to a first reception device of the plurality of reception devices or a second signal addressed to a second reception device of the plurality of reception devices, the first signal having been subjected to a power suppression process of suppressing a power of a transmission signal from which an interference is cancelled, and the second signal being not subjected to the power suppression process; and
an adaptive demodulator configured to demodulate the signal received based on a result of determination performed by the transmission mode determining unit,
wherein the transmission mode determining unit is configured to obtain transmission mode information included in the signal received, the transmission mode information specifying the first reception device or the second reception device, and
the transmission mode determining unit is configured to determine, based on the obtained transmission mode information, whether the signal received is the first or second signal.

11. The reception device according to claim 10, wherein the power suppression process is modulo arithmetic.

12. The reception device according to claim 10, wherein the adaptive demodulator is configured to demodulate the signal received by performing modulo arithmetic on the signal received in a case that the transmission mode determining unit determines based on the transmission mode information that the signal received is the first signal, and
the adaptive modulator is configured to demodulate the signal received without performing modulo arithmetic on the signal received in a case that the transmission mode determining unit determines based on the transmission mode information that the signal received is the second signal.

13. The reception device according to claim 10, further comprising:
a frame demultiplexer configured to extract from the signal received, dedicated reference signals respectively addressed to the plurality of reception devices;
a channel estimator configured to estimate channel states based on the dedicated reference signals extracted by the frame demultiplexer; and
a channel compensator configured to perform channel compensation on the signal received based on channel state informations indicating the channel states estimated by the channel estimator.

14. The reception device according to claim 13, wherein the transmission mode determining unit is configured to determine whether the signal is the first or second signal based on the dedicated reference signals.

15. The reception device according to claim 14, wherein the transmission mode determining unit is configured to determine whether the signal received is the first or second signal based on an order of the plurality of reception devices in which interference signals have been subtracted from the signal received and which is indicated by positions at which the dedicated reference signals are allocated.

16. The reception device according to claim 15, wherein the transmission mode determining unit is configured to determine the signal received to be the first signal in a case that a first number of the reception device in the order is larger than a threshold number, and
the transmission mode determining unit is configured to determine the signal received to be the second signal in a case that the first number is smaller than the threshold number.

17. The reception device according to claim 14, wherein the adaptive demodulator is configured to demodulate the signal received by performing modulo arithmetic on the signal received in a case that the transmission mode determining unit determines that the signal received is the first signal, and
the adaptive demodulator is configured to demodulate the signal received without performing modulo arithmetic on the signal received in a case that the transmission mode determining unit determines that the signal received is the second signal.

18. The reception device according to claim 14, wherein the dedicated reference signals are allocated in a chronological order of the plurality of reception devices,
the transmission mode determining unit is configured to select one of the dedicated reference signals which is received the last in the chronological order, and
the reception device comprises:
a channel estimator configured to estimate a channel state based on the one of the dedicated reference signals which is selected by the transmission mode determining unit; and
a channel compensator configured to perform channel compensation on the signal received based on channel state information indicating the channel state estimated by the channel estimator.

19. A wireless communication system comprising:
a transmission device configured to spatially multiplex and transmit a plurality of signals addressed to a plurality of reception devices; and
a reception device configured to receive the plurality of signals transmitted from the transmission device,
wherein the transmission device comprises:
a multiplexed signal generator configured to determine whether to set each one of the plurality of reception devices to be a first reception device or a second reception device, a power suppression process of suppressing a power of a transmission signal from which an interference is cancelled being performed for the first reception device, the power suppression process being not performed for the second reception device, the multiplexed signal generator being configured to generate a multiplexed signal by multiplexing signals addressed to the plurality of reception devices, a first signal of the signals which is addressed to the first reception device having been subjected to the power suppression process, and a second signal of the signals which is addressed to the second reception device being not subjected to the power suppression process, and the multiplexed signal generator comprises:
a modulo switch determining unit configured to determine whether to set each one of the plurality of reception devices to be the first reception device or the second reception device, and to generate and output first transmission mode information that specifies the first reception device and second transmission mode information that specifies the second reception device; and
an adaptive modulo unit configured to generate the first and second signals based on the first and second transmission mode informations received from the modulo switch determining unit, and wherein the reception device comprises:
a transmission mode determining unit configured to determine whether the signal received is the first or second signal; and
an adaptive demodulator configured to demodulate the signal based on a result of determination performed by the transmission mode determining unit, and
the transmission mode determining unit is configured to obtain transmission mode information included in the signal received, the transmission mode information specifying the first reception device or the second reception device, and
the transmission mode determining unit is configured to determine, based on the obtained transmission mode information, whether the signal received is the first or second signal.

20. A transmission control method for a transmission device configured to spatially multiplex and transmit a plurality of signals addressed to a plurality of reception devices, the transmission control method comprising:
determining whether to set each one of the plurality of reception devices to be a first reception device or a second reception device, a power suppression process of suppressing a power of a transmission signal from which an interference is cancelled being performed for the first reception device, the power suppression process being not performed for the second reception device; and
generating a multiplexed signal by multiplexing signals addressed to the plurality of reception devices, a first signal of the signals which is addressed to the first reception device having been subjected to the power suppression process, and a second signal of the signals which is addressed to the second reception device being not subjected to the power suppression process,
wherein generating the multiplexed signal comprises:
determining whether to set each one of the plurality of reception devices to be the first reception device or the second reception device;
generating first transmission mode information that specifies the first reception device and second transmission mode information that specifies the second reception device; and
generating the first and second signals based on the first and second transmission mode informations generated.

21. A reception control method for a reception device configured to receive a plurality of signals addressed to a plurality of reception devices which are spatially multiplexed, the reception control method comprising:
determining whether a signal received is a first signal addressed to a first reception device of the plurality of reception devices or a second signal addressed to a second reception device of the plurality of reception devices, the first signal having been subjected to a power suppression process of suppressing a power of a transmission signal from which an interference is cancelled, and the second signal being not subjected to the power suppression process; and
demodulating the signal received based on a result of determination performed by the transmission mode determining unit,
wherein determining whether the signal received is the first signal or the second signal comprises:
obtaining transmission mode information included in the signal received, the transmission mode information specifying the first reception device or the second reception device, and
determining, based on the obtained transmission mode information, whether the signal received is the first or second signal.

22. A processor to be used for a transmission device including a plurality of transmission antennas and configured to spatially multiplex and transmit a plurality of signals addressed to a plurality of reception devices, the processor comprising:
a multiplexed signal generator configured to determine whether to set each one of the plurality of reception devices to be a first reception device or a second reception device, a power suppression process of suppressing a power of a transmission signal from which an interference is cancelled being performed for the first reception device, the power suppression process being not performed for the second reception device, the multiplexed signal generator being configured to generate a multiplexed signal by multiplexing signals addressed to the plurality of reception devices, a first signal of the signals which is addressed to the first reception device having been subjected to the power suppression process, and a second signal of the signals which is addressed to the second reception device being not subjected to the power suppression process,
wherein the multiplexed signal generator comprises:
a modulo switch determining unit configured to determine whether to set each one of the plurality of reception devices to be the first reception device or the second reception device, and to generate and output first transmission mode information that specifies the first reception device and second transmission mode information that specifies the second reception device; and
an adaptive modulo unit configured to generate the first and second signals based on the first and second transmission mode informations received from the modulo switch determining unit.

23. A processor to be used for a reception device configured to receive a plurality of signals addressed to a plurality of reception devices which are spatially multiplexed, the reception device comprising:
a transmission mode determining unit configured to determine whether a signal received is a first signal addressed to a first reception device of the plurality of reception devices or a second signal addressed to a second reception device of the plurality of reception devices, the first signal having been subjected to a power suppression process of suppressing a power of a transmission signal from which an interference is cancelled, and the second signal being not subjected to the power suppression process; and
an adaptive demodulator configured to demodulate the signal received based on a result of determination performed by the transmission mode determining unit, wherein the transmission mode determining unit is configured to obtain transmission mode information included in the signal received, the transmission mode information specifying the first reception device or the second reception device, and the transmission mode determining unit is configured to determine, based on the obtained transmission mode information, whether the signal received is the first or second signal.

* * * * *